US009105231B2

(12) United States Patent
Ebisuno et al.

(10) Patent No.: US 9,105,231 B2

(45) Date of Patent: Aug. 11, 2015

(54) DISPLAY DEVICE

(71) Applicant: JOLED INC., Tokyo (JP)

(72) Inventors: Kouhei Ebisuno, Kyoto (JP); Toshiyuki Kato, Osaka (JP); Yasuo Segawa, Hyogo (JP); Shinya Ono, Osaka (JP); Yosuke Izawa, Osaka (JP); Takashi Osako, Kyoto (JP)

(73) Assignee: JOLED INC., Tokyo (JP)

( * ) Notice: Subject to any disclaimer, the term of this patent is extended or adjusted under 35 U.S.C. 154(b) by 203 days.

(21) Appl. No.: 13/768,334

(22) Filed: Feb. 15, 2013

(65) Prior Publication Data

US 2013/0162622 A1 Jun. 27, 2013

Related U.S. Application Data

(63) Continuation of application No. PCT/JP2011/003979, filed on Jul. 12, 2011.

(51) Int. Cl.

*G06F 3/038* (2013.01)
*G09G 5/00* (2006.01)

(Continued)

(52) U.S. Cl.

CPC ............ *G09G 3/3208* (2013.01); *G09G 3/3233* (2013.01); *G09G 3/3258* (2013.01); *G09G 2300/043* (2013.01); *G09G 2300/0408* (2013.01); *G09G 2300/0426* (2013.01); *G09G 2320/029* (2013.01);

(Continued)

(58) Field of Classification Search

CPC .............. G06F 3/04842; G06F 3/0484; G06F 3/04817; G06F 3/017; G06F 3/0482; G06F 3/0488; G05B 15/02; G02B 26/02; G02B 26/00

See application file for complete search history.

(56) References Cited

U.S. PATENT DOCUMENTS 6,518,962 B2 2/2003 Kimura et al.
7,362,322 B2 4/2008 Kimura et al.

(Continued)

FOREIGN PATENT DOCUMENTS

CN 101295464 10/2008
CN 101515435 8/2009

(Continued)

OTHER PUBLICATIONS

Office Action, mailed Aug. 13, 2014, in related U.S. Appl. No. 13/467,462.

(Continued)

*Primary Examiner* — Alexander Eisen
*Assistant Examiner* — Nan-Ying Yang
(74) *Attorney, Agent, or Firm* — Greenblum & Bernstein, P.L.C.

(57) ABSTRACT

A display device includes: a power supplying unit which outputs at least one of a high-side output potential and a low-side output potential; a display unit in which pixels are arranged in a matrix and which receives power supply from the power supplying unit; a monitor wire arranged along a column direction of the pixels in the matrix, which has one end connected to at least one pixel inside the display unit, and is for transmitting the high-side potential to be applied to the pixel; and a voltage regulating unit connected to the other end of the monitor wire, which regulates at least one of the high-side output potential and the low-side output potential to be outputted by the power supplying unit, to set a potential difference between the high-side potential and the low-side potential to a predetermined potential difference.

21 Claims, 45 Drawing Sheets

(51) Int. Cl.
*G09G 3/30* (2006.01)
*G09G 3/32* (2006.01)

(52) U.S. Cl.
CPC ................. *G09G 2320/0223* (2013.01); *G09G 2320/0233* (2013.01); *G09G 2320/043* (2013.01); *G09G 2320/064* (2013.01); *G09G 2330/021* (2013.01); *G09G 2330/12* (2013.01)

(56) References Cited

U.S. PATENT DOCUMENTS

| | | | |
|---|---|---|---|
| 7,864,172 | B2 | 1/2011 | Miyake et al. |
| 7,973,745 | B2 | 7/2011 | Mizukoshi et al. |
| 8,089,428 | B2 | 1/2012 | Yaguchi et al. |
| 8,159,421 | B2 | 4/2012 | Hwang et al. |
| 8,547,307 | B2 | 10/2013 | Shirouzu et al. |
| 2001/0043168 | A1 | 11/2001 | Koyama et al. |
| 2002/0180721 | A1 | 12/2002 | Kimura et al. |
| 2003/0063081 | A1 | 4/2003 | Kimura et al. |
| 2004/0070331 | A1 | 4/2004 | Kuno et al. |
| 2006/0038501 | A1 | 2/2006 | Koyama et al. |
| 2006/0077137 | A1 | 4/2006 | Kwon |
| 2006/0176253 | A1 | 8/2006 | Yazawa et al. |
| 2007/0080905 | A1 | 4/2007 | Takahara |
| 2007/0145902 | A1 | 6/2007 | Yaguchi et al. |
| 2008/0180365 | A1 | 7/2008 | Ozaki |
| 2008/0186297 | A1 | 8/2008 | Morita |
| 2008/0266216 | A1* | 10/2008 | Choi ............................... 345/77 |
| 2008/0291135 | A1 | 11/2008 | Kim et al. |
| 2008/0297055 | A1 | 12/2008 | Miyake et al. |
| 2009/0026969 | A1* | 1/2009 | Joo ........................... 315/169.3 |
| 2009/0207105 | A1 | 8/2009 | Hwang et al. |
| 2009/0207106 | A1 | 8/2009 | Mizukoshi et al. |
| 2009/0303162 | A1 | 12/2009 | Kohno et al. |
| 2010/0110059 | A1 | 5/2010 | Kang et al. |
| 2010/0214273 | A1 | 8/2010 | Shirouzu et al. |
| 2010/0259528 | A1 | 10/2010 | Smith et al. |
| 2011/0157134 | A1* | 6/2011 | Ogura ........................... 345/211 |
| 2011/0169798 | A1 | 7/2011 | Lee et al. |
| 2011/0242087 | A1 | 10/2011 | Ebisuno et al. |
| 2011/0255586 | A1 | 10/2011 | Li et al. |
| 2012/0320024 | A1 | 12/2012 | Ebisuno et al. |
| 2012/0327063 | A1 | 12/2012 | Izawa et al. |
| 2013/0016091 | A1 | 1/2013 | Kato et al. |
| 2013/0285889 | A1 | 10/2013 | Shirouzu et al. |

FOREIGN PATENT DOCUMENTS

| | | |
|---|---|---|
| CN | 101273398 B | 6/2011 |
| EP | 2284825 | 2/2011 |
| JP | 2003-280590 | 10/2003 |
| JP | 2004-246250 | 9/2004 |
| JP | 2006-065148 | 3/2006 |
| JP | 2006-251602 | 9/2006 |
| JP | 2007-121430 | 5/2007 |
| JP | 2008-268914 | 11/2008 |
| JP | 2008-299019 | 12/2008 |
| JP | 2009-198691 | 9/2009 |
| JP | 2009-294376 | 12/2009 |
| JP | 2010-199501 | 9/2010 |
| WO | 98/40871 | 9/1998 |
| WO | 2010/001590 | 1/2010 |
| WO | 2011/086597 | 7/2011 |
| WO | 2012/172604 | 12/2012 |
| WO | 2012/172607 | 12/2012 |
| WO | 2012/176241 | 12/2012 |
| WO | 2013/008272 | 1/2013 |

OTHER PUBLICATIONS

Office Action in U.S. Appl. No. 13/467,462, mailed Aug. 28, 2013.
Extended European Search Report from the European Patent Office (E.P.O.), mailed Jun. 17, 2014, for the related European Patent Application No. 11846054.2.
Extended European Search Report from the European Patent Office, mailed Oct. 9, 2014, in related European Patent Application No. 11867592.5.
Extended European Search Report from the European Patent Office, mailed Oct. 29, 2014, in related European Patent Application No. 11869299.5.
Japan Office Action, mailed Nov. 26, 2013, in the corresponding Japanese Application 2010-525132.
U.S. Office Action, mailed Sep. 11, 2013, in related U.S. Appl. No. 13/157,577.
Office Action, mailed Feb. 24, 2014, in related U.S. Appl. No. 13/467,462.
International Search Report for related International Application PCT/JP2010/000149, mailed Feb. 9, 2010.
International Search Report for related International Application PCT/JP2011/003424, mailed Sep. 27, 2011.
International Search Report for related International Application PCT/JP2011/003432, mailed Sep. 27, 2011.
International Search Report for related International Application PCT/JP2011/003979, mailed Aug. 16, 2011.
International Search Report for related International Application PCT/JP2011/003609, mailed Sep. 20, 2011.
International Search Report for related International Application PCT/JP2011/003989, mailed Aug. 9, 2011.
Official Action in related U.S. Appl. No. 13/157,577, mailed Jan. 24, 2013.
China Office Action with Search Report (including English language translation of Search Report), mailed Feb. 10, 2015, for related Chinese Patent Application No. 201180004566.6.
Japan Office Action, mailed Mar. 24, 2015 in related Japanese Patent Application No. 2012-502383.
Chinese Office Action, mailed May 28, 2015, in corresponding Chinese Patent Application No. 201180032663.6 (including English language translation of Search Report).

* cited by examiner

| Video data (Gradation level) | Required voltage (Red) | Required voltage (Green) | Required voltage (Blue) |
|---|---|---|---|
| 255 | 11.2 | 12.2 | 8.4 |

FIG. 7

| Potential difference value [V] | Voltage drop margin |
|---|---|
| 0.0 | 0.0 |
| 0.2 | 0.2 |
| 0.4 | 0.4 |
| 0.6 | 0.6 |
| ⋮ | ⋮ |
| 3.4 | 3.4 |
| 3.6 | 3.6 |
| ⋮ | ⋮ |
| 5.6 | 5.6 |
| 5.8 | 5.8 |
| 6.0 | 6.0 |

FIG. 22

| Video data (Gradation level) | Required voltage (Red) | Required voltage (Green) | Required voltage (Blue) |
|---|---|---|---|
| 0 | 4 | 4.2 | 3.5 |
| 1 | 4.1 | 4.3 | 3.5 |
| 2 | 4.1 | 4.4 | 3.6 |
| 3 | 4.2 | 4.5 | 3.6 |
| ⋮ | ⋮ | ⋮ | ⋮ |
| 176 | 8.3 | 9.6 | 6.7 |
| 177 | 8.5 | 9.9 | 6.9 |
| ⋮ | ⋮ | ⋮ | ⋮ |
| 253 | 10.5 | 11.4 | 8.2 |
| 254 | 10.8 | 11.8 | 8.3 |
| 255 | 11.2 | 12.2 | 8.4 |

DISPLAY DEVICE

CROSS REFERENCE TO RELATED APPLICATION

This is a continuation application of PCT Patent Application No. PCT/JP2011/003979 filed on Jul. 12, 2011, designating the United States of America. The entire disclosure of the above-identified application, including the specification, drawings and claims are incorporated herein by reference in its entirety.

FIELD

One or more exemplary embodiments disclosed herein relate generally to active-matrix display devices which use current-driven luminescence elements represented by organic electroluminescence (EL) elements, and more particularly to a display device having excellent power consumption reducing effect.

BACKGROUND

In general, the luminance of an organic electroluminescence (EL) element is dependent upon the drive current supplied to the element, and the luminance of the element increases in proportion to the drive current. Therefore, the power consumption of displays made up of organic EL elements is determined by the average of display luminance. Specifically, unlike liquid crystal displays, the power consumption of organic EL displays varies significantly depending on the displayed image.

For example, in an organic EL display, the highest power consumption is required when displaying an all-white image, whereas, in the case of a typical natural image, power consumption which is approximately 20 to 40 percent of that for all-white is considered to be sufficient.

However, because power source circuit design and battery capacity entail designing which assumes the case where the power consumption of a display becomes highest, it is necessary to consider power consumption that is 3 to 4 times that for the typical natural image, and thus becoming a hindrance to the lowering of power consumption and the miniaturization of devices.

Consequently, there is conventionally proposed a technique which suppresses power consumption with practically no drop in display luminance, by detecting the peak value of video data and regulating the cathode voltage of the organic EL elements based on such detected data so as to reduce power source voltage (for example, see Patent Literature (PTL) 1).

Citation List

Patent Literature

[PTL 1] Unexamined Japanese Patent Application Publication No. 2006-065148

SUMMARY

Technical Problem

Now, since an organic EL element is a current-driven element, current flows through a power source wire and a voltage drop which is proportionate to the wire resistance occurs. As such, the power supply voltage to be supplied to the display is set by adding a voltage drop margin for compensating for a voltage drop. In the same manner as the previously described power source circuit design and battery capacity, since the power drop margin for compensating for a voltage drop is set assuming the case where the power consumption of the display becomes highest, unnecessary power is consumed for typical natural images.

In a small-sized display intended for mobile device use, panel current is small and thus, compared to the voltage to be consumed by pixels, the power drop margin for compensating for a voltage drop is negligibly small. However, when current increases with the enlargement of panels, the voltage drop occurring in the power source wire no longer becomes negligible.

However, in the conventional technique in the above-mentioned Patent Literature 1, although power consumption in each of the pixels can be reduced, the power drop margin for compensating for a voltage drop cannot be reduced, and thus the power consumption reducing effect for household large-sized display devices of 30-inches and above is insufficient.

One non-limiting and exemplary embodiment provides a display device having excellent power consumption reducing effect.

Solution to Problem

In one general aspect, the techniques disclosed herein feature a display device including: a power supplying unit configured to output at least one of a high-side output potential and a low-side output potential; a display unit in which pixels are arranged in a matrix and which receives power supply from the power supplying unit; a detecting line which is arranged along a row direction or a column direction of the pixels arranged in the matrix, has one end connected to at least one of the pixels inside the display unit, and is for transmitting a high-side potential or a low-side potential to be applied to the at least one pixel; and a voltage regulating unit connected to the other end of the detecting line and configured to regulate at least one of the high-side output potential and the low-side output potential that are to be outputted by the power supplying unit, to set any one of the following potential differences to a predetermined potential difference: a potential difference between the high-side potential and a reference potential; a potential difference between the low-side potential and a reference potential; and a potential difference between the high-side potential and the low-side potential.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The display device according to one or more exemplary embodiments or features disclosed herein enables the implementation of a display device having excellent power consumption reducing effect.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a chart showing an example of a voltage margin conversion table.

FIG. 22 is a chart showing an example of a required voltage conversion table.

DESCRIPTION OF EMBODIMENTS

Figure 1:
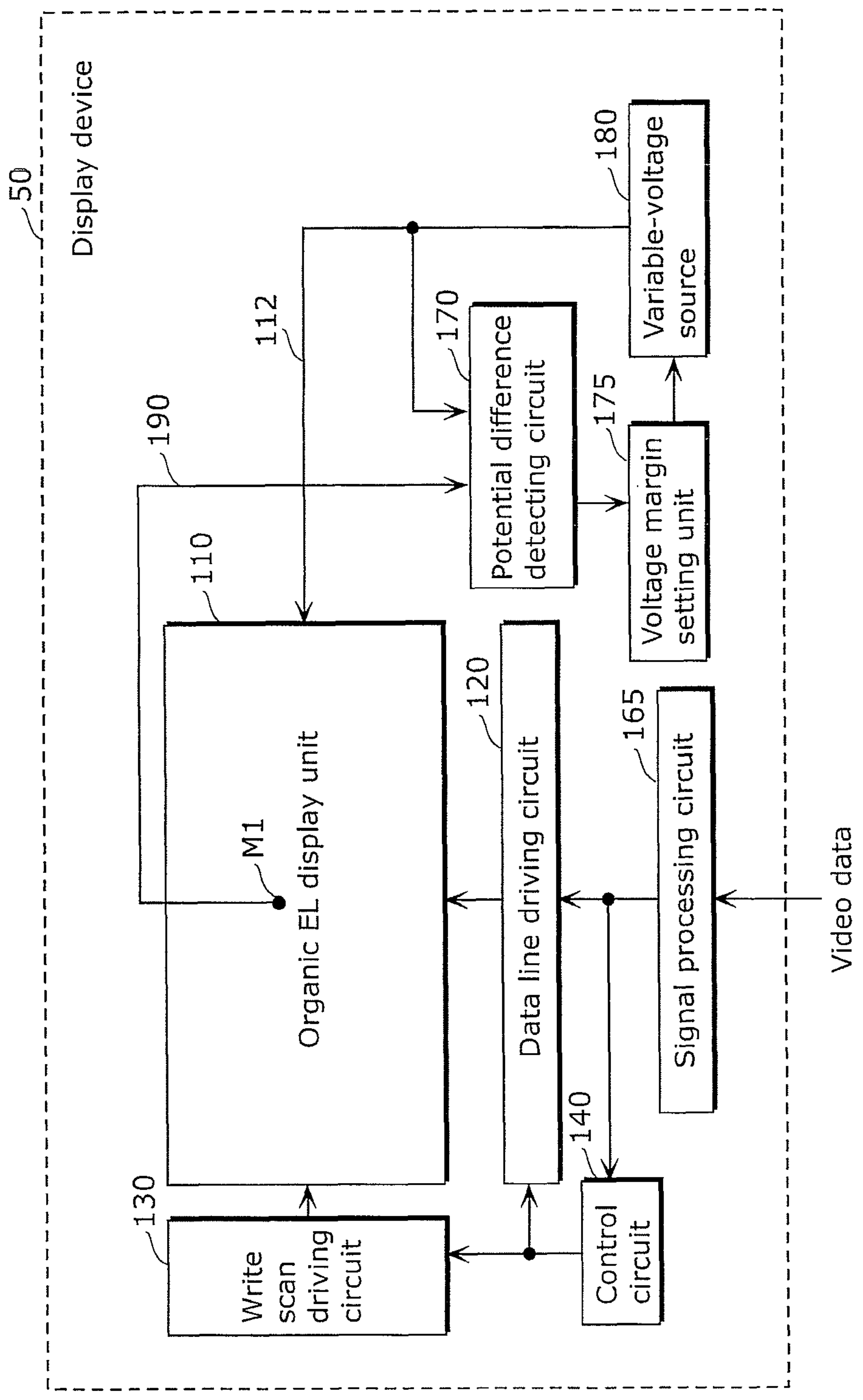
FIG. 1 is a block diagram showing an outline configuration of a display device according to Embodiment 1 disclosed herein.

A display device according to a general aspect of the present disclosure includes: a power supplying unit which outputs at least one of a high-side output potential and a low-side output potential; a display unit in which pixels are arranged in a matrix and which receives power supply from the power supplying unit; a detecting line which is arranged along a row direction or a column direction of the pixels arranged in the matrix, has one end connected to at least one of the pixels inside the display unit, and is for transmitting a high-side potential or a low-side potential to be applied to the at least one pixel; and a voltage regulating unit connected to the other end of the detecting line and which regulates at least one of the high-side output potential and the low-side output potential that are to be outputted by the power supplying unit, to set any one of the following potential differences to a predetermined potential difference: a potential difference between the high-side potential and a reference potential; a potential difference between the low-side potential and a reference potential; and a potential difference between the high-side potential and the low-side potential.

Accordingly, by regulating at least one of the high-side output potential of the power supplying unit and the low-side output potential of the power supplying unit in accordance with the amount of voltage drop occurring from the power supplying unit to at least one pixel, power consumption can be reduced. Furthermore, since the detecting line for detecting the potential of a pixel is arranged in the row direction or column direction of the pixel, the potential of the pixel can be detected without changing the matrix arrangement of the pixels.

Furthermore, a display device according to an aspect of the present disclosure may include detecting lines each of which is the detecting line, wherein the detecting lines may include at least (i) three or more high-potential detecting lines each of which is for transmitting the high-side potential to be applied to a corresponding one of three or more of the pixels, or (ii) three or more low-potential detecting lines each of which is for transmitting the low-side potential to be applied to a corresponding one of three or more of the pixels, and at least (i) the high-potential detecting lines or (ii) the low-potential detecting lines may be arranged with equal intervals between adjacent ones of the detecting lines.

Accordingly, at least one of the high-side output potential of the power supplying unit and the low-side output potential of the power supplying unit can be regulated more appropriately, and power consumption can be reduced effectively even when the display unit is increased in size. Furthermore, since the detecting lines are arranged with equal intervals, it is possible to have periodicity in the wiring layout of the display unit, and thus manufacturing efficiency improves.

Furthermore, in a display device according to an aspect of the present disclosure, each of the pixels may include: a driving element having a source electrode and a drain electrode; and a luminescence element having a first electrode and a second electrode, the first electrode being connected to one of the source electrode and the drain electrode of the driving element, the high-side potential may be applied to one of the second electrode and the other of the source electrode and the drain electrode, and the low-side potential may be applied to the other of the second electrode and the other of the source electrode and the drain electrode.

Furthermore, a display device according to an aspect of the present disclosure may further include: a first power source line and a second power source line, the first power source line electrically connecting the others of the source electrode and the drain electrode of the respective driving elements of adjacent pixels in at least one of the row direction and the column direction, and the second power source line electrically connecting the second electrodes of the respective luminescence elements of adjacent pixels in the row direction and the column direction, wherein the pixels may receive the power supply from the power supplying unit via the first power source line and the second power source line.

Furthermore, in a display device according to an aspect of the present disclosure, the detecting line may be formed in the same layer as the first power source line.

Accordingly, since the detecting line is formed in the same process as the first power source line, the manufacturing process of the display panel does not become complicated.

Furthermore, a display device according to an aspect of the present disclosure may further include: control lines formed in the same layer as the detecting line and arranged along the row direction or the column direction, for controlling the pixels, wherein the control lines may be arranged with equal intervals between (i) the detecting line and one of the control lines adjacent to the detecting line and (ii) adjacent ones of the control lines.

Accordingly, since the control lines are arranged in the row direction, column direction, or in a grid, some columns of the control lines arranged in the column direction, for example, can be converted into detecting lines. Therefore, regular patterns such as the pixel pitch and the wire width of the pixels do not change with the provision of the pixels to which the detecting lines are connected, and thus display-related unpleasantness is eliminated and boundaries are not readily visible.

Furthermore, in a display device according to an aspect of the present disclosure, the detecting line may be formed in the same process as the control lines.

Accordingly, the manufacturing process of the display panel does not become complicated.

Furthermore, in a display device according to an aspect of the present disclosure, an insulating layer may be formed between a layer in which the first power source line is formed and a layer in which the second power source line is formed, and the one end of the detecting line may be connected to the second electrode via a contact part formed in the insulating layer.

Accordingly, in the case where the potential of the second power source line is to be detected and the regularity of the pixels is disrupted and boundaries become visible when the detecting line is provided in the same layer as the layer in which the second power source line is disposed, the detecting line for detecting the potential of the second power source line is laid out in the layer in which the first power source line is disposed which is a different layer from the layer in which the second power source line is disposed. In other words, the detecting line is formed in the same layer as the first power source line. It should be noted that, the detecting point for the potential of the second power source line and the detecting line are electrically connected by the contact part formed in the insulating layer. Accordingly, since the detecting line is laid out in a layer that is different from the layer in which the second power source line is disposed, the regularity of the pixels is not disrupted and boundaries are not readily visible.

Furthermore, a display device according to an aspect of the present disclosure may further include: supplementary electrode lines arranged along the row direction or the column direction and electrically connected to the second power source line, wherein the detecting line may be formed in the same layer as the supplementary electrode lines, and an insulating film may be formed between the detecting line and the first power source line.

Accordingly, since the detecting line is formed in the same layer as the supplementary electrode lines, there is no need to provide a separate layer for the detecting line, and thus the manufacturing process of the display panel does not become complicated.

Furthermore, in a display device according to an aspect of the present disclosure, the detecting line may be formed in the same layer as the first electrode.

Accordingly, since the detecting line is formed in the same layer as the supplementary electrode lines and the first electrode, there is no need to provide a separate layer for the detecting line, and thus the manufacturing process of the display panel does not become complicated.

Furthermore, in a display device according to an aspect of the present disclosure, the supplementary electrode lines may be arranged with equal intervals between (i) the detecting line and one of the supplementary electrode lines adjacent to the detecting line and (ii) adjacent ones of the supplementary electrode lines.

Accordingly, since the supplementary electrode lines are arranged in the row direction or the column direction, some columns of the supplementary electrode lines arranged in the column direction, for example, can be converted into detecting lines. Therefore, regular patterns such as the pixel pitch and the wire width of the pixels do not change with the provision of the pixels to which the supplementary electrode lines are connected, and thus display-related unpleasantness is eliminated and boundaries are not readily visible.

Furthermore, in a display device according to an aspect of the present disclosure, the detecting line may be formed in the same process as the supplementary electrode lines.

Accordingly, since the detecting line is formed in the same process as the supplementary electrode lines, the manufacturing process of the display panel does not become complicated.

Furthermore, in a display device according to an aspect of the present disclosure, the detecting line may be arranged to have a shortest distance between the at least one pixel inside the display unit and a power supply unit disposed at a periphery of the display unit.

Accordingly, the line defect caused by the detecting line is shortened and becomes is not readily noticeable.

Furthermore, in a display device according to an aspect of the present disclosure, the detecting line may be formed in a predetermined layer different from layers in which the luminescence element, the first power source line, and the second power source line are formed, and the detecting line has a wiring area in the predetermined layer that is larger than a wiring area of an electrical wire other than the detecting line.

Accordingly, by providing the detecting line in a predetermined layer that is different from the layer in which the first power source line and the second power source line are disposed, regular patterns such as the pixel pitch and the wire width of the pixels or the area and wire width of the pixel circuit element do not change, and thus display-related unpleasantness is eliminated and boundaries are not readily visible. Furthermore, the degree of freedom in the detecting line layout increases and, for example, high-potential detecting lines and low-potential detecting lines can be arranged in the same layer.

Furthermore, in a display device according to an aspect of the present disclosure, the luminescence element may be an organic electroluminescence (EL) element.

Accordingly, since heat generation can be suppressed through the reduction of power consumption, the deterioration of the organic EL element can be suppressed.

These general and specific aspects may be implemented using a system, a method, an integrated circuit, a computer program, or a computer-readable recording medium such as a CD-ROM, or any combination of systems, methods, integrated circuits, computer programs, or computer-readable recording media. Hereinafter, certain exemplary embodiments are described in greater detail with reference to the accompanying Drawings. It is to be noted that, in all the figures, the same reference numerals are given to the same or corresponding elements and redundant description thereof shall be omitted.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

A display device according to this embodiment includes: a power supplying unit which outputs a high-side output potential and a low-side output potential; a display unit in which pixels are arranged in a matrix and which receives power supply from the power supplying unit; a detecting line which is arranged along a row direction or a column direction of the pixels arranged in the matrix, has one end connected to at least one of the pixels inside the display unit, and is for transmitting a high-side potential or a low-side potential to be applied to the at least one pixel; and a voltage regulating unit connected to the other end of the detecting line and which regulates at least one of the high-side output potential and the low-side output potential that are to be outputted by the power supplying unit, to set a potential difference between the high-side potential and the low-side potential to be applied to the at least one pixel to a predetermined potential difference.

Accordingly, the display device according to this embodiment realizes excellent power consumption reducing effect.

Hereinafter, Embodiment 1 shall be specifically described with reference to the Drawings.

FIG. 1 is a block diagram showing an outline configuration of the display device according to Embodiment 1.

A display device 50 shown in the figure includes an organic electroluminescence (EL) display unit 110, a data line driving circuit 120, a write scan driving circuit 130, a control circuit 140, a signal processing circuit 165, a potential difference detecting circuit 170, a voltage margin setting unit 175, a variable-voltage source 180, and a monitor wire 190.

Figure 2:
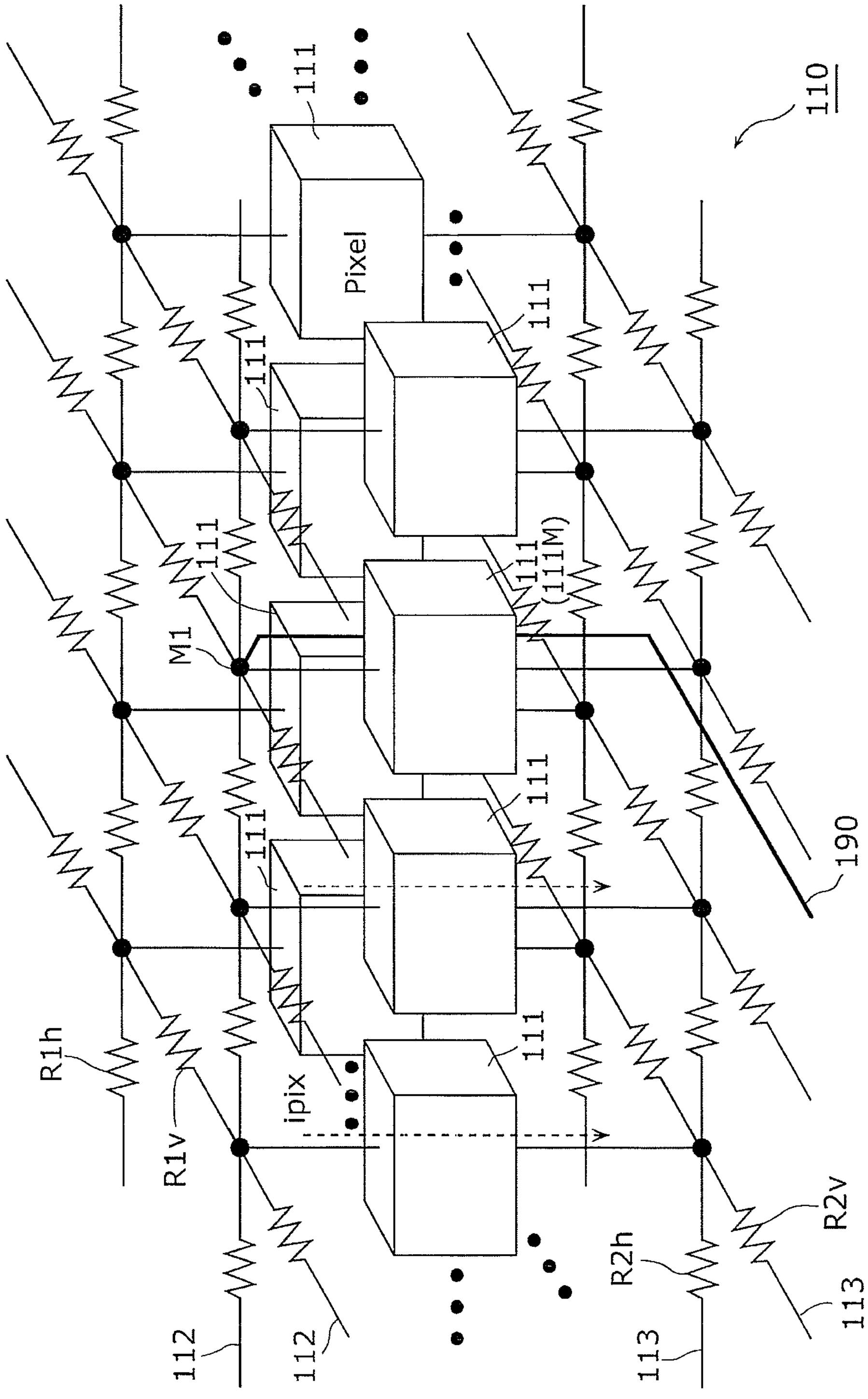
FIG. 2 is a perspective view schematically showing a configuration of an organic EL display unit according to Embodiment 1.

FIG. 2 is a perspective view schematically showing a configuration of the organic EL display unit 110 according to Embodiment 1. It is to be noted that the lower portion of the figure is the display screen side.

As shown in the figure, the organic EL display unit 110 includes the pixels 111, the first power source wire 112, and the second power source wire 113.

Each pixel 111 is connected to the first power source wire 112 and the second power source wire 113, and produces luminescence at a luminance that is in accordance with a pixel current ipix that flows to the pixel 111. At least one predetermined pixel out of the pixels 111 is connected to the monitor wire 190 at a detecting point M1. Hereinafter, the pixel 111 that is directly connected to the monitor wire 190 shall be denoted as monitor pixel 111M. The monitor pixel 111M is located near the center of the organic EL display unit 110. It is to be noted that near the center includes the center and the surrounding parts thereof.

The first power source wire 112 is a first power source wire arranged in a net-like manner, and a potential corresponding to the high-side potential outputted by the variable-voltage source 180 is applied to the first power source wire 112. On the other hand, the second power source wire 113 is a second power source line formed in the form of a continuous film on the organic EL display unit 110, and a potential corresponding to the potential outputted by the variable-voltage source 180 is applied to the second power source wire 113 from the periphery of the organic EL display unit 110. In FIG. 2, the first power source wire 112 and the second power source wire 113 are schematically illustrated in mesh-form in order to show the resistance components of the first power source wire 112 and the second power source wire 113. It is to be noted that the second power source wire 113 is, for example, a grounding wire, and may be grounded to a common grounding potential of the display device 100, at the periphery of the organic EL display unit 110.

A horizontal first power source wire resistance R1*h* and a vertical first power source wire resistance R1*v* are present in the first power source wire 112. A horizontal second power source wire resistance R2*h* and a vertical second power source wire resistance R2*v* are present in the second power source wire 113. It is to be noted that, although not illustrated, each of the pixels 111 is connected to the write scan driving circuit 130 and the data line driving circuit 120, and is also connected to a scanning line for controlling the timing at which the pixel produces luminescence and stops producing luminescence, and to a data line for supplying signal voltage corresponding to the pixel luminance of the pixel 111.

Figure 3:
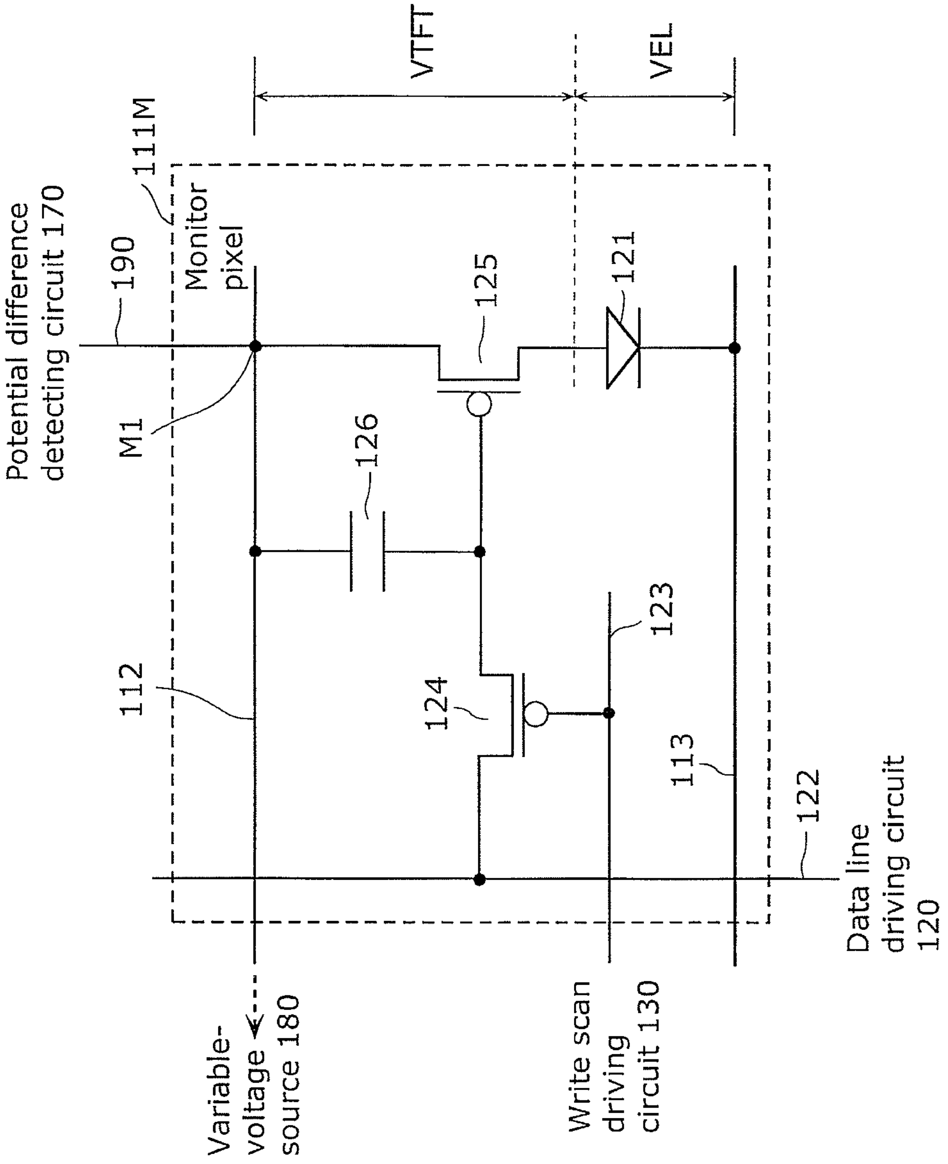
FIG. 3 is a circuit diagram showing an example of a specific configuration of monitor pixel.

FIG. 3 is a circuit diagram showing an example of a specific configuration of the monitor pixel 111M.

The pixel 111 shown in the figure includes a driving element and a luminescence element. The driving element includes a source electrode and a drain electrode. The luminescence element includes a first electrode and a second electrode. The first electrode is connected to one of the source electrode and the drain electrode of the driving element. The high-side potential is applied to one of (i) the other of the source electrode and the drain electrode and (ii) the second electrode, and the low-side potential is applied to the other of (i) the other of the source electrode and the drain electrode and (ii) the second electrode. Specifically, each of the pixels 111 includes an organic EL element 121, a data line 122, a scanning line 123, a switch transistor 124, a driving transistor 125, and a holding capacitor 126. The pixels 111 are, for example, arranged in a matrix in the organic EL display unit 110.

The organic EL element 121, which is the luminescent element, has an anode electrode connected to the drain of the driving transistor 125 and a cathode electrode connected to the second power source wire 113, and produces luminescence with a luminance that is in accordance with the current value flowing between the anode electrode and the cathode electrode. The cathode electrode of the organic EL element 121 forms part of a common electrode provided in common to the pixels 111. The common electrode is electrically connected to the variable-voltage source 180 so that potential is applied to the common electrode from the periphery thereof. Specifically, the common electrode functions as the second power source wire 113 in the organic EL display unit 110. Furthermore, the cathode electrode is formed from a transparent conductive material made of a metallic oxide. It is to be noted that the anode electrode of the organic EL element 121 is the first electrode, and the cathode electrode of the organic EL element 121 is the second electrode.

The data line 122 is connected to the data line driving circuit 120 and one of the source and the drain of the switch transistor 124, and signal voltage corresponding to the video data is applied to the data line 122 by the data line driving circuit 120.

The scanning line 123 is connected to the write scan driving circuit 130 and the gate of the switch transistor 124, and turns the switching transistor 1240N and OFF according to the voltage applied by the write scan driving circuit 130.

The switching transistor 124 has one of a source and a drain connected to the data line 122, the other of the source and the drain connected to the gate of the driving transistor 125 and one end of the holding capacitor 126, and is, for example, a P-type thin-film transistor (TFT).

The driving transistor 125, which is the driving element, has a source connected to the first power source wire 112, a drain connected to the anode of the organic EL element 121, a and a gate connected to one end of the holding capacitor 126 and the other of the source and the drain of the switch transistor 124, and is, for example, a P-type TFT. With this, the driving transistor 125 supplies the organic EL element 121 with current that is in accordance with the voltage held in the holding capacitor 126. Furthermore, in the monitor pixel 111M, the source of the driving transistor 125 is connected to the monitor wire 190.

The holding capacitor 126 has the one end connected to the other of the source and the drain of the switch transistor 124, and the other end connected to the first power source wire 112, and holds the potential difference between the potential of the first power source wire 112 and the potential of the gate of the driving transistor 125 when the switch transistor 124 is turned OFF. Specifically, the holding capacitor 126 holds a voltage corresponding to the signal voltage.

The data line driving circuit 120 outputs signal voltage corresponding to video data, to the pixels 111 via the data lines 122.

The write scan driving circuit 130 sequentially scans the pixels 111 by outputting a scanning signal to scanning lines 123. Specifically, the switch transistors 124 are turned ON and OFF on a row-basis. With this, the signal voltages outputted to the data lines 122 are applied to the pixels 111 in the row selected by the write scan driving circuit 130. Therefore, the pixels 111 produce luminescence with a luminance that is in accordance with the video data.

The control circuit 140 instructs the drive timing to each of the data line driving circuit 120 and the write scan driving circuit 130.

The signal processing circuit 165 outputs, to the data line driving circuit 120, a signal voltage corresponding to inputted video data.

The potential difference detecting circuit 170, which is the voltage measuring unit in this embodiment, measures, for the monitor pixel 111M, the high-side potential to be applied to the monitor pixel 111M. Specifically, the potential difference detecting circuit 170 measures, via the monitor wire 190, the high-side potential to be applied to the monitor pixel 111M. Specifically, the potential difference detecting circuit 170 measures the potential at the detecting point M1. In addition, the potential difference detecting circuit 170 measures the high-side output potential of the variable-voltage source 180, and measures the potential difference ΔV between the measured high-side potential to be applied to the monitor pixel 111M and the high-side output potential of the variable-voltage source 180. Subsequently, the potential difference detecting circuit 170 outputs the measured potential difference ΔV to the voltage margin setting unit 175.

The voltage margin setting unit 175, which is the voltage regulating unit in this embodiment, regulates, based on a voltage (VEL+VTFT) at a peak gradation level and the potential difference ΔV detected by the potential difference detecting circuit 170, the variable-voltage source 180 to set the potential of the monitor pixel 111M to a predetermined potential. Specifically, the voltage margin setting unit 175 calculates a voltage drop margin Vdrop based on the potential difference detected by the potential difference detecting circuit 170. Subsequently, the voltage margin setting unit 175 sums up the voltage (VEL+VTFT) at the peak gradation level and the voltage drop margin Vdrop, and outputs the summation result VEL+VTFT+Vdrop, as the potential of a first reference voltage Vref1A, to the variable-voltage source 180.

The variable-voltage source 180, which is the power supplying unit in this embodiment, outputs the high-side potential and the low-side potential to the organic EL display unit 110. The variable-voltage source 180 outputs an output voltage Vout for setting the high-side potential of the monitor pixel 111M to the predetermined potential (VEL+VTFT), according to the first reference voltage Vref1A outputted by the voltage margin setting unit 175.

The monitor wire 190 is a detecting line which is provided along the row direction or column direction of the matrix of the organic EL display unit, has one end connected to the monitor pixel 111M and the other end connected to the potential difference detecting circuit 170, and transmits the high-side potential applied to the monitor pixel 111M.

Next, a detailed configuration of the variable-voltage source 180 shall be briefly described.

Figure 4:
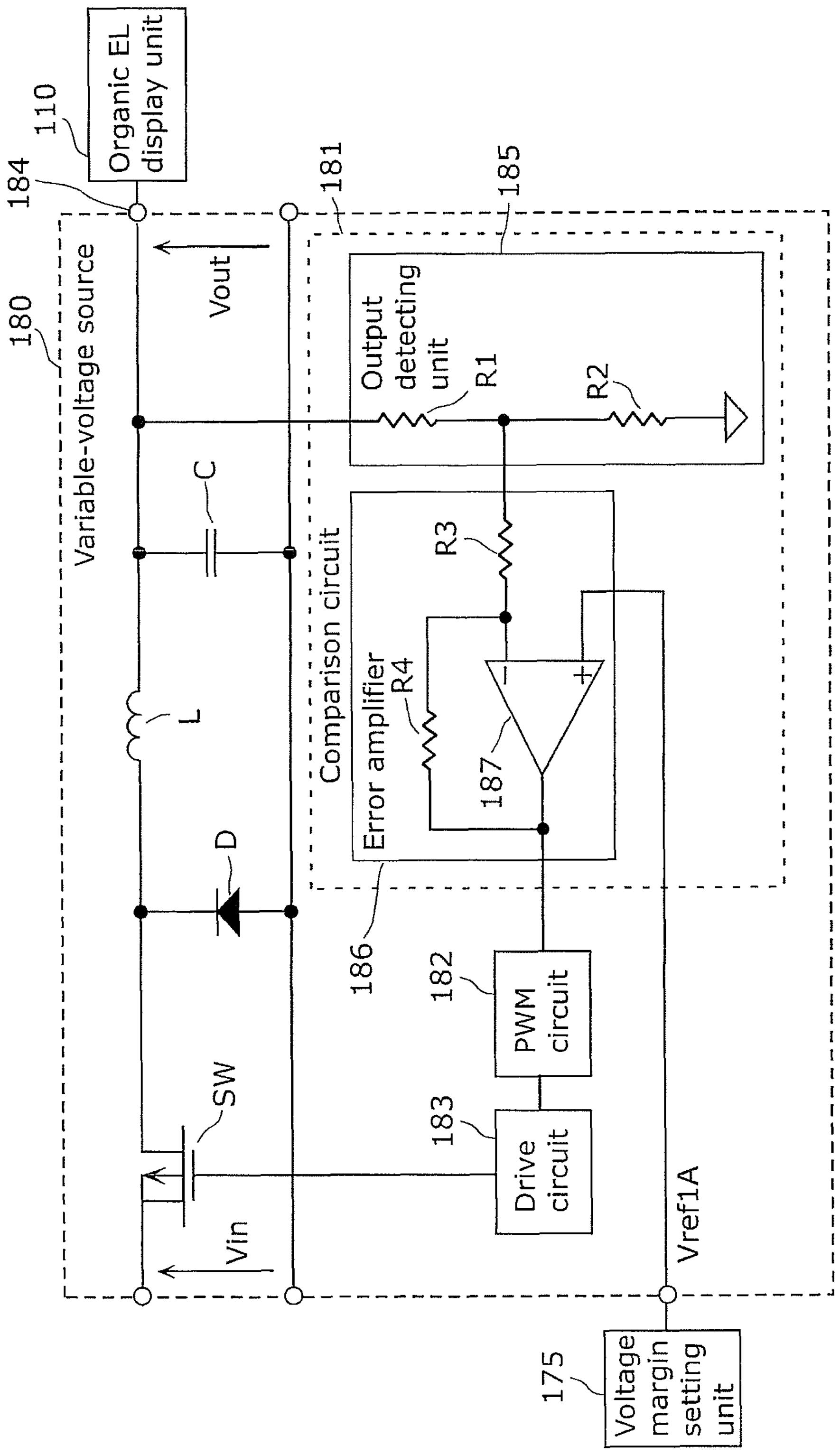
FIG. 4 is a block diagram showing an example of a specific configuration of a variable-voltage source according to Embodiment 1.

FIG. 4 is a block diagram showing an example of a specific configuration of a variable-voltage source according to Embodiment 1. It is to be noted that the organic EL display unit 110 and the voltage margin setting unit 175 which are connected to the variable-voltage source are also shown in the figure.

The variable-voltage source 180 shown in the figure includes a comparison circuit 181, a pulse width modulation (PWM) circuit 182, a drive circuit 183, a switching element SW, a diode D, an inductor L, a capacitor C, and an output terminal 184, and converts an input voltage Vin into an output voltage Vout which is in accordance with the first reference voltage Vref1A, and outputs the output voltage Vout from the output terminal 184. It is to be noted that, although not illustrated, an AC-DC converter is provided in a stage ahead of an input terminal to which the input voltage Vin is inputted, and it is assumed that conversion, for example, from 100V AC to 20V DC is already carried out.

The comparison circuit 181 includes an output detecting unit 185 and an error amplifier 186, and outputs a voltage that is in accordance with the difference between the output voltage Vout and the first reference voltage Vref1A, to the PWM circuit 182.

The output detecting unit 185, which includes two resistors R1 and R2 provided between the output terminal 184 and a grounding potential, voltage-divides the output voltage Vout in accordance with the resistance ratio between the resistors R1 and R2, and outputs the voltage-divided output voltage Vout to the error amplifier 186.

The error amplifier 186 compares the Vout that has been voltage-divided by the output detection unit 185 and the first reference voltage Vref1A outputted by the voltage margin setting unit 175, and outputs, to the PWM circuit 182, a voltage that is in accordance with the comparison result. Specifically, the error amplifier 186 includes the operational amplifier 187 and the resistors R3 and R4. The operational amplifier 187 has an inverting input terminal connected to the output detecting unit 185 via the resistor R3, a non-inverting input terminal connected to the voltage margin setting unit 175, and an output terminal connected to the PWM circuit 182. Furthermore, the output terminal of the operational amplifier 187 is connected to the inverting input terminal via the resistor R4. With this, the error amplifier 186 outputs, to the PWM circuit 182, a voltage that is in accordance with the potential difference between the voltage inputted from the output detecting unit 185 and the first reference voltage Vref1A inputted from the voltage margin setting unit 175. Stated differently, the error amplifier 186 outputs, to the PWM circuit 182, a voltage that is in accordance with the potential difference between the output voltage Vout and the first reference voltage Vref1A.

The PWM circuit 182 outputs, to the drive circuit 183, pulse waveforms having different duties depending on the voltage outputted by the comparison circuit 181. Specifically, the PWM circuit 182 outputs a pulse waveform having a long ON duty when the voltage outputted by the comparison circuit 181 is large, and outputs a pulse waveform having a short ON duty when the outputted voltage is small. Stated differently, the PWM circuit 182 outputs a pulse waveform having a long ON duty when the potential difference between the output voltage Vout and the first reference voltage Vref1A is big, and outputs a pulse waveform having a short ON duty when the potential difference between the output voltage Vout and the first reference voltage Vref1A is small. It is to be noted that the ON period of a pulse waveform is a period in which the pulse waveform is active.

The drive circuit 183 turns ON the switch SW during the period in which the pulse waveform outputted by the PWM circuit 182 is active, and turns OFF the switch SW during the period in which the pulse waveform outputted by the PWM circuit 182 is inactive.

The switch SW is turned ON and OFF by the drive circuit 183. The input voltage Vin is outputted, as the output voltage Vout, to the output terminal 184 via the inductor L and the capacitor C only while the switch SW is ON. Accordingly, from 0V, the output voltage Vout gradually approaches 20V (Vin). At this time the inductor L and the capacitor C are charged. Since voltage is applied (charged) to both ends of the inductor L, the output voltage Vout becomes a potential which is lower than the input voltage Vin by such voltage.

As the output voltage Vout approaches the first reference voltage Vref1A, the voltage inputted to the PWM circuit 182 becomes smaller, and the ON duty of the pulse signal outputted by the PWM circuit 182 becomes shorter.

Then, the time in which the switching element SW is ON also becomes shorter, and the output voltage Vout gently converges with the first reference voltage Vref1A.

The potential of the output voltage Vout, while having slight voltage fluctuations, eventually settles to a potential in the vicinity of Vout=Vref1A.

In this manner, the variable-voltage source 180 generates the output voltage Vout which becomes the first reference voltage Vref1A outputted by the voltage margin setting unit 175, and supplies the output voltage Vout to the organic EL display unit 110.

Figures 5, 6:
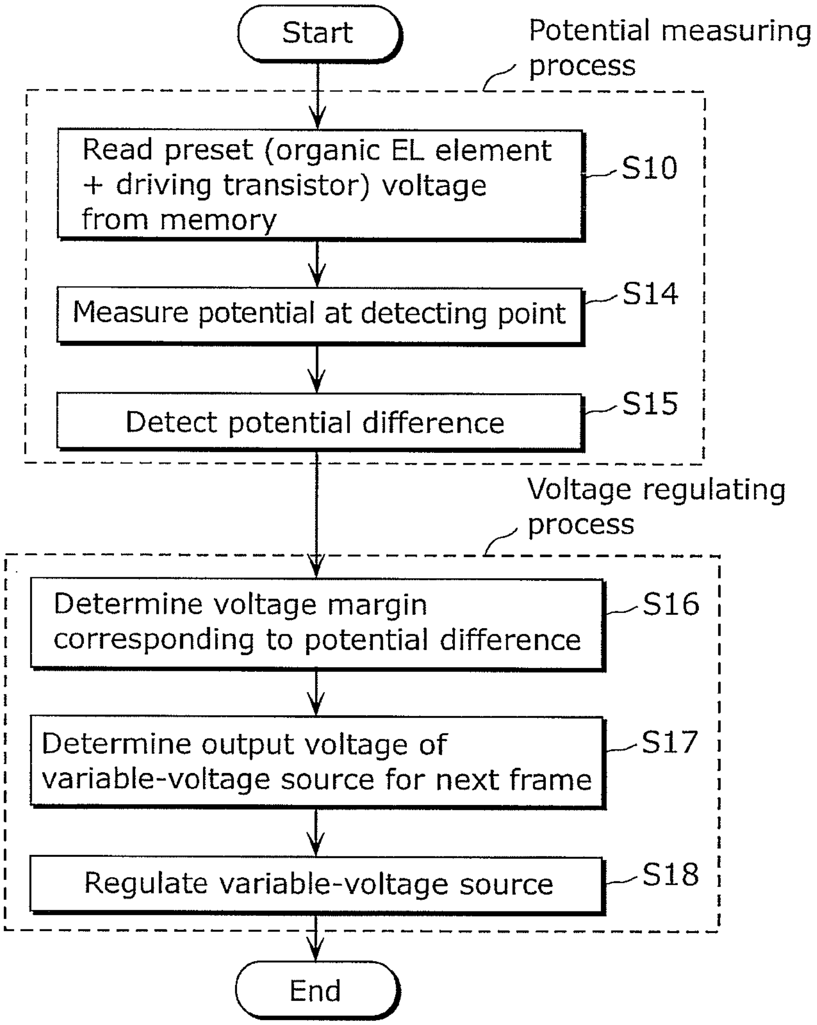
FIG. 5 is a flowchart showing the operation of the display device according to Embodiment 1.
FIG. 6 is a chart showing an example of a required voltage conversion table according to Embodiment 1.

Next, the operation of the aforementioned display device 50 shall be described using FIG. 5 to FIG. 7.

FIG. 5 is a flowchart showing the operation of the display device 50 according to the present disclosure.

First, the voltage margin setting unit 175 reads, from a memory, the preset voltage (VEL+VTFT) corresponding to the peak gradation level (step S10). Specifically, voltage margin setting unit 175 determines the VTFT+VEL corresponding to the gradation levels for each color, using a required voltage conversion table indicating the required voltage VTFT+VEL corresponding to the gradation levels for each color.

FIG. 6 is a chart showing an example of a required voltage conversion table which is referenced by the voltage margin setting unit 175. As shown in the figure, required voltages VTFT+VEL respectively corresponding to the peak gradation level (gradation level 255) are stored in the required voltage conversion table. For example, the required voltage at the peak gradation level of R is 11.2 V, the required voltage at the peak gradation level of G is 12.2 V, and the required voltage at the peak gradation level of B is 8.4 V. Among the required voltages at the peak gradation levels of the respective colors, the largest voltage is the 12.2 V of G. Therefore, the voltage margin setting unit 175 determines VTFT+VEL to be 12.2 V.

Meanwhile, the potential difference detecting circuit 170 detects the potential at the detecting point M1 via the monitor wire 190 (step S14).

Next, the potential difference detecting circuit 170 detects the potential difference ΔV between the potential of the output terminal 184 of the variable-voltage source 180 and the potential at the detecting point M1 (step S15). Subsequently, the potential difference detecting circuit 170 outputs the detected potential difference ΔV to the voltage margin setting unit 175. It is to be noted that the steps S10 to S15 up to this point correspond to the potential measuring process according to the present disclosure.

Next, the voltage margin setting unit 175 determines a voltage drop margin Vdrop corresponding to the potential difference ΔV detected by the potential difference detecting circuit 170, based on a potential difference signal outputted by the potential difference detecting circuit 170 (step S16). Specifically, the voltage margin setting unit 175 has a voltage margin conversion table indicating the voltage drop margin Vdrop corresponding to the potential difference ΔV.

FIG. 7 is a chart showing an example of the voltage margin conversion table that is referenced by the voltage margin setting unit 175. As shown in the figure, voltage drop margins Vdrop respectively corresponding to the potential differences ΔV are stored in the voltage margin conversion table. For example, when the potential difference ΔV is 3.4 V, the voltage drop margin Vdrop is 3.4 V. Therefore, the voltage margin setting unit 175 determines the voltage drop margin Vdrop to be 3.4 V.

Now, as shown in the voltage margin conversion table, the potential difference ΔV and the voltage drop margin Vdrop have an increasing function relationship. Furthermore, the output voltage Vout of the variable-voltage source 180 rises with a bigger voltage drop margin Vdrop. In other words, the potential difference ΔV and the output voltage Vout have an increasing function relationship.

Next, the voltage margin setting unit 175 determines the output voltage Vout that the variable-voltage source 180 is to be made to output in the next frame period (step S17). Specifically, the output voltage Vout that the variable-voltage source 180 is to be made to output in the next frame period is assumed to be VTFT+VEL+Vdrop which is the sum value of (i) VTFT+VEL determined in the determination (step S13) of the voltage required by the organic EL element 121 and the driving transistor 125 and (ii) the voltage drop margin Vdrop determined in the determination (step S15) of the voltage margin corresponding to the potential difference ΔV.

Lastly, the voltage margin setting unit 175 regulates the variable-voltage source 180 by setting the first reference voltage Vref1A as VTFT+VEL+Vdrop at the beginning of the next frame period (step S18). With this, in the next frame period, the variable-voltage source 180 supplies Vout=VTFT+VEL+Vdrop to the organic EL display unit 110. It is to be noted that step S16 to step S18 correspond to the voltage regulating process according to the present disclosure.

In this manner, the display device 50 according to this embodiment includes: the variable-voltage source 180 which outputs the high-side potential and the low-side potential; the potential difference detecting circuit 170 which measures, for the monitor pixel 111M in the organic EL display unit 110, (i) the high-side potential to be applied to the monitor pixel 111M and (ii) the high-side potential output voltage Vout of the variable-voltage source 180; and the voltage margin setting unit 175 which regulates the variable-voltage source 180 so as to set, to the predetermined potential (VTFT+VEL), the high-side potential that is applied to the monitor pixel 111M that is measured by the potential difference detecting circuit 170. Furthermore, the potential difference detecting circuit 170, in addition, measures the high-side potential output voltage Vout of the variable-voltage source 180, detects the potential difference between the measured high-side potential output voltage Vout and the high-side potential applied to the monitor pixel 111M. The voltage margin setting unit 175 regulates the variable-voltage source 180 in accordance with the potential difference detected by the potential difference detecting circuit 170.

With this, the display device 50 can reduce excess voltage and reduce power consumption by detecting the voltage drop caused by the horizontal first power source wire resistance R1*h* and a vertical first power source wire resistance R1*v* and giving feedback to the variable-voltage source 180 regarding the degree of such voltage drop.

Furthermore, in the display device 50, the monitor pixel 111M is located near the center of the organic EL display unit 110, and thus the output voltage Vout of the variable-voltage source 180 can be easily regulated even when the size of the organic EL display unit 110 is increased.

Furthermore, since heat generation by the organic EL element 121 is suppressed through the reduction of power consumption, the deterioration of the organic EL element 121 can be prevented.

Next, the display pattern transition in the case where the video data inputted up to the Nth frame changes from the N+1th frame onward, in the display device 50 described above, shall be described using FIG. 8 and FIG. 9.

Initially, the video data that is assumed to have been inputted in the Nth frame and the N+1th frame shall be described.

First, it is assumed that, up to the Nth frame, the video data corresponding to the central part of the organic EL display unit 110 is a peak gradation level (R:G:B=255:255:255) in which the central part of the organic EL display unit 110 is seen as being white. On the other hand, it is assumed that the video data corresponding to a part of the organic EL display unit 110 other than the central part is a gray gradation level (R:G:B=50:50:50) in which the part of the organic EL display unit 110 other than the central part is seen as being gray.

Furthermore, from the N+1th frame onward, it is assumed that the video data corresponding to the central part of the organic EL display unit 110 is the peak gradation level (R:G:B=255:255:255) as in the Nth frame. On the other hand, it is assumed that the video data corresponding to the part of the organic EL display unit 110 other than the central part is a gray gradation level (R:G:B=150:150:150) that can be seen as a brighter gray than in the Nth frame.

Next, the operation of the display device 50 in the case where video data as described above is inputted in the Nth frame and the N+1th frame shall be described.

Figure 8:
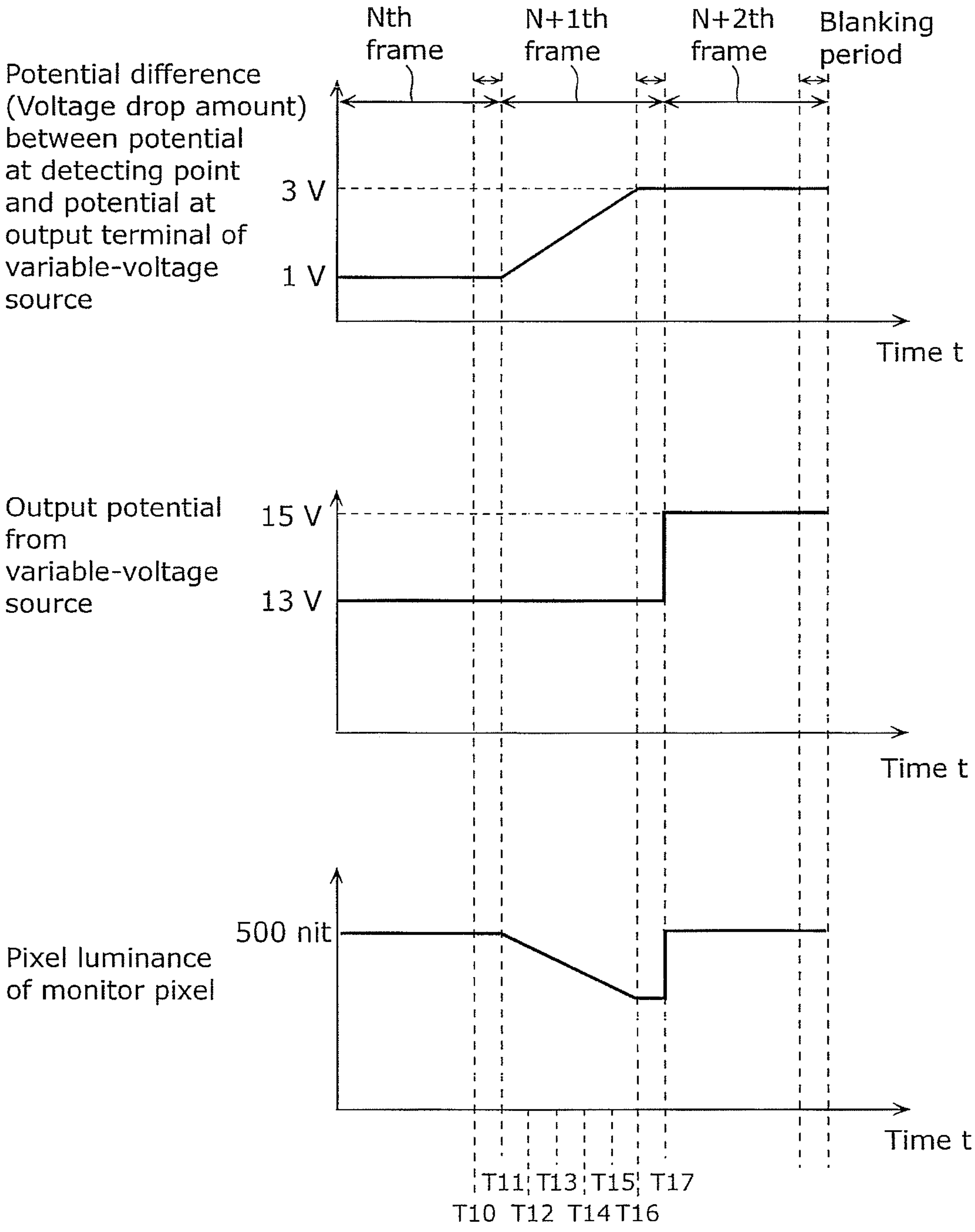
FIG. 8 is a timing chart showing the operation of the display device according to Embodiment 1 from an Nth frame to an N+2th frame.

FIG. 8 is a timing chart showing the operation of the display device 50 according to Embodiment 1 from an Nth frame to an N+2th frame.

The potential difference ΔV detected by the potential difference detecting circuit 170, the output voltage from the variable-voltage source 180, and the pixel luminance of the monitor pixel 111M are shown in the figure. Furthermore, a blanking period is provided at the end of each frame period.

Figure 9:
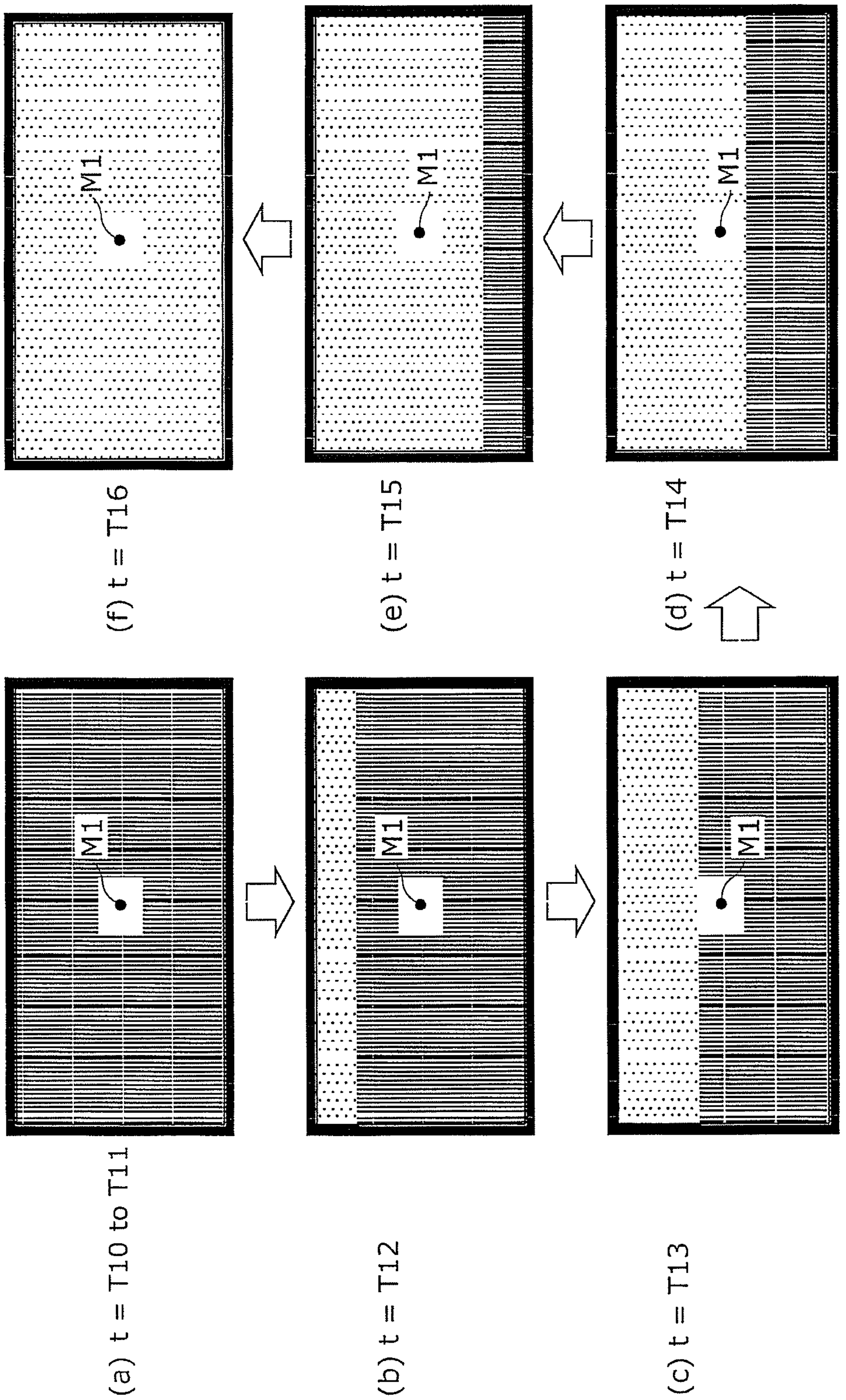
FIG. 9 is diagram schematically showing images displayed on the organic EL display unit.

FIG. 9 is diagram schematically showing images displayed on the organic EL display unit.

In a time t=T10, the signal processing circuit 165 receives input of the video data of the Nth frame. The voltage margin setting unit 175 uses the required voltage conversion table and sets the 12.2 V required voltage at the peak gradation level of G to the voltage (VTFT+VEL).

Meanwhile, the potential difference detecting circuit 170 detects the potential at the detecting point M1 via the monitor wire 190, and detects the potential difference ΔV between the detected potential and the output voltage Vout being outputted by the variable-voltage source 180. For example, in time t=T10, the potential difference detecting circuit 170 detects ΔV=1V. Subsequently, the voltage margin setting unit 175 uses the voltage margin conversion table and determines the voltage drop margin Vdrop for the N+1th frame to be 1 V.

A time t=T10 to T11 is the blanking period of the Nth frame. In this period, an image which is the same as that in the time t=T10 is displayed in the organic EL display unit 110.

(a) in FIG. 9 schematically shows an image displayed on the organic EL display unit 110 in the time t=T10 to T11. In this period, the image displayed on the organic EL display unit 110 corresponds to the image data of the Nth frame, and thus the central part is white and the part other than the central part is gray.

In time t=T11, the voltage margin setting unit 175 sets the voltage of the first reference voltage Vref1A as the sum VTFT+VEL+Vdrop (for example, 13.2 V) of the aforementioned voltage (VTFT+VEL) and the voltage drop margin Vdrop.

Over a time t=T11 to T16, the image corresponding to the video data of the N+1th frame is gradually displayed on the organic EL display unit 110 ((b) to (f) in FIG. 9). At this time, the output voltage Vout from the variable-voltage source 180 is, at all times, the VTFT+VEL+Vdrop that is set to the voltage of the first reference voltage Vref1A in the time t=T11. However, the video data corresponding to the part of the organic EL display unit 110 other than the central part is a gray gradation level that can be seen as a gray that is brighter than that in the Nth frame. Therefore, the amount of current supplied by the variable-voltage source 180 to the organic EL display unit 110 gradually increases over a time t=T11 to T16, and the voltage drop in the first power source wire 112 gradually increases following this increase in the amount of current. With this, there is a shortage of power source voltage for the pixels 111 in the central part of the organic EL display unit 110, which are the pixels 111 in a brightly displayed region. Stated differently, luminance drops below the image corresponding to the video data R:G:B=255:255:255 of the N+1th frame. Specifically, over the time t=T11 to T16, the pixel luminance of the pixels 111 at the central part of the organic EL display unit 110 gradually drops.

Next, in a time t=T16, the signal processing circuit 165 receives input of the video data of the N+1th frame. The voltage margin setting unit 175 uses the required voltage conversion table and continues to set the 12.2 V required voltage at the peak gradation level of G to the voltage (VTFT+VEL).

Meanwhile, the potential difference detecting circuit 170 detects the potential at the detecting point M1 via the monitor wire 190, and detects the potential difference ΔV between the detected potential and the output voltage Vout being outputted by the variable-voltage source 180. For example, in time t=T16, the potential difference detecting circuit 170 detects ΔV=3 V. Subsequently, the voltage margin setting unit 175 uses the voltage margin conversion table and determines the voltage drop margin Vdrop for the N+1th frame to be 3 V.

Next, in time t=T17, the voltage margin setting unit 175 sets the voltage of the first reference voltage Vref1A to the sum VTFT+VEL+Vdrop (for example, 15.2 V) of the aforementioned voltage (VTFT+VEL) and the voltage drop margin Vdrop. Therefore, from time t=T17 onward, the potential at the detecting point M1 becomes VTFT+VEL which is the predetermined potential.

In this manner, in the display device 50, although luminance temporarily drops in the N+1th frame, this is a very short period and thus has practically no impact on the user.

Next, the wiring layout of the monitor wire 190 in the organic EL display unit 110, which is a characteristic feature in the present disclosure, shall be described.

First, the wiring layout of respective wires in a conventional display device in which a monitor wire is not provided shall be shown.

Figure 10:
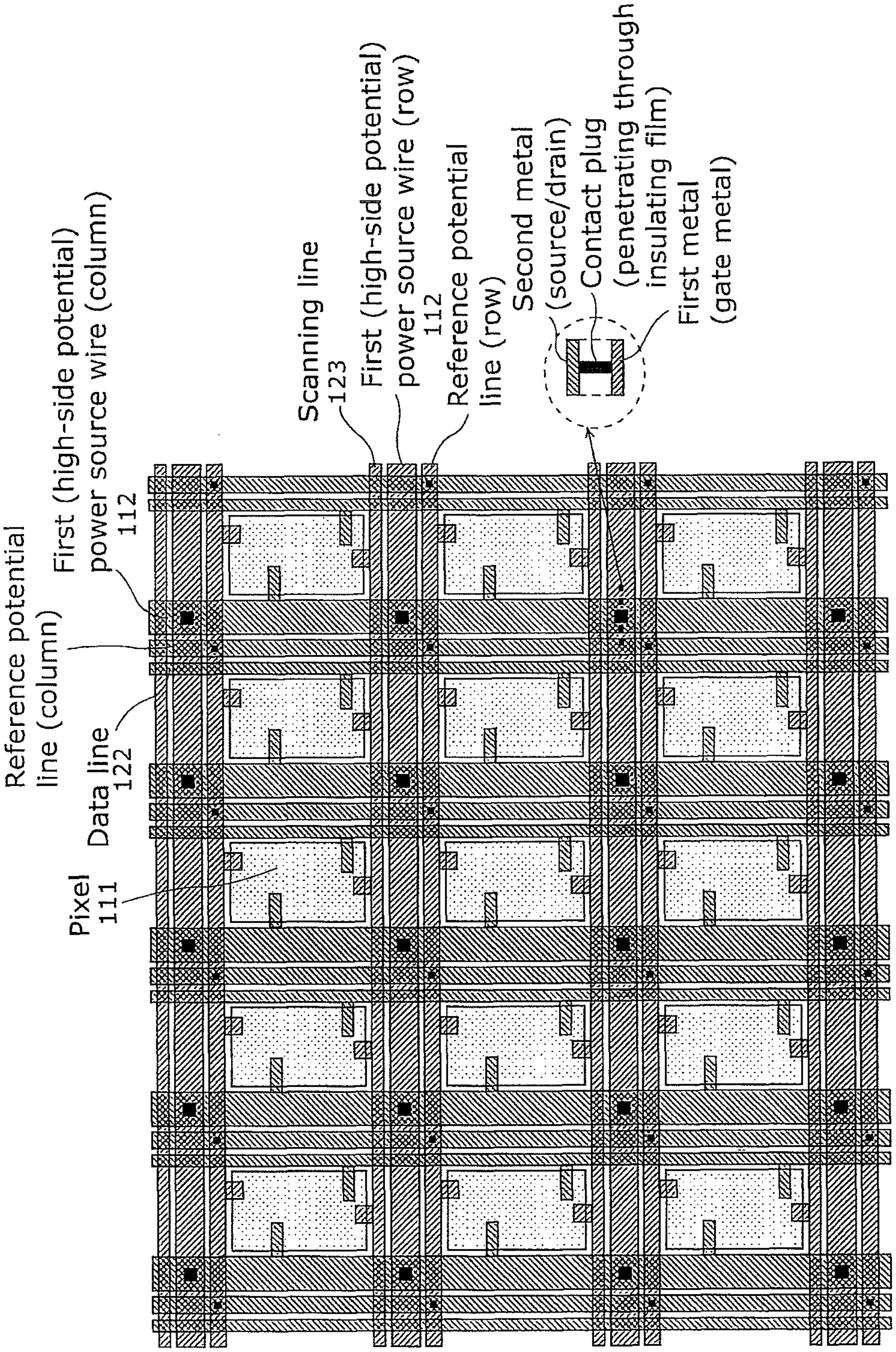
FIG. 10 is a wiring layout diagram of an organic EL display unit in a conventional display device.

FIG. 10 is a wiring layout diagram of an organic EL display unit in a conventional display device. The figure illustrates a perspective view of the top face of the organic EL display unit. A data line 122 is provided for each pixel column, between the pixels 111 that are arranged in a matrix. A scanning line 123 is provided for each pixel row, and a first power source line 112 and a reference potential line are provided for each pixel column and each pixel row. It is to be noted that although a reference potential line is not provided in the circuit diagram of the pixel shown in FIG. 3, there are cases where a reference potential line for applying a reference potential to an electrode of the holding capacitor 126 and so on is provided separately. Here, description shall be carried out under the assumption that a control line represented by a reference potential line is provided as a pixel circuit.

Although the first power source lines 112 are provided in a grid on the same plane in the schematic diagram in FIG. 2, in the wiring layout diagram in FIG. 10, first power source lines 112 are provided in the row direction, as a first metal, in a first layer, and are provided in the column direction, as a second metal, in a second layer which is a different layer from the first layer. The row-direction wiring and the column-direction wiring of the first power source wire 112 are electrically connected by a contact plug which penetrates through an insulating film between the films.

Like the first power source wire 112, the row-direction wiring and the column-direction wiring of the reference potential line are provided in different layers, and both wirings are electrically connected by a contact plug.

Thus the first power source wire 112 and the reference potential line realize the grid-like wiring shown in FIG. 2 through the above-described two-layer structure.

Figure 11:
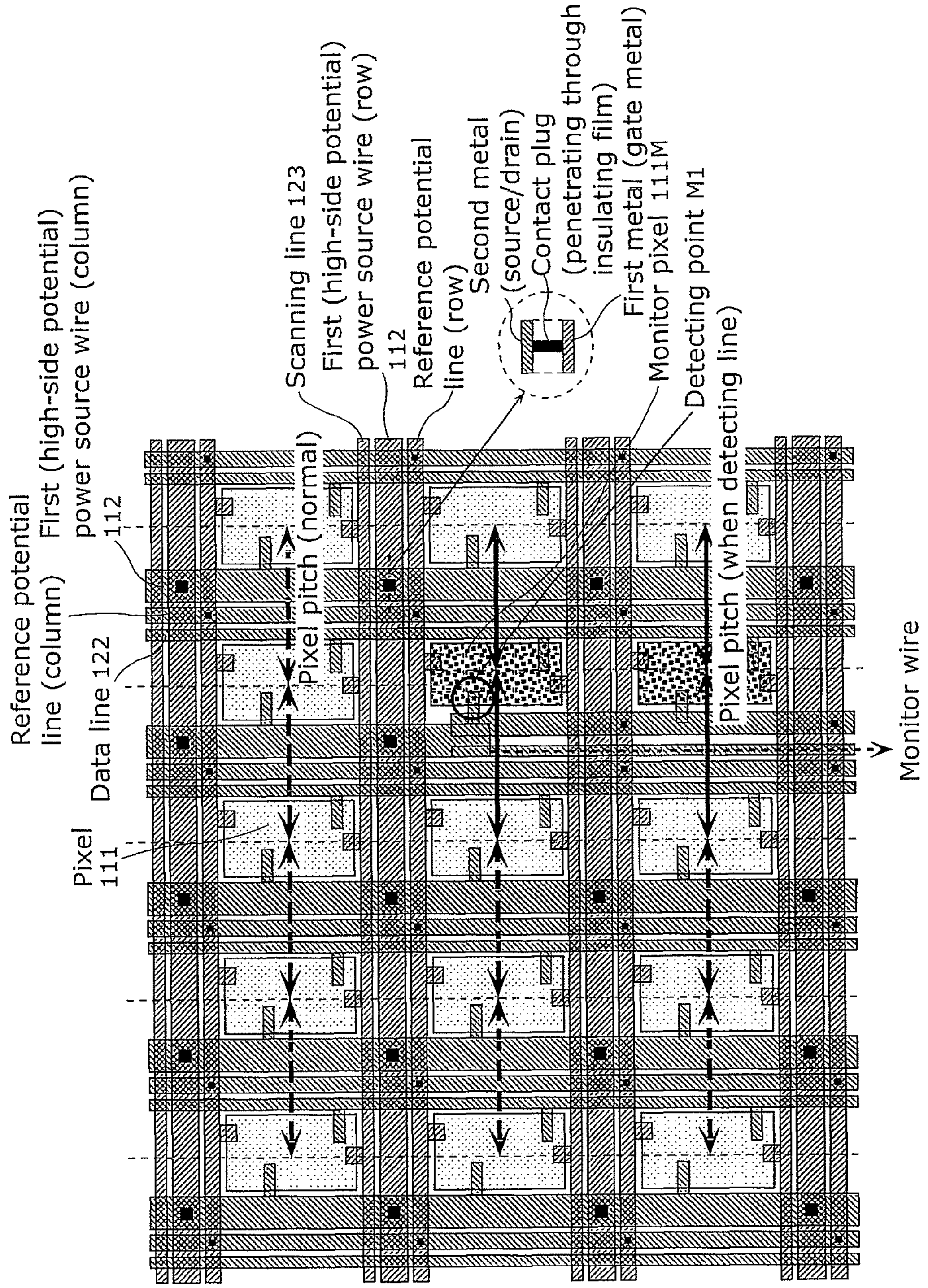
FIG. 11 is a wiring layout diagram of an organic EL display unit having a monitor wire.

FIG. 11 is a wiring layout diagram of an organic EL display unit to which a monitor wire has been provided. As illustrated in the wiring layout in the figure, in order to detect the high-side potential of the monitor pixel 111M, a new monitor wire is provided from the detecting point M1 and in the downward direction of the figure. As such, due to space concerns, in the area where the monitor wire is provided, the pixel circuits (the monitor pixel 111M and the adjacent pixel (in the downward direction in the figure)) have to assume an irregular shape compared to the other parts. With this, it is possible to have adverse effects such as pixel capacities becoming less than in standard conditions, the size of transistors becoming smaller, and parasitic capacitance increasing. As such, the trouble of having a dark line or a bright line appearing in the organic EL display unit, along the monitor wire is expected to occur.

In particular, when the monitor wire does not run along the pixel arrangement, for example, when the monitor wire is arranged at a slant with respect to the pixels which are arranged in rows and columns, the periodicity of the pixel arrangement is significantly disturbed, and thus display trouble is further highlighted.

As specific causes for display trouble due to the monitor wire described above, it is possible that luminance deviation occurs because (1) the planar structure changes, (2) optical distances change (film thicknesses change), and (3) the electrical characteristics of the pixel circuit changes. The display device disclosed herein is provided with a monitor wire while overcoming such specific causes. Hereinafter, the wiring layout of the monitor wire in the display device according to the present disclosure shall be described.

Figure 12:
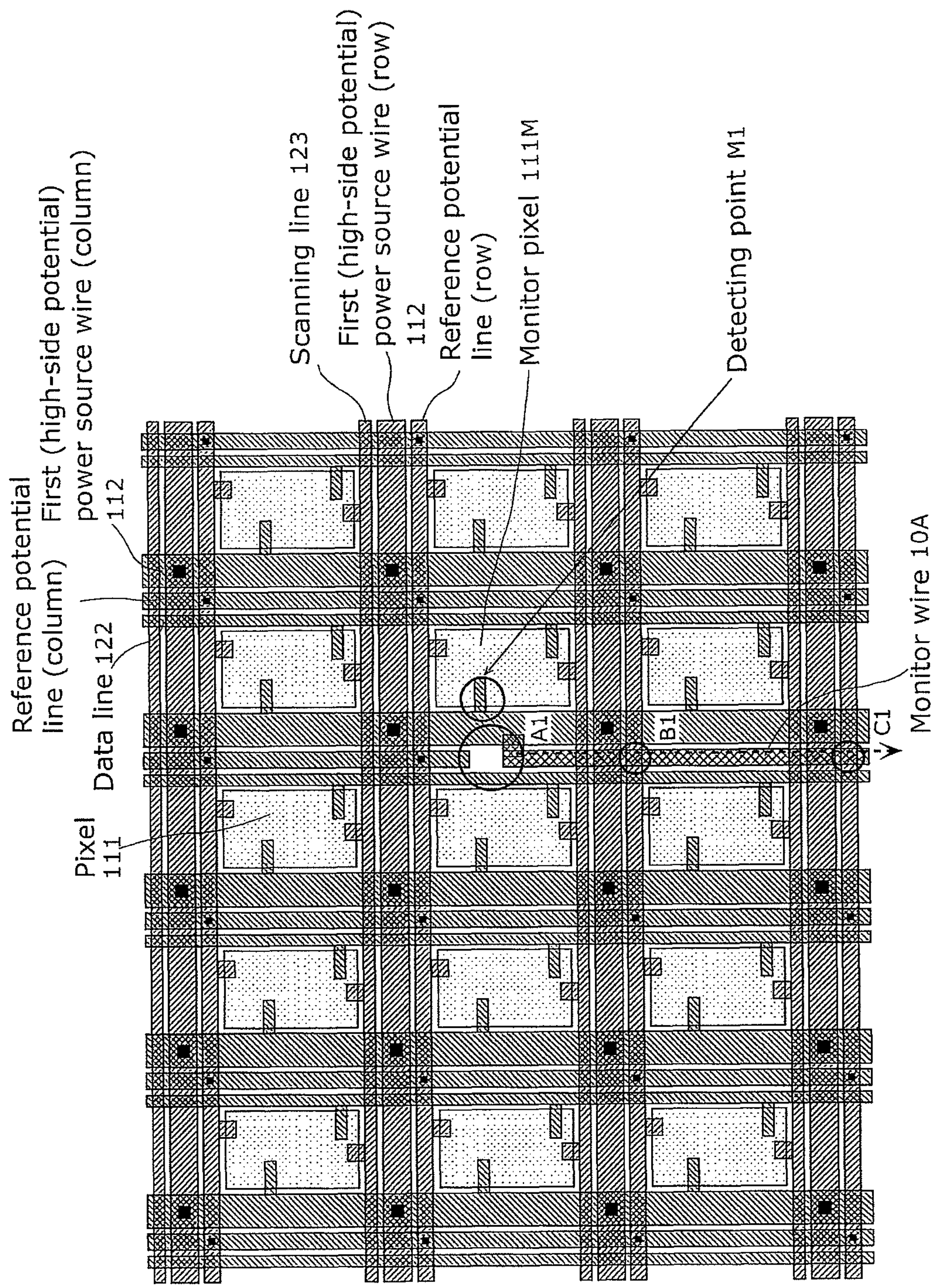
FIG. 12 is a wiring layout diagram of the organic EL display unit according to Embodiment 1.

FIG. 12 is a wiring layout diagram of the organic EL display unit according to Embodiment 1. In the layout illustrated in the figure, part of the reference potential line arranged in the column direction is cut at a region A1 and converted to a monitor wire 10A. The upper side in the figure from the region A1 which is the cut-off point is used as a reference potential line, and the lower side in the figure is used as the monitor wire 10A. The monitor wire 10A is connected to the adjacent first power source wire 112 at the region A1. In addition, since the monitor wire 10A needs to be cut-off from wires other than the detecting-target first power source 112, contacts in a region B1 and a region C1 are removed to prevent short circuiting with other reference potential lines. Specifically, the monitor wire 10A is formed in the same layer as the first power source wire 112 and is arranged so that the interval between the monitor wire 10A and the adjacent reference potential line is the same as the interval between adjacent reference potential lines. With this arrangement structure, the potential of the first power source wire 112 in the region A1 is measured, and the high-side potential applied to the monitor pixel 111M is transmitted to the potential difference detecting circuit 170.

Furthermore, since the reference potential line is two-dimensionally arranged in a grid according to the two-layer structure described earlier, even when, for example, a number of columns out of the reference potential lines arranged in the column direction are converted to monitor wires, the reference potential is supplied to the monitor pixel via the reference potential line arranged in the row direction. Therefore, the effect on display quality of converting part of a reference potential line to a monitor wire 10A is small.

According to this wiring layout, regular patterns such as the pixel pitch and the wire width of the pixels do not change with the provision of the monitor pixel, and thus display-related unpleasantness is eliminated and boundaries are not readily visible. Furthermore, since the monitor wire 10A is formed in the same process as the reference potential line and the aforementioned regular patterns are maintained, the manufacturing process of the display panel does not become complicated. Furthermore, in terms of design, there is no need to provide new monitor wires since existing wires are converted, and thus design changes can be simplified.

Figure 13:
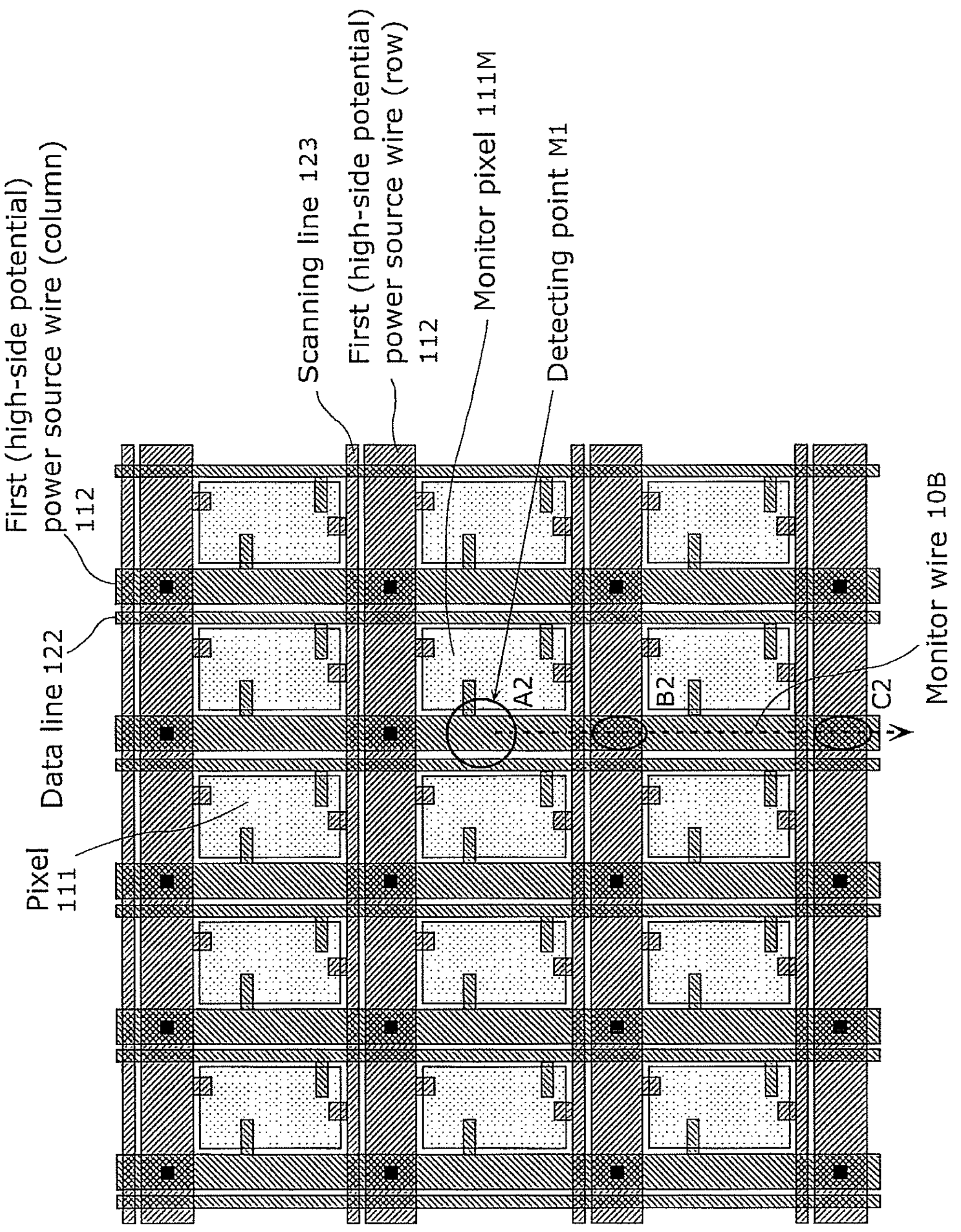
FIG. 13 is a wiring layout diagram of an organic EL display unit according to a first modification of Embodiment 1.

FIG. 13 is a wiring layout diagram of an organic EL display unit according to a first modification of Embodiment 1. In the wiring layout according to the present disclosure shown in the figure, part of the power source wire in nearly all of the pixel circuits is converted to a monitor wire 10B. A data line 122 is provided for each pixel column, between the pixels 111 that are arranged in a matrix. A scanning line 123 is provided for each pixel, and a first power source line 112 is provided for each pixel column and each pixel row.

As in the wiring layout in FIG. 13, when the wiring layers of the first power source wire 112 are different for the row direction and column direction in two-dimensional wiring, the contacts in the region B2 and the region C2 may be removed to prevent short-circuiting between wires in the row direction and the column direction for the converted monitor wire 10B. Specifically, the monitor wire 10B is formed in the same layer as the first power source wire 112. With this wiring layout, a clear cut-off point for the first power source line 112 does not exist. With this arrangement structure, the potential of the first power source wire 112 in the region A2 is measured, and the high-side potential applied to the monitor pixel 111M is transmitted to the potential difference detecting circuit 170.

According to this wiring layout, regular patterns such as the pixel pitch and the wire width of the pixels do not change with the provision of the monitor pixel, and thus display-related unpleasantness is eliminated and boundaries are not readily visible. Furthermore, since the monitor wire 10B is formed in the same process as the first power source wire 112, and the aforementioned regular patterns are maintained, the manufacturing process of the display panel does not become complicated. Furthermore, in terms of design, there is no need to provide new monitor wires since existing wires are converted, and thus design changes can be simplified. Furthermore, since the power source wire is present in almost all pixel circuits, the above-described wiring layout can be implemented independently of circuit configurations.

Figure 14:
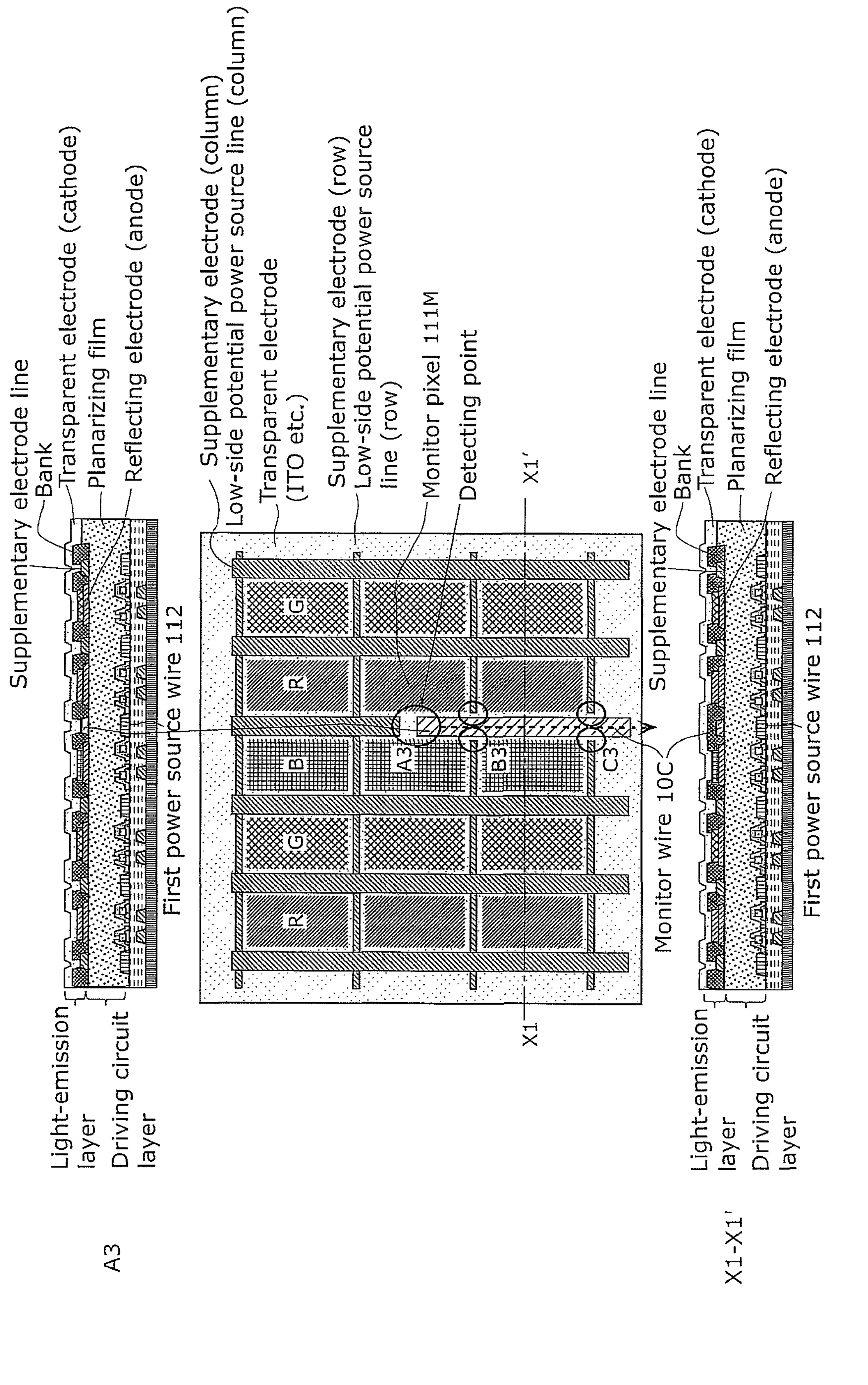
FIG. 14 is a wiring layout diagram of an organic EL display unit according to a second modification of Embodiment 1.

FIG. 14 is a wiring layout diagram of an organic EL display unit according to a second modification of Embodiment 1. The wiring layout according to the present disclosure shown in the figure is for detecting the low-side potential applied to the monitor pixel, and converts part of a low-side potential power source wire two dimensionally arranged in a single layer into a monitor wire 10C. Supplementary electrode lines are arranged in a grid, between the pixels 111 (R pixel, G pixel, B pixel) that are arranged in a matrix. The supplementary electrode lines are electrically connected to the second power source wire 113. Here, the second power source wire 113 is a transparent electrode (cathode electrode) formed as a continuous film. Each supplementary electrode line has a function of enhancing the potential of the second power source wire 113 which is made of a material having high resistivity as an electrode material and is represented by ITO and so on. Furthermore, as in the cross-sectional view shown in FIG. 14, the organic EL display unit according to this modification has a layered structure composed of (i) a driving circuit layer including a driving transistor, a switch transistor, and a holding capacitor, and so on, and a (i) light-emission layer including an organic EL element, and exemplifies what is called a top-emission structure in which emission is towards the transparent electrode which is the cathode electrode. The driving circuit layer and the luminescence-producing layer are stacked via a planarization film which is an insulating layer, and are electrically connected through a contact plug formed inside the insulating layer. Furthermore, the first power source wire 112 is formed inside the driving circuit layer.

In the above-described structure, when a wire having the same layer for the wiring layers in the row direction and the column direction in a two-dimensional wiring is to be converted into the monitor wire 10C for example, the supplementary electrode line from the detection point to the upper side of the figure and the supplementary electrode line from the detection point to the lower side of the figure are cut-off at a region A3. Furthermore, to prevent short-circuiting between the part that has been converted to the monitor wire 10C and the original supplementary electrode line, the connection in the row direction or the column direction is cut-off at a region B3 and a region C3. Specifically, the monitor wire 10C is formed in the same layer as the supplementary electrode line, and is arranged so that the interval between the monitor wire 10C and a supplementary electrode line adjacent to such monitor wire 10C is the same as the interval between adjacent supplementary electrode lines. Furthermore, although not shown in the figure, a planarization film which is an insulating layer is formed between an anode electrode which is a first electrode and the monitor wire 10C, and the monitor wire 10C is formed in the same layer as the anode electrode. With this arrangement structure, the potential of the second power source wire 113 in the region A3 is measured, and the low-side potential applied to the monitor pixel 111M is transmitted to the potential difference detecting circuit 170.

According to this wiring layout, regular patterns such as the pixel pitch and the wire width of the pixels do not change with the provision of the monitor pixel, and thus display-related unpleasantness is eliminated and boundaries are not readily visible. Furthermore, since the monitor wire 10C is formed in the same process as the reference potential line and the aforementioned regular patterns are maintained, the manufacturing process of the display panel does not become complicated. Furthermore, in terms of design, there is no need to provide new monitor wires since existing wires are converted, and thus design changes can be simplified.

It is to be noted that, in the case where the transparent electrode is arranged in common throughout the display screen, the present wiring layout can be applied even when the supplementary electrode line is a one-dimensional wire. This is realized by the transparent electrode playing the role of supplying power in the direction in which the supplementary electrode line is not provided.

Figure 15:
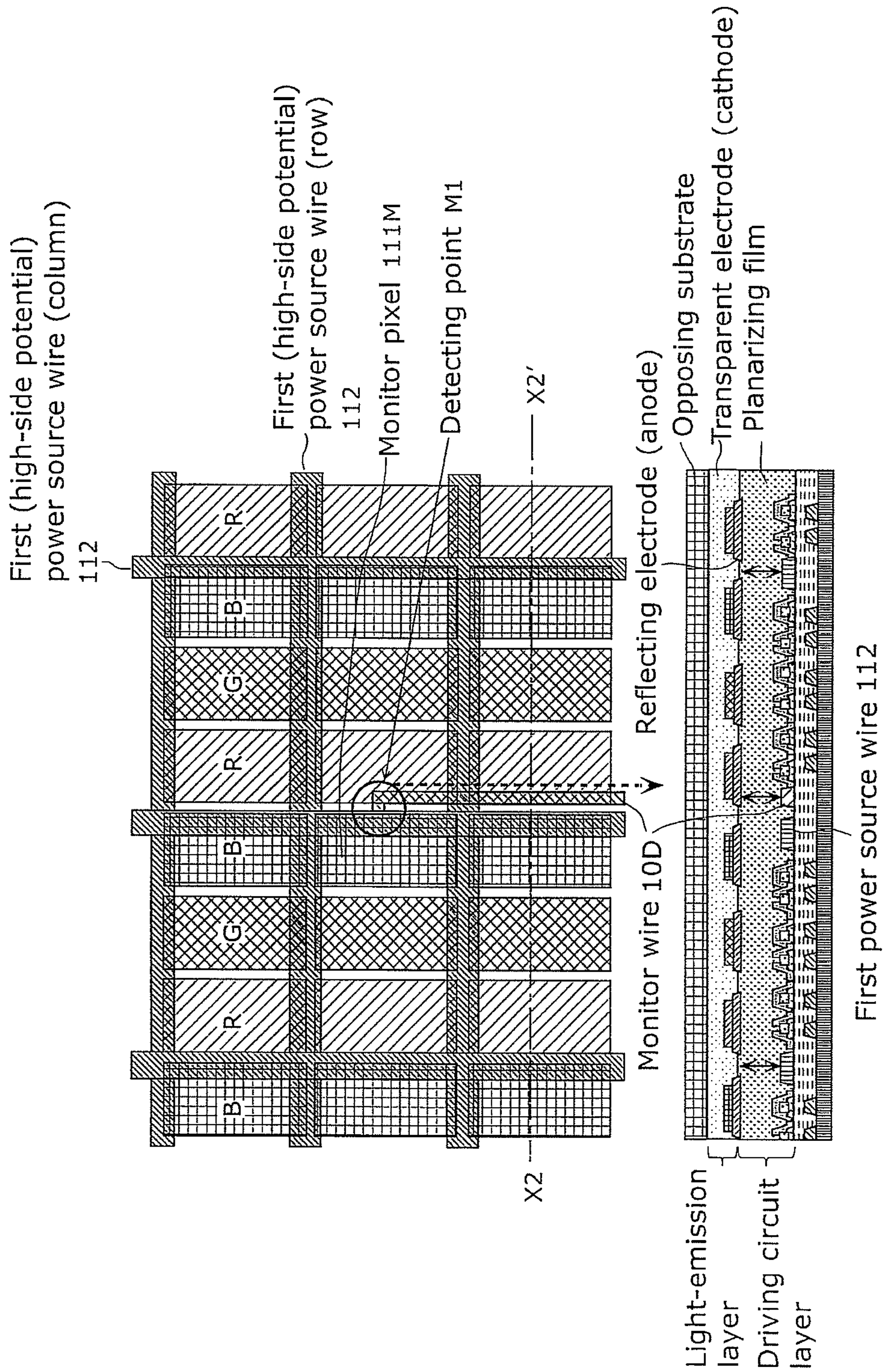
FIG. 15 is a wiring layout diagram of an organic EL display unit according to a third modification of Embodiment 1.

FIG. 15 is a wiring layout diagram of an organic EL display unit according to a third modification of Embodiment 1. The wiring layout according to the present disclosure shown in the figure is for detecting the high-side potential applied to the monitor pixel, and provides a monitor wire 10D connected to the power source wire provided in the driving circuit layer, in the same driving circuit layer. As in the cross-sectional view shown in FIG. 15, the organic EL display unit according to this modification has a layered structure composed of (i) a driving circuit layer including a driving transistor, a switch transistor, and a holding capacitor, and so on, and (ii) a light-emission layer including an organic EL element, and exemplifies what is called a top-emission structure in which emission is towards the transparent electrode which is the cathode electrode. The driving circuit layer and the luminescence-producing layer are stacked via a planarization film which is an insulating layer, and are electrically connected through a contact plug formed inside the insulating layer. Furthermore, the first power source wire 112 is formed inside the driving circuit layer.

In the above-described structure, the first power source wire 112 and the monitor wire 10D are arranged in the same driving circuit layer. In the driving circuit layer, the monitor wire 10D is connected to the first power source wire 112 at the detecting point M1. At this time, the monitor wire 10D and the first power source wire 112 are disposed in the same layer and have approximately the same thickness. In this manner, the flatness of the electrode which is a reflecting electrode located above or the distance from an opposing substrate is practically the same for the pixel above the monitor wire 10D and the pixel above the first power source wire 112. Specifically, since the distance of a reflecting electrode from the opposing substrate face is considered to be approximately the same for all pixels, variation in wavelengths due to differences in light path length does not readily occur, and boundaries caused by the provision of the monitor wire 10D are not readily visible. With this arrangement structure, the potential of the first power source wire 112 at the detection point M1 is measured, and the high-side potential applied to the monitor pixel 111M is transmitted to the potential difference detecting circuit 170.

According to this wiring layout, since the effects on the optical distance of the pixels do not change with the provision of the monitor pixels, display-related unpleasantness is eliminated and the boundaries are not readily visible.

Figure 16:
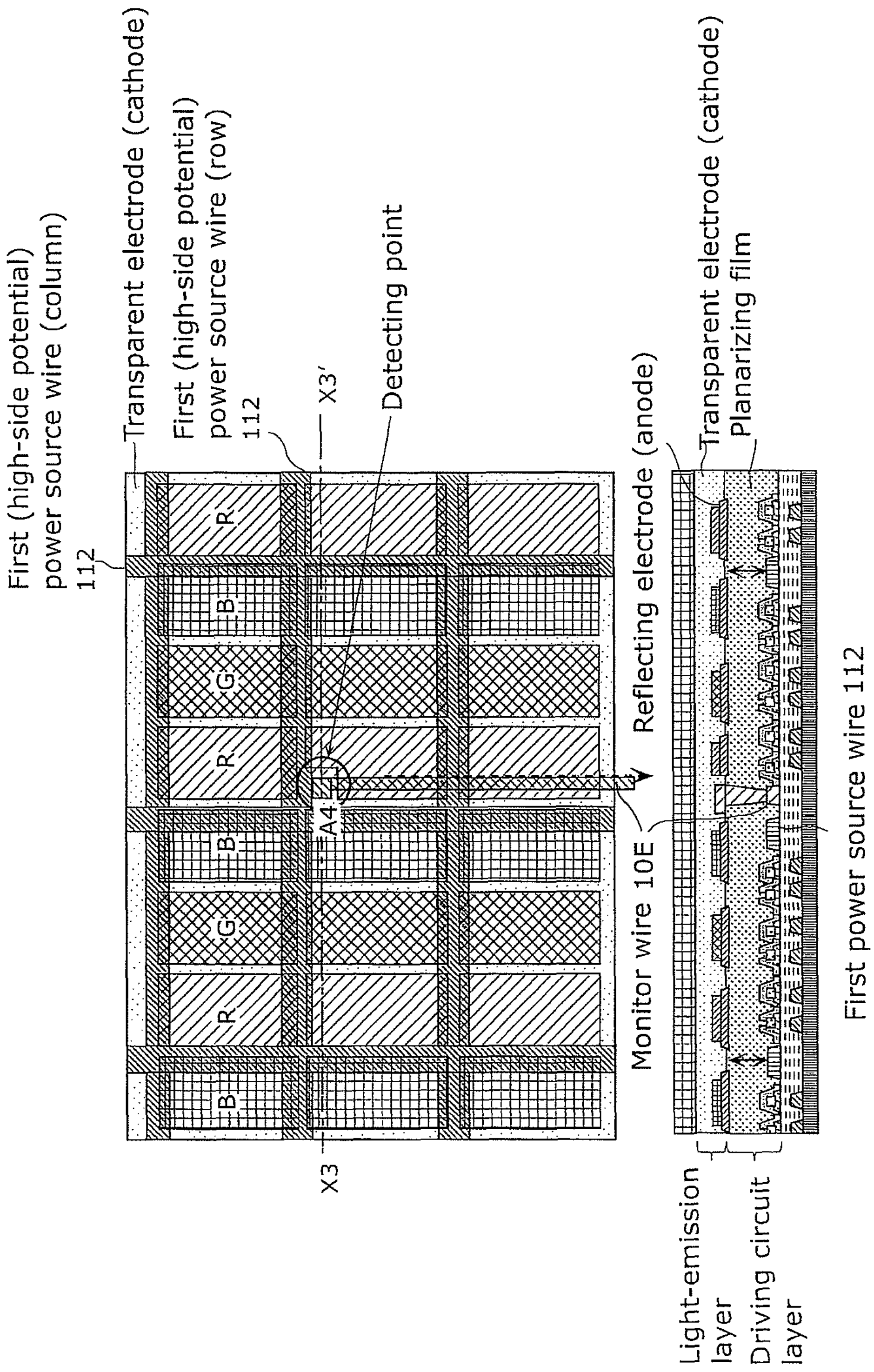
FIG. 16 is a wiring layout diagram of an organic EL display unit according to a fourth modification of Embodiment 1.

FIG. 16 is a wiring layout diagram of an organic EL display unit according to a fourth modification of Embodiment 1. The wiring layout according to the present disclosure shown in the figure is for detecting the low-side potential applied to the monitor pixel, and provides a monitor wire 10E connected to a transparent electrode which is the second power source wire 113, in a different driving circuit layer as the second power source wire 113. Pixels 111 (R pixels, G pixels, B pixels) arranged in a matrix are provided. The second power source wire 113 is a transparent cathode electrode formed as a continuous film. Furthermore, as in the cross-sectional view shown in FIG. 16, the organic EL display unit according to this modification has a layered structure composed of (i) a driving circuit layer including a driving transistor, a switch transistor, and a holding capacitor, and so on, and (ii) a light-emission layer including an organic EL element, and exemplifies what is called a top-emission structure in which emission is towards the transparent electrode which is the cathode electrode. The driving circuit layer and the luminescence-producing layer are stacked via a planarization film which is an insulating layer, and are electrically connected through a contact plug formed inside the insulating layer. Furthermore, the first power source wire 112 is formed inside the driving circuit layer.

In the above-described structure, when a supplementary electrode line as shown in FIG. 14 is not provided in the transparent electrode-side (that is, when there is only the transparent electrode), laying out a monitor wire in the light-emission layer clearly disrupts the regularity and boundaries are readily visible.

Therefore, in the wiring layout according to this modification, the monitor wire 10E for detecting the low-side (transparent potential-side) potential is laid out in the driving circuit layer which is a layer lower than the light-emission layer. In other words, the monitor wire 10E is formed in the same layer as the first power source wire 112. It is to be noted that the detecting point of the light-emission layer and the monitor wire 10E are electrically connected through a contact plug. In this case, part of the anode electrode which is the first electrode of the monitor pixel 111M is cut-out, and the transparent electrode (cathode electrode) and the reflecting electrode (anode electrode) are brought into direct contact. Then, part of the reflecting electrode (anode electrode) that was brought into contact is connected to the monitor wire 10E disposed in the driving circuit layer, via a contact plug provided in the planarization layer. Specifically, on end of the monitor wire 10E is connected to the transparent electrode (cathode electrode) via the contact plug and the reflecting electrode. In so doing, the monitor wire 10E is laid out in a layer below the reflecting electrode and thus the monitor wire 10E cannot be directly seen. Therefore, compared to when the monitor wire is directly arranged on the transparent electrode, boundaries become much less noticeable.

Figure 17:
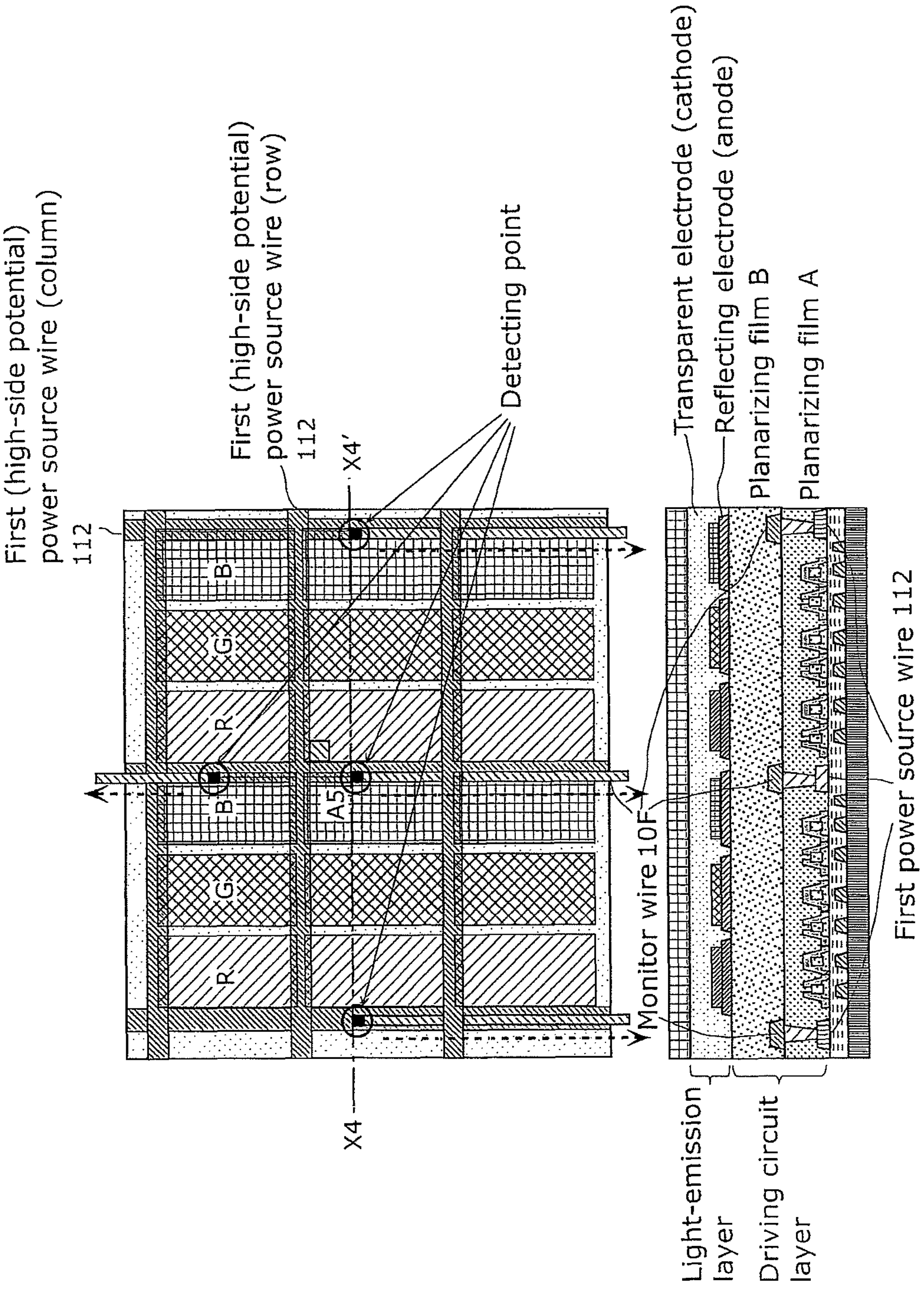
FIG. 17 is a wiring layout diagram of an organic EL display unit according to a fifth modification of Embodiment 1.

FIG. 17 is a wiring layout diagram of an organic EL display unit according to a fifth modification of Embodiment 1. The wiring layout according to the present disclosure shown in the figure is for detecting the high-side potential applied to the monitor pixel, and provides a monitor wire 10F connected to the first power source wire 112, in a different layer as the light-emission layer in which the pixel circuit element is disposed. As in the cross-sectional view shown in FIG. 17, the organic EL display unit according to this modification has a layered structure composed of (i) a driving circuit layer including a driving transistor, a switch transistor, and a holding capacitor, and so on, and (ii) a light-emission layer including an organic EL element, and exemplifies what is called a top-emission structure in which emission is towards a transparent electrode which is the cathode electrode. Furthermore, a detecting line layer in which the monitor wire 10F is disposed is formed between the driving circuit layer and the light-emission layer. The driving circuit layer and the detecting line layer are stacked via a planarization film A which is an insulating layer. The detecting line layer and the light-emission layer are stacked via a planarization film B which is an insulating film, and are electrically connected through a contact plug formed inside the planarization film. Furthermore, the first power source wire 112 is formed inside the driving circuit layer. Specifically, the monitor wire 10F is formed in a detecting line layer which is different from the light-emission layer including the transparent electrode and the reflecting electrode and the layer in which the first power source wire 112 is formed. In such detecting line layer, the wiring area of the monitor wire 10F is larger than the wiring area of electrical wires other than the monitor wire 10F.

In the above-described structure, the driving circuit layer, the monitor wire 10F is connected, via a contact plug, to the first power source wire 112 at the detecting point M1. At this time, the monitor wire 10F and the first power source wire 112 are formed in different layers. In this manner, adding a detecting line-dedicated layer allows the potential of an arbitrary location to be detected. With this, the degree of freedom in the wiring layout of the monitor wire increases, and, for example, a high-side potential monitor wire and a low-side potential monitor wire can be provided in the same layer.

Furthermore, when a detecting line is added in the driving circuit layer in which the circuit element is disposed, pixel capacity decreases and the wire width becomes narrower by as much as the area of the monitor wire, and thus increases in voltage drop amount tend to occur easily and display quality deteriorates to some extent. This is becomes more noticeable as detecting lines are increased. In contrast, by providing a detecting line-dedicated layer as in this embodiment, a detecting line can be provided with absolutely no effect on the pixel circuit disposed in the driving circuit layer.

According to this wiring layout, by providing the monitor wire 10F in a layer that is different from the light-emission layer and the driving circuit layer, regular patterns such as the pixel pitch and the wire width of the pixels or the area and wire width of the pixel circuit element do not change, and thus display-related unpleasantness is eliminated and boundaries are not readily visible.

According to the wiring layout of the display device according to Embodiment 1 and the first to fifth modifications thereof described above, a monitor wire for detecting the potential of a pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

It is to be noted that, even when the pixel boundary of a monitor wire becomes a line defect that may be visible, it is preferable that the length of wiring for the monitor wire in the organic EL display unit be minimized.

Figure 18:
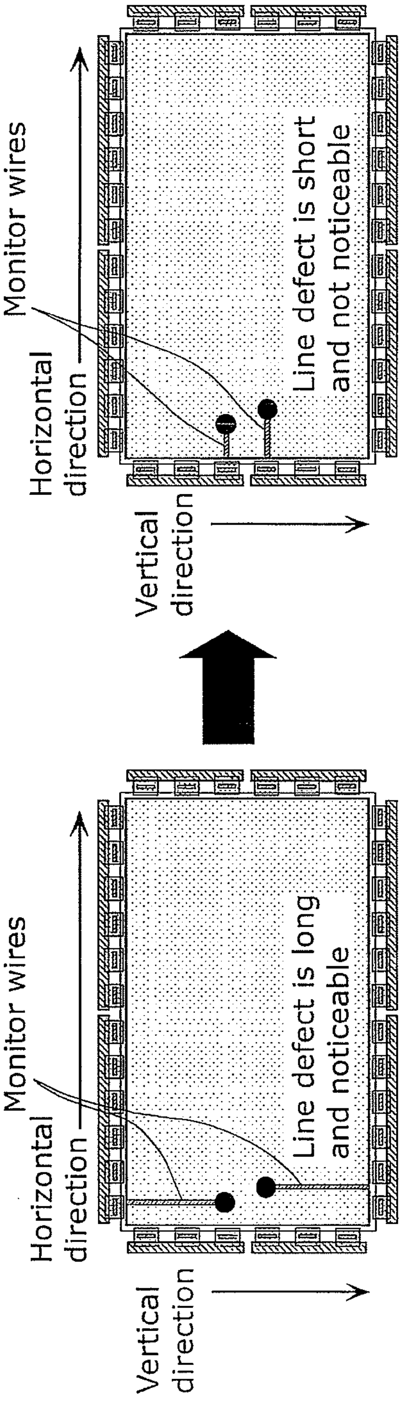
FIG. 18 shows diagrams for comparing the wiring directions of monitor wires in the organic EL display unit.

FIG. 18 shows diagrams for comparing the wiring directions of monitor wires in the organic EL display unit. When the monitor wires are arranged in the vertical direction as shown in the diagram on the left, the detecting lines become long and there are cases where the line defect also becomes commensurately noticeable. In view of this, arranging the monitor wire in the horizontal direction as in the diagram on the right shortens the line defect and makes it less noticeable. Specifically, in order to make a line defect less noticeable, it is preferable to arrange the monitor wires along the row direction or the column direction (along the pixel arrangement) in such a way as to have the shortest distance from the detecting point to a power supply part in the periphery.

[Embodiment 2]

Compared to the display device according to Embodiment 1, a display device according to this embodiment is different in that the reference voltage that is inputted to a variable-voltage source not only changes depending on a change in the potential difference ΔV detected by a potential difference detecting circuit, but also changes depending on a peak signal detected, for each frame, from the inputted video data. Hereinafter, description shall not be repeated for points which are the same as in Embodiment 1 and shall be centered on the points of difference from Embodiment 1. Furthermore, the figures applied to Embodiment 1 shall be used for figures that would otherwise overlap with those in Embodiment 1.

Hereinafter, Embodiment 2 shall be specifically described with reference to the Drawings.

Figure 19:
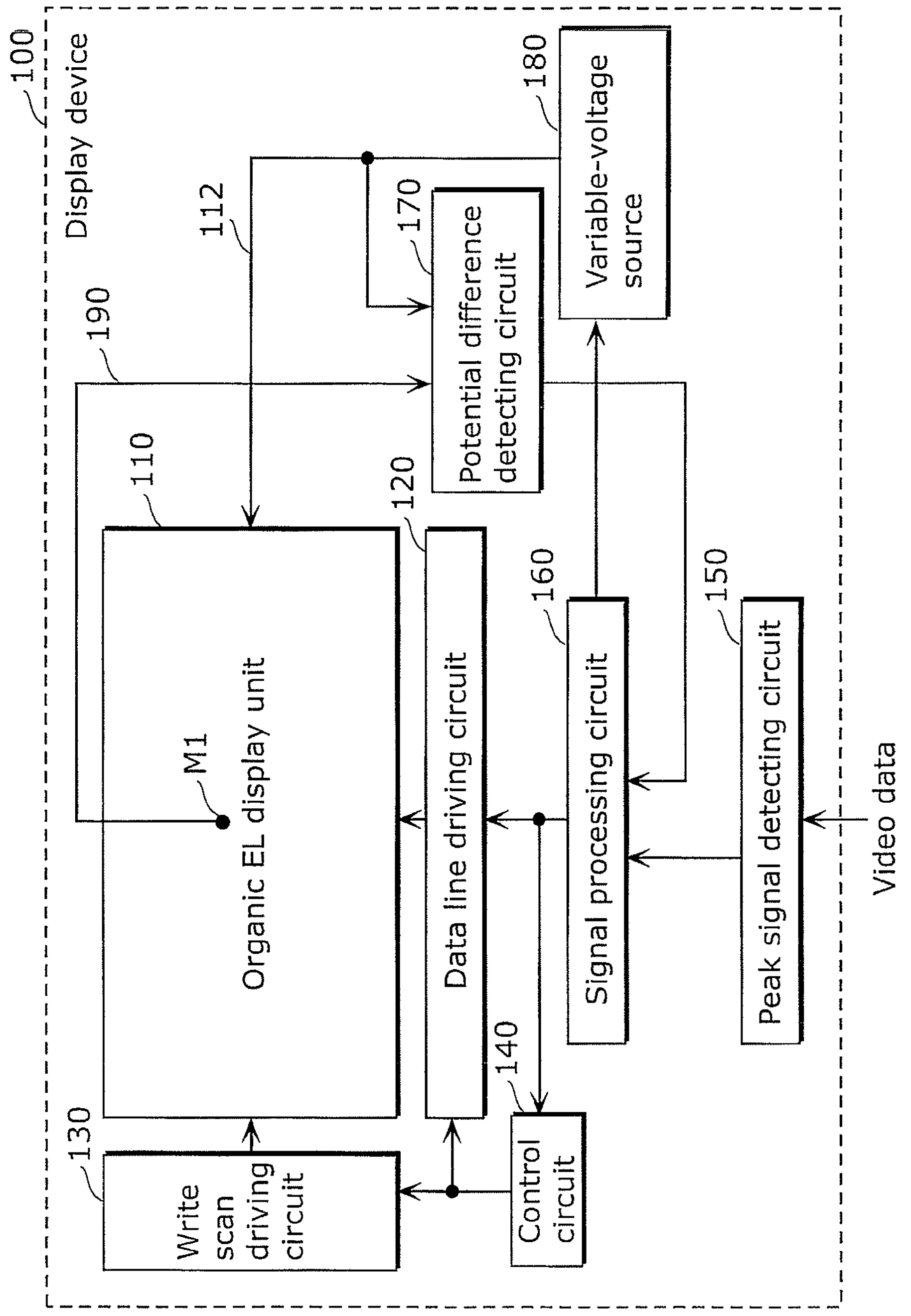
FIG. 19 is a block diagram showing an outline configuration of a display device according to Embodiment 2 disclosed herein.

FIG. 19 is a block diagram showing an outline configuration of a display device according to Embodiment 2.

A display device 100 shown in the figure includes the organic electroluminescence (EL) display unit 110, the data line driving circuit 120, the write scan driving circuit 130, the control circuit 140, a peak signal detecting circuit 150, a signal processing circuit 160, the potential difference detecting circuit 170, the variable-voltage source 180, and the monitor wire 190.

The configuration of the organic EL display unit 110 is the same as that shown in FIG. 2 and FIG. 3 in Embodiment 1.

The peak signal detecting circuit 150 detects the peak value of the video data inputted to the display device 100, and outputs a peak signal representing the detected peak value to the signal processing circuit 160. Specifically, the peak signal detecting circuit 150 detects, as the peak value, data of the highest gradation level out of the video data. High gradation level data corresponds to an image that is to be displayed brightly by the organic EL display unit 110.

The signal processing circuit 160, which is the voltage regulating unit in this embodiment, regulates the variable-voltage source 180 to set the potential of the monitor pixel 111M to a predetermined potential, based on the peak signal outputted by the peak signal detecting circuit 150 and a potential difference ΔV detected by the potential difference detecting circuit 170. Specifically, the signal processing circuit 160 determines the voltage required by the organic EL element 121 and the driving transistor 125 when causing the pixels 111 to produce luminescence according to the peak signal outputted by the peak signal detecting circuit 150. Furthermore, the signal processing circuit 160 calculates a voltage margin based on the potential difference detected by the potential difference detecting circuit 170. Subsequently, the signal processing circuit 160 sums up a voltage VEL required by the organic EL element 121, a voltage VTFT required by the driving transistor 125, and the voltage drop margin Vdrop, and outputs the summation result VEL+VTFT+Vdrop, as the potential of a first reference voltage Vref1, to the variable-voltage source 180.

Furthermore, the signal processing circuit 160 outputs, to the data line driving circuit 120, a signal voltage corresponding to the video data inputted via the peak signal detecting circuit 150.

The potential difference detecting circuit 170, which is the voltage measuring unit in this embodiment, measures, for the monitor pixel 111M, the high-side potential to be applied to the monitor pixel 111M. Specifically, the potential difference detecting circuit 170 measures, via the monitor wire 190, the high-side potential to be applied to the monitor pixel 111M. Specifically, the potential difference detecting circuit 170 measures the potential at the detecting point M1. In addition, the potential difference detecting circuit 170 measures the high-side output potential of the variable-voltage source 180, and measures the potential difference ΔV between the measured high-side potential to be applied to the monitor pixel 111M and the high-side output potential of the variable-voltage source 180. Subsequently, the potential difference detecting circuit 170 outputs the measured potential difference ΔV to the signal processing circuit 160.

The variable-voltage source 180, which is the power supplying unit in this embodiment, outputs the high-side potential and the low-side potential to the organic EL display unit 110. The variable-voltage source 180 outputs an output voltage Vout for setting the high-side potential of the monitor pixel 111M to the predetermined potential (VEL+VTFT), according to the first reference voltage Vref1 outputted by the signal processing circuit 160

The monitor wire 190 is a detecting line which is provided along the row direction or column direction of the matrix of the organic EL display unit, has one end connected to the monitor pixel 111M and the other end connected to the potential difference detecting circuit 170, and transmits the high potential applied to the monitor pixel 111M.

Next, a detailed configuration of the variable-voltage source 180 shall be briefly described.

Figure 20:
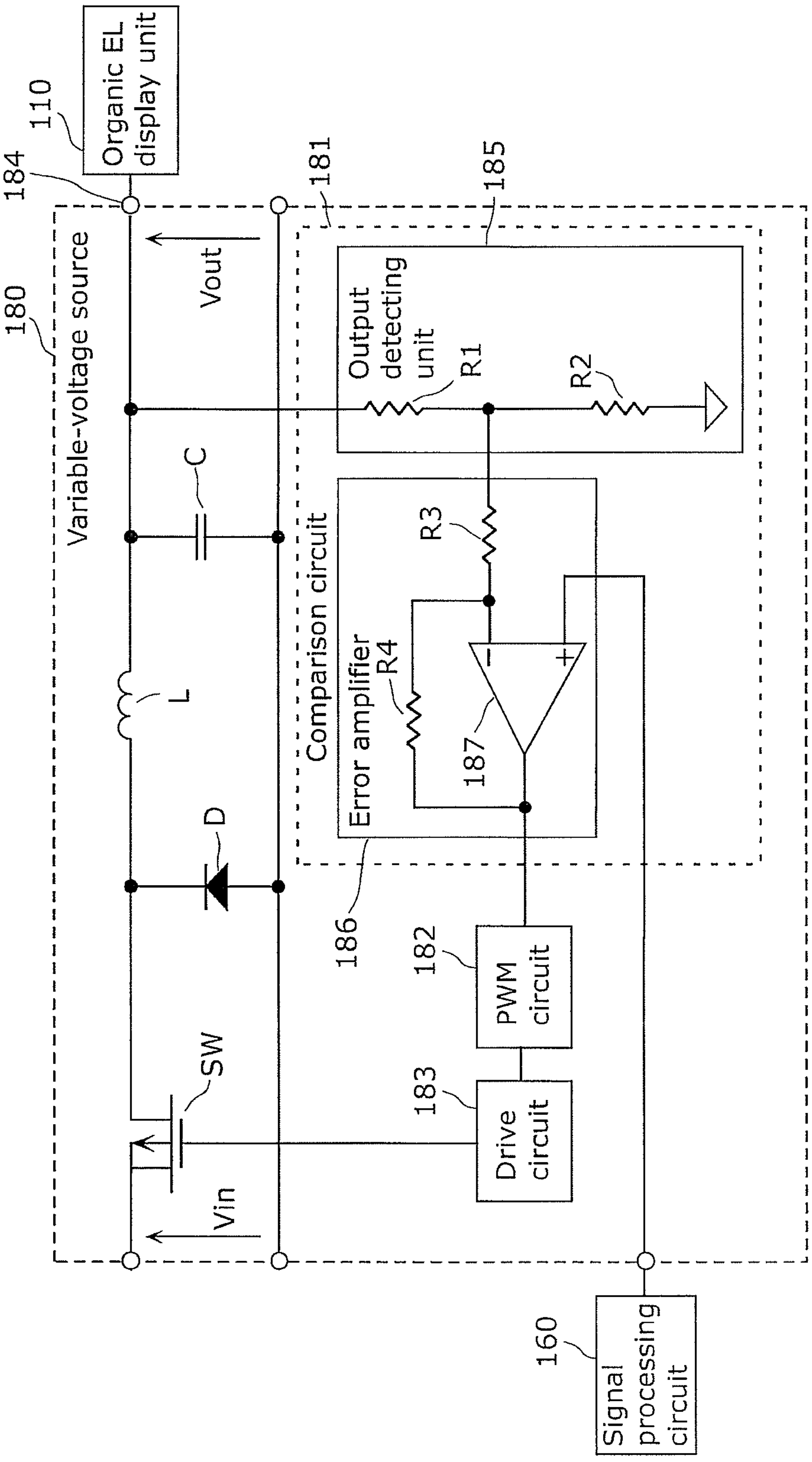
FIG. 20 is a block diagram showing an example of a specific configuration of a variable-voltage source according to Embodiment 2.

FIG. 20 is a block diagram showing an example of a specific configuration of a variable-voltage source according to Embodiment 2. It is to be noted that the organic EL display unit 110 and the signal processing circuit 160 which are connected to the variable-voltage source are also shown in the figure.

The variable-voltage source 180 shown in the figure is the same as the variable-voltage source 180 described in Embodiment 1.

The error amplifier 186 compares the Vout that has been voltage-divided by the output detection unit 185 and the first reference voltage Vref1 outputted by the signal processing circuit 160, and outputs, to the PWM circuit 182, a voltage that is in accordance with the comparison result. Specifically, the error amplifier 186 includes the operational amplifier 187 and the resistors R3 and R4. The operational amplifier 187 has an inverting input terminal connected to the output detecting unit 185 via the resistor R3, a non-inverting input terminal connected to the signal processing circuit 160, and an output terminal connected to the PWM circuit 182. Furthermore, the output terminal of the operational amplifier 187 is connected to the inverting input terminal via the resistor R4. With this, the error amplifier 186 outputs, to the PWM circuit 182, a voltage that is in accordance with the potential difference between the voltage inputted from the output detecting unit 185 and the first reference voltage Vref1 inputted from the signal processing circuit 160. Stated differently, the error amplifier 186 outputs, to the PWM circuit 182, a voltage that is in accordance with the potential difference between the output voltage Vout and the first reference voltage Vref1.

The PWM circuit 182 outputs, to the drive circuit 183, pulse waveforms having different duties depending on the voltage outputted by the comparison circuit 181. Specifically, the PWM circuit 182 outputs a pulse waveform having a long ON duty when the voltage outputted by the comparison circuit 181 is large, and outputs a pulse waveform having a short ON duty when the outputted voltage is small. Stated differently, the PWM circuit 182 outputs a pulse waveform having a long ON duty when the potential difference between the output voltage Vout and the first reference voltage Vref1 is big, and outputs a pulse waveform having a short ON duty when the potential difference between the output voltage Vout and the first reference voltage Vref1 is small. It is to be noted that the ON period of a pulse waveform is a period in which the pulse waveform is active.

As the output voltage Vout approaches the first reference voltage Vref1, the voltage inputted to the PWM circuit 182 decreases, and the ON duty of the pulse signal outputted by the PWM circuit 182 becomes shorter.

Then, the time in which the switching element SW is ON becomes shorter, and the output voltage Vout gently converges with the first reference voltage Vref1.

The potential of the output voltage Vout, while having slight voltage fluctuations, eventually settles to a potential in the vicinity of Vout=Vref1.

In this manner, the variable-voltage source 180 generates the output voltage Vout which approximates the first reference voltage Vref1 outputted by the signal processing circuit 160, and supplies the output voltage Vout to the organic EL display unit 110.

Figure 21:
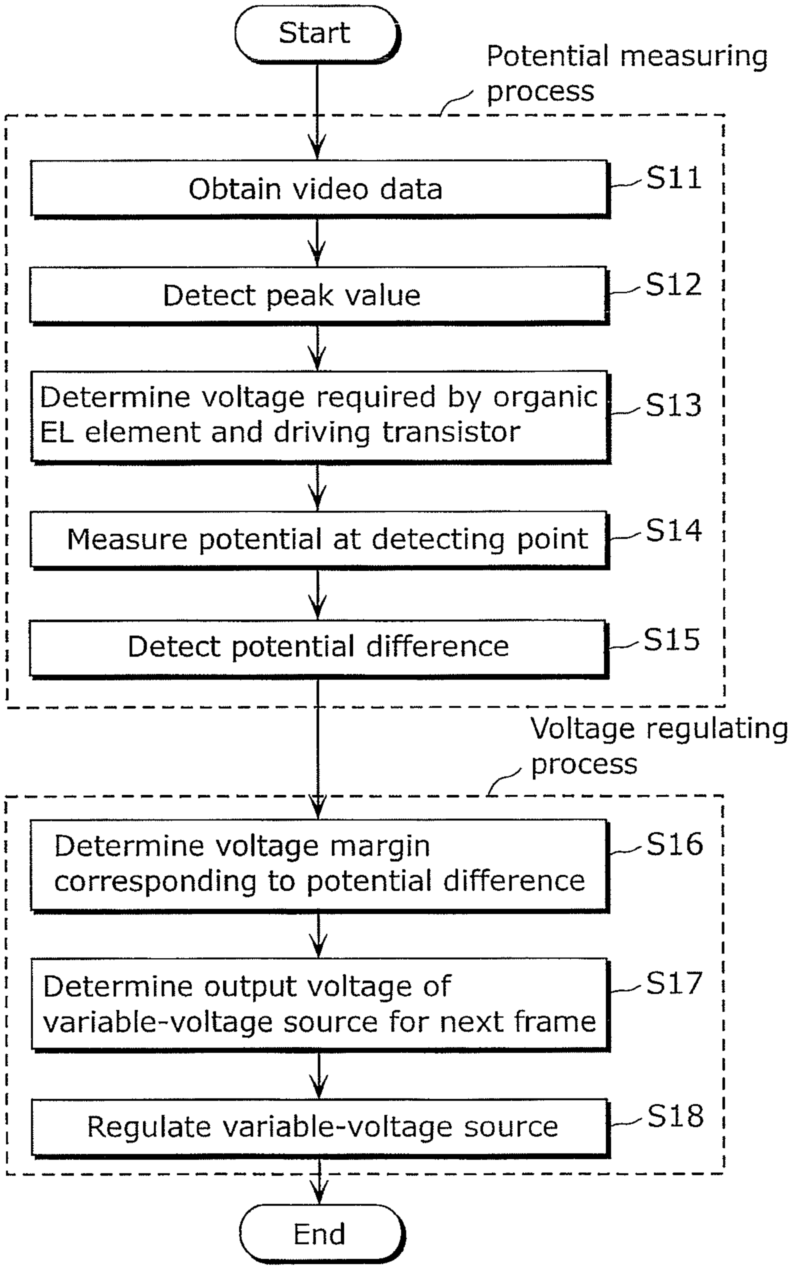
FIG. 21 is a flowchart showing the operation of a display device disclosed herein.

Next, the operation of the aforementioned display device 100 shall be described using FIG. 21, FIG. 22, and FIG. 7.

FIG. 21 is a flowchart showing the operation of the display device 100 according to the present disclosure.

First, the peak signal detecting circuit 150 obtains the video data for one frame period inputted to the display device 100 (step S11). For example, the peak signal detecting circuit 150 includes a buffer and stores the video data for one frame period in such buffer.

Next, the peak signal detecting circuit 150 detects the peak value of the obtained video data (step S12), and outputs a peak signal representing the detected peak value to the signal processing circuit 160. Specifically, the peak signal detecting circuit 150 detects the peak value of the video data for each color. For example, for each of red (R), green (G), and blue (B), the video data is expressed using the 256 gradation levels from 0 to 255 (luminance being higher with a larger value). Here, when part of the video data of the organic EL display unit 110 has R:G:B=177:124:135, another part of the video data of the organic EL display unit 110 has R:G:B=24:177:

50, and yet another part of the video data of the organic EL display unit 110 has R:G:B=10:70:176, the peak signal detecting circuit 150 detects 177 as the peak value of R, 177 for the peak value of G, and 176 as the peak value of B, and outputs, to the signal processing circuit 160, a peak signal representing the detected peak value of each color.

Next, the signal processing circuit 160 determines the voltage VTFT required by the driving transistor 125 and the voltage VEL required by the organic EL element 121 when causing the organic EL element 121 to produce luminescence according to the peak values outputted by the peak signal detecting circuit 150 (step S13).

Specifically, the signal processing circuit 160 determines the VTFT+VEL corresponding to the gradation levels for each color, using a required voltage conversion table indicating the required voltage VTFT+VEL corresponding to the gradation levels for each color.

FIG. 22 is a chart showing an example of the required voltage conversion table provided in the signal processing circuit 160.

As shown in the figure, required voltages VTFT+VEL respectively corresponding to the gradation levels of each color are stored in the required voltage conversion table. For example, the required voltage corresponding to the peak value 177 of R is 8.5V, the required voltage corresponding to the peak value 177 of G is 9.9V, and the required voltage corresponding to the peak value 176 of B is 6.7V. Among the required voltages corresponding to the peak values of the respective colors, the largest voltage is 9.9V corresponding to the peak value of G. Therefore, the signal processing circuit 160 determines VTFT+VEL to be 9.9V.

Meanwhile, the potential difference detecting circuit 170 detects the potential at the detecting point M1 via the monitor wire 190 (step S14).

Next, the potential difference detecting circuit 170 detects the potential difference ΔV between the potential of the output terminal 184 of the variable-voltage source 180 and the potential at the detecting point M1 (step S15). Subsequently, the potential difference detecting circuit 170 outputs the detected potential difference ΔV to the signal processing circuit 160. It is to be noted that the steps S11 to S15 up to this point correspond to the potential measuring process according to the present disclosure.

Next, the signal processing circuit 160 determines a voltage drop margin Vdrop corresponding to the potential difference ΔV detected by the potential difference detecting circuit 170, based on a potential difference signal outputted by the potential difference detecting circuit 170 (step S16). Specifically, the signal processing circuit 160 has a voltage margin conversion table indicating the voltage drop margin Vdrop corresponding to the potential difference ΔV.

As shown in FIG. 7, voltage drop margins Vdrop respectively corresponding to the potential differences ΔV are stored in the voltage margin conversion table. For example, when the potential difference ΔV is 3.4 V, the voltage drop margin Vdrop is 3.4 V. Therefore, the signal processing circuit 160 determines the voltage drop margin Vdrop to be 3.4 V.

Now, as shown in the voltage margin conversion table, the potential difference ΔV and the voltage drop margin Vdrop have an increasing function relationship. Furthermore, the output voltage Vout of the variable-voltage source 180 rises with a bigger voltage drop margin Vdrop. In other words, the potential difference ΔV and the output voltage Vout have an increasing function relationship.

Next, the signal processing circuit 160 determines the output voltage Vout that the variable-voltage source 180 is to be made to output in the next frame period (step S17). Specifically, the output voltage Vout that the variable-voltage source 180 is to be made to output in the next frame period is assumed to be VTFT+VEL+Vdrop which is the sum value of (i) VTFT+VEL determined in the determination (step S13) of the voltage required by the organic EL element 121 and the driving transistor 125 and (ii) the voltage drop margin Vdrop determined in the determination (step S15) of the voltage margin corresponding to the potential difference ΔV.

Lastly, the signal processing circuit 160 regulates the variable-voltage source 180 by setting the first reference voltage Vref1 as VTFT+VEL+Vdrop at the beginning of the next frame period (step S18). With this, in the next frame period, the variable-voltage source 180 supplies Vout=VTFT+VEL+Vdrop to the organic EL display unit 110. It is to be noted that step S16 to step S18 correspond to the voltage regulating process according to the present disclosure.

In this manner, the display device 100 according to this embodiment includes: the variable-voltage source 180 which outputs the high potential and the low potential; the potential difference detecting circuit 170 which measures, for the monitor pixel 111M in the organic EL display unit 110, (i) the high potential to be applied to the monitor pixel 111M and (ii) the high output voltage Vout of the variable-voltage source 180; and the signal processing circuit 160 which regulates the variable-voltage source 180 to set, to the predetermined potential (VTFT+VEL), the high potential that is applied to the monitor pixel 111M that is measured by the potential difference detecting circuit 170. Furthermore, the potential difference detecting circuit 170, in addition, measures the high output voltage Vout of the variable-voltage source 180, detects the potential difference between the measured high output voltage Vout and the high potential to be applied to the monitor pixel 111M. The signal processing circuit 160 regulates the variable-voltage source 180 in accordance with the potential difference detected by the potential difference detecting circuit 170.

With this, the display device 100 can reduce excess voltage and reduce power consumption by detecting the voltage drop caused by the horizontal first power source wire resistance R1*h* and a vertical first power source wire resistance R1*v* and giving feedback to the variable-voltage source 180 regarding the degree of such voltage drop.

Furthermore, in the display device 100, the monitor pixel 111M is located near the center of the organic EL display unit 110, and thus the output voltage Vout of the variable-voltage source 180 can be easily regulated even when the size of the organic EL display unit 110 is increased.

Furthermore, since heat generation by the organic EL element 121 is suppressed through the reduction of power consumption, the deterioration of the organic EL element 121 can be prevented.

Next, the display pattern transition in the case where the video data inputted up to the Nth frame changes from the N+1th frame onward, in the display device 100 described above, shall be described using FIG. 8 and FIG. 9.

Initially, the video data that is assumed to have been inputted in the Nth frame and the N+1th frame shall be described.

First, it is assumed that, up to the Nth frame, the video data corresponding to the central part of the organic EL display unit 110 is a peak gradation level (R:G:B=255:255:255) in which the central part of the organic EL display unit 110 is seen as being white. On the other hand, it is assumed that the video data corresponding to a part of the organic EL display unit 110 other than the central part is a gray gradation level (R:G:B=50:50:50) in which the part of the organic EL display unit 110 other than the central part is seen as being gray.

Furthermore, from the N+1th frame onward, it is assumed that the video data corresponding to the central part of the organic EL display unit 110 is the peak gradation level (R:G:B=255:255:255) as in the Nth frame. On the other hand, it is assumed that the video data corresponding to the part of the organic EL display unit 110 other than the central part is a gray gradation level (R:G:B=150:150:150) that can be seen as a brighter gray than in the Nth frame.

Next, the operation of the display device 100 in the case where video data as described above is inputted in the Nth frame and the N+1th frame shall be described.

FIG. 8 shows the potential difference ΔV detected by the potential difference detecting circuit 170, the output voltage Vout from the variable-voltage source 180, and the pixel luminance of the monitor pixel 111M. Furthermore, a blanking period is provided at the end of each frame period.

In time t=T10, the peak signal detecting circuit 150 detects the peak value of the video data of the Nth frame. The signal processing circuit 160 determines VTFT+VEL from the peak value detected by the peak signal detecting circuit 150. Here, since the peak value of the video data of the Nth frame is R:G:B=255:255:255, the signal processing circuit 160 uses the required voltage conversion table and determines the required voltage VTFT+VEL for the N+1th frame to be, for example, 12.2V.

Meanwhile, the potential difference detecting circuit 170 detects the potential at the detecting point M1 via the monitor wire 190, and detects the potential difference ΔV between the detected potential and the output voltage Vout being outputted by the variable-voltage source 180. For example, in time t=T10, the high-side potential difference detecting circuit 170 detects ΔV=1V. Subsequently, the signal processing circuit 160 uses the voltage margin conversion table and determines the voltage drop margin Vdrop for the N+1th frame to be 1 V.

A time t=T10 to T11 is the blanking period of the Nth frame. In this period, an image which is the same as that in the time t=T10 is displayed in the organic EL display unit 110.

(a) in FIG. 9 schematically shows an image displayed on the organic EL display unit 110 in the time t=T10 to T11. In this period, the image displayed on the organic EL display unit 110 corresponds to the image data of the Nth frame, and thus the central part is white and the part other than the central part is gray.

In time t=T11, the signal processing circuit 160 sets the voltage of the first reference voltage Vref1 as the sum VTFT+VEL+Vdrop (for example, 13.2 V) of the determined required voltage VTFT+VEL and the voltage drop margin Vdrop.

Over a time t=T11 to T16, the image corresponding to the video data of the N+1th frame is gradually displayed on the organic EL display unit 110 ((b) to (f) in FIG. 9). At this time, the output voltage Vout from the variable-voltage source 180 is, at all times, the VTFT+VEL+Vdrop set to the voltage of the first reference voltage Vref1 in time t=T11. However, the video data corresponding to the part of the organic EL display unit 110 other than the central part is a gray gradation level that can be seen as a gray that is brighter than that in the Nth frame. Therefore, the amount of current supplied by the variable-voltage source 180 to the organic EL display unit 110 gradually increases over a time t=T11 to T16, and the voltage drop in the first power source wire 112 gradually increases following this increase in the amount of current. With this, there is a shortage of power source voltage for the pixels 111 in the central part of the organic EL display unit 110, which are the pixels 111 in a brightly displayed region. Stated differently, luminance drops below the image corresponding to the video data R:G:B=255:255:255 of the N+1th frame. Specifically, over the time t=T11 to T16, the pixel luminance of the pixels 111 at the central part of the organic EL display unit 110 gradually drops.

Next, in time t=T16, the peak signal detecting circuit 150 detects the peak value of the video data of the N+1th frame. Here, since the detected peak value of the video data of the N+1th frame is R:G:B=255:255:255, the signal processing circuit 160 determines the required voltage VTFT+VEL for the N+2th frame to be, for example, 12.2 V.

Meanwhile, the potential difference detecting circuit 170 detects the potential at the detecting point M1 via the monitor wire 190, and detects the potential difference ΔV between the detected potential and the output voltage Vout being outputted by the variable-voltage source 180. For example, in time t=T16, the high-side potential difference detecting circuit 170 detects ΔV=3 V. Subsequently, the signal processing circuit 160 uses the voltage margin conversion table and determines the voltage drop margin Vdrop for the N+1th frame to be 3 V.

Next, in time t=T17, the signal processing circuit 160 sets the voltage of the first reference voltage Vref1 to the sum VTFT+VEL+Vdrop (for example, 15.2 V) of the determined required voltage VTFT+VEL and the voltage drop margin Vdrop. Therefore, from time t=T17 onward, the potential at the detecting point M1 becomes VTFT+VEL which is the predetermined potential.

In this manner, in the display device 100, although luminance temporarily drops in the N+1th frame, this is a very short period and thus has practically no impact on the user.

Furthermore, even in this embodiment, the wiring layout described in Embodiment 1 and the first to fifth modifications thereof are applicable to the layout of the monitor wire in the organic EL display unit 110.

With the aforementioned wiring layout, a monitor wire for detecting the potential of the monitor pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

[Embodiment 3]

A display device according to this embodiment is different compared to the display device 100 according to Embodiment 2 in not including the potential difference detecting circuit 170 and in that the potential at the detecting point M1 is inputted to the potential variable-voltage source. Furthermore, the signal processing circuit is different in setting the voltage to be outputted to the variable-voltage source to the required voltage VTFT+VEL. With this, in the display device according to this embodiment, the output voltage Vout of the variable-voltage source can be regulated in real-time in accordance with the voltage drop amount, and thus, compared with Embodiment 1, the temporary drop in pixel luminance can be prevented.

Figure 23:
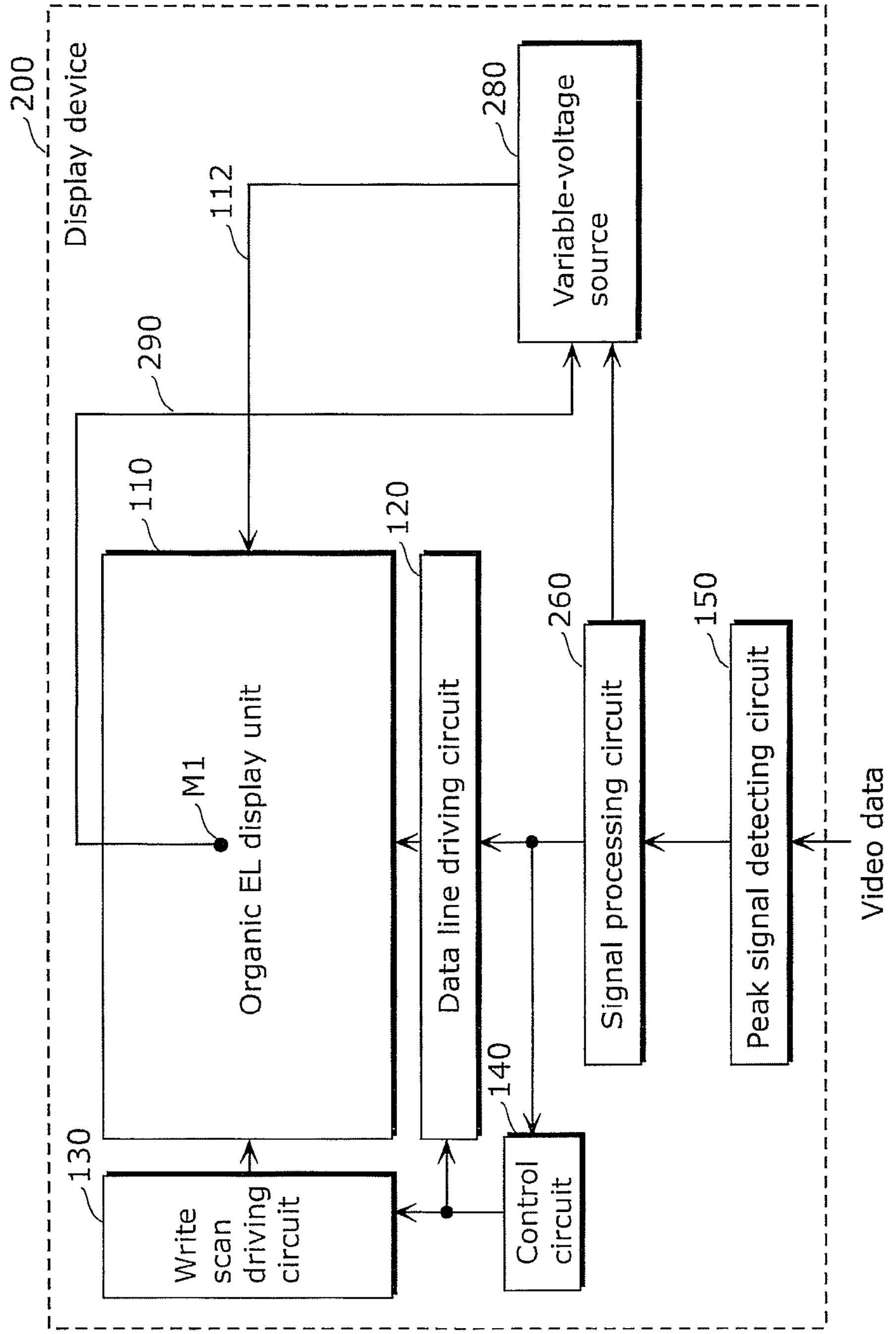
FIG. 23 is a block diagram showing an outline configuration of a display device according to Embodiment 3 disclosed herein.

FIG. 23 is a block diagram showing an outline configuration of a display device according to Embodiment 3.

A display device 200 according to this embodiment shown in the figure is different compared to the display device 100 according to Embodiment 2 shown in FIG. 19 in not including the potential difference detecting circuit 170, and including a monitor wire 290 in place of the monitor wire 190, a signal processing circuit 260 in place of the signal processing circuit 160, and a variable-voltage source 280 in place of the variable-voltage source 180.

The signal processing circuit 260 determines a second reference voltage Vref2 to be outputted to the variable-voltage source 280, from the peak signal outputted by the peak signal detecting circuit 150. Specifically, the signal processing circuit 260 uses the required voltage conversion table and determines the sum VTFT+VEL of the voltage VEL required by an organic EL element 121 and a voltage VTFT required by the driving transistor 125. Subsequently, the signal processing circuit 260 sets the determined VTFT+VEL as the voltage of the second reference voltage Vref2.

In such manner, the second reference voltage Vref2 that is outputted to the variable-voltage source 280 by the signal processing circuit 260 of the display device 200 according to this embodiment is different from the first reference voltage Vref1 that is outputted to the variable-voltage source 180 by the signal processing circuit 160 of the display device 100 according to Embodiment 1, and is a voltage determined in accordance with the video data only. Specifically, the second reference voltage Vref2 is not dependent on the potential difference ΔV between the potential of the output voltage Vout of the variable-voltage source 280 and the potential at the detecting point M1.

The variable-voltage source 280 measures the high-side potential applied to the monitor pixel 111M, via the monitor wire 290. Specifically, the potential difference detecting circuit 170 measures the potential at the detecting point M1. Subsequently, the variable-voltage source 280 regulates the output voltage Vout in accordance with the measured potential at the detecting point M1 and the second reference voltage Vref2 outputted by the signal processing circuit 260.

The monitor wire 290 has one end connected to the detecting point M1 and the other end connected to the variable-voltage source 280, and transmits the potential at the detecting point M1 to the variable-voltage source 280.

Figure 24:
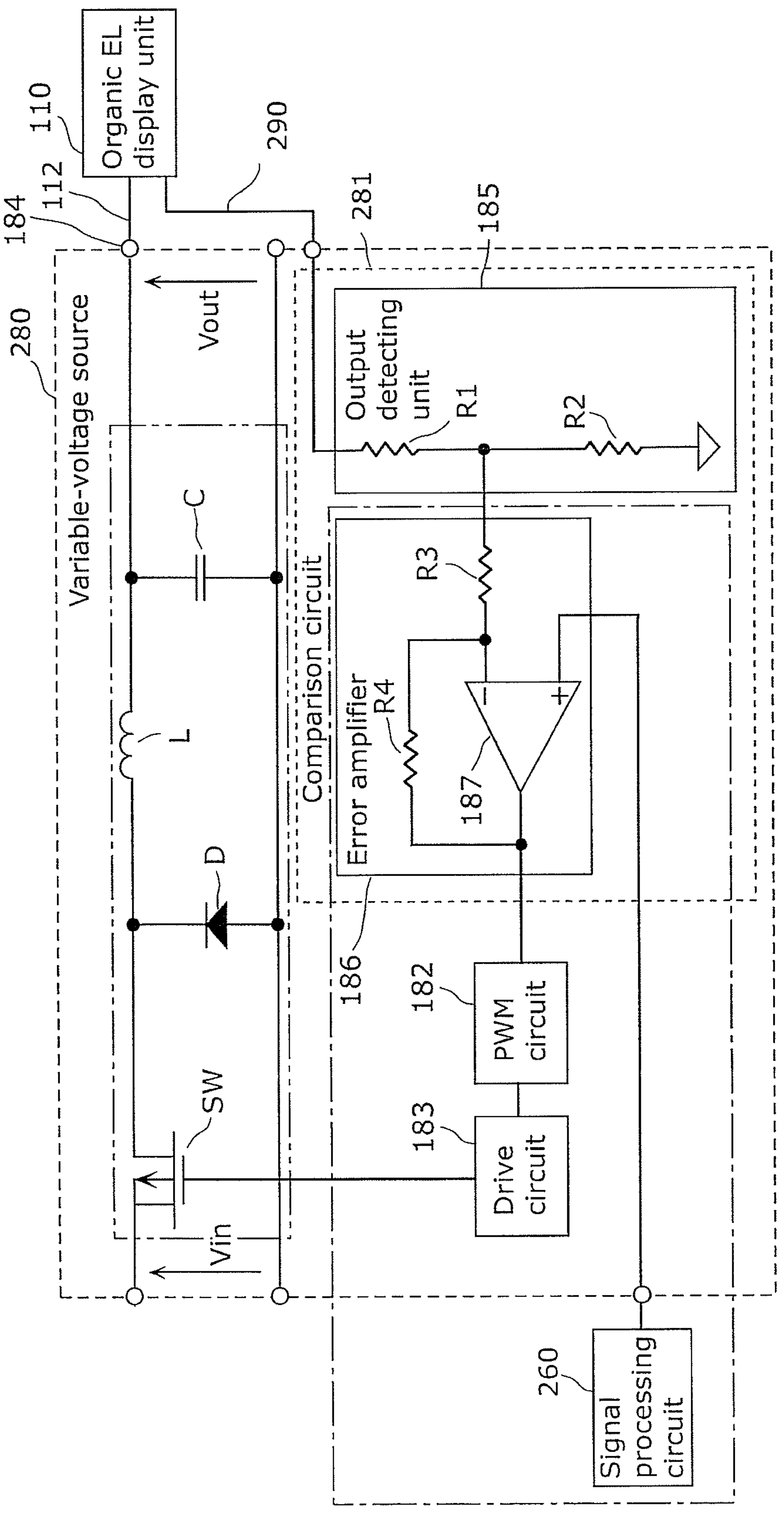
FIG. 24 is a block diagram showing an example of a specific configuration of a variable-voltage source according to Embodiment 3.

FIG. 24 is a block diagram showing an example of a specific configuration of the variable-voltage source 280 in Embodiment 3. It is to be noted that the organic EL display unit 110 and the signal processing circuit 260 which are connected to the variable-voltage source are also shown in the figure.

The variable-voltage source 280 shown in the figure has nearly the same configuration as the variable-voltage source 180 shown in FIG. 20 but is different in including, in place of the comparison circuit 181, a comparison circuit 281 which compares the potential at the detecting point M1 and the potential of the second reference voltage Vref2.

Here, assuming that the output potential of the variable-voltage source 280 is Vout, and the voltage drop amount from the output terminal 184 of the variable-voltage source 280 to the detecting point M1 is ΔV, the potential at the detecting point M1 becomes Vout−ΔV. Specifically, in this embodiment, the comparison circuit 281 compares Vref2 and Vout−ΔV. As described above, since Vref2=VTFT+VEL, it can be said that the comparison circuit 281 is comparing VTFT+VEL and Vout−ΔV.

On the other hand, in Embodiment 2, the comparison circuit 181 compares Vref1 and Vout. As described above, since Vref1=VTFT+VEL+ΔV, it can be said that, in Embodiment 2, the comparison circuit 181 is comparing VTFT+VEL+ΔV and Vout.

Therefore, although the comparison circuit 281 has different comparison subjects as the comparison circuit 181, the comparison result is the same. Specifically, when the voltage drop amount from the output terminal 184 of the variable-voltage source to the detecting point M1 is the same between Embodiment 2 and Embodiment 3, the voltage outputted by the comparison circuit 181 to the PWM circuit and the voltage outputted by the comparison circuit 281 to the PWM circuit are the same. As a result, the output voltage Vout of the variable-voltage source 180 and the output voltage Vout of the variable-voltage source 280 become the same. Furthermore, the potential difference ΔV and the output voltage Vout also have an increasing function relationship in Embodiment 3.

Compared to the display device 100 according to Embodiment 1, the display device 200 configured in the above manner can regulate the output voltage Vout in accordance with the potential difference ΔV between the output terminal 184 and the detecting point M1 in real-time. This is because, in the display device 100 according to Embodiment 2, the signal processing circuit 160 changes the first reference voltage Vref1 for a frame only at the beginning of each frame period. In contrast, in the display device 200 according to this embodiment, Vout can be regulated independently of the control by the signal processing circuit 260, by inputting the voltage that is dependent on the ΔV, that is, Vout−ΔV directly to the comparison circuit 281 of the variable-voltage source 280 without passing through the signal processing circuit 260.

Next, the operation of the display device 200 configured in the above manner, in the case where the video data inputted up to the Nth frame changes from the N+1th frame onward, as in Embodiment 2, shall be described. It is to be noted that, as in Embodiment 2, it is assumed that, up to the Nth frame, the inputted video data is R:G:B=255:255:255 for the central part of the organic EL display unit 110 and is R:G:B=50:50:50 for the part other than the central part, and, from the N+1th frame onward, the inputted video data is R:G:B=255:255:255 for the central part of the organic EL display unit 110 and is R:G:B=150:150:150 for the part other than the central part.

Figure 25:
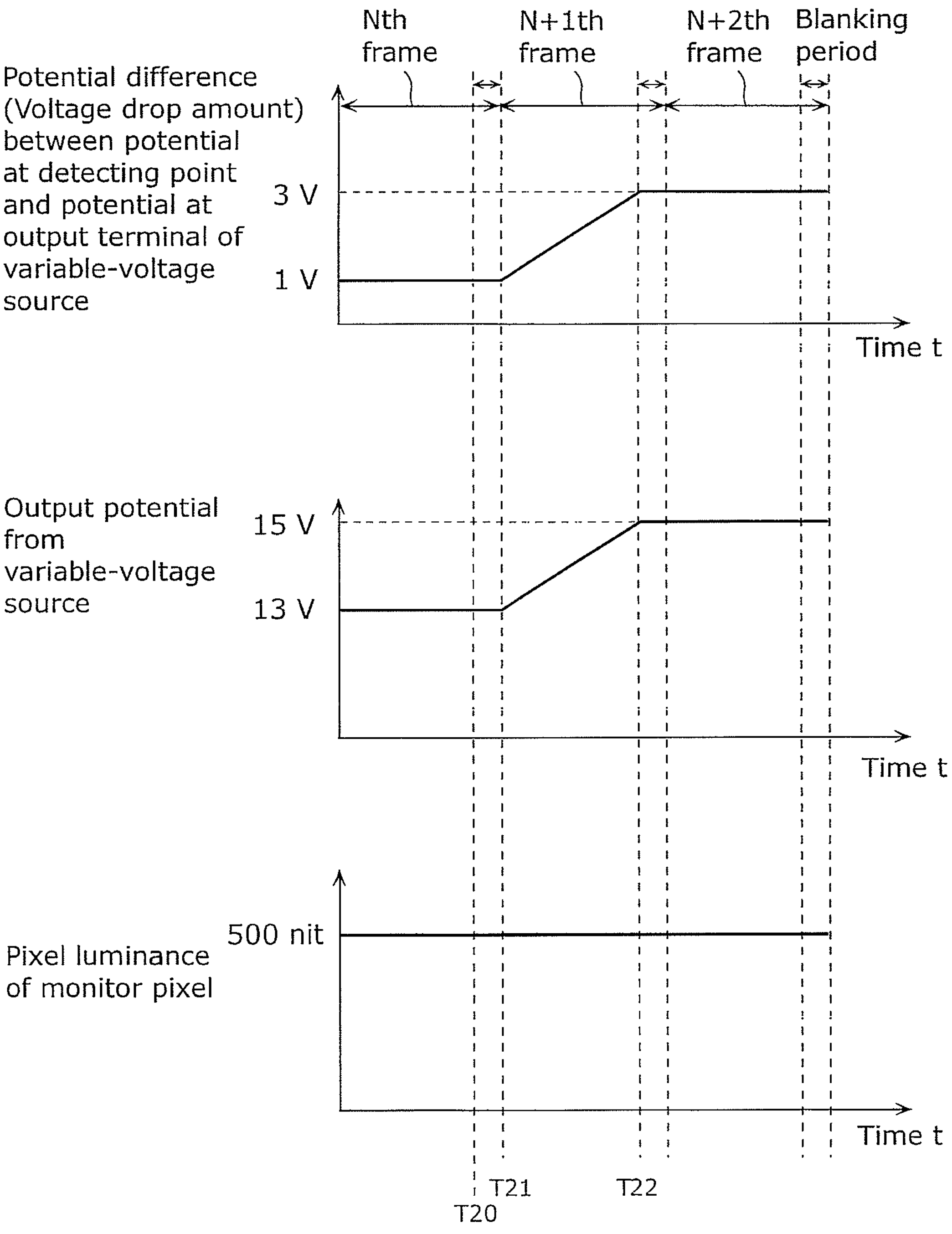
FIG. 25 is a timing chart showing the operation of the display device according to Embodiment 3 from an Nth frame to an N+2th frame.

FIG. 25 is a timing chart showing the operation of the display device 200 according to Embodiment 3 from an Nth frame to an N+2th frame.

In time t=T20, the peak signal detecting circuit 150 detects the peak value of the video data of the Nth frame. The signal processing circuit 260 determines VTFT+VEL from the peak value detected by the peak signal detecting circuit 150. Here, since the peak value of the video data of the Nth frame is R:G:B=255:255:255, the signal processing circuit 260 uses the required voltage conversion table and determines the required voltage VTFT+VEL for the N+1th frame to be, for example, 12.2V.

Meanwhile, the output detecting unit 185 constantly detects the potential at the detecting point M1, via the monitor wire 290.

Next, in time t=T21, the signal processing circuit 260 sets the voltage of the second reference voltage Vref2 to the determined required voltage VTFT+VEL (for example, 12.2V).

Over a time t=T21 to T22, the image corresponding to the video data of the N+1th frame is gradually displayed on the organic EL display unit 110. At this time, the amount of current supplied by the variable-voltage source 280 to the organic EL display unit 110 gradually increases, as described in Embodiment 1. Therefore, following the increase in the amount of current, the voltage drop in the first power source wire 112 gradually increases. Specifically, the potential at the detecting point M1 gradually drops. Stated differently, the potential difference ΔV between the potential of the output voltage Vout and the potential at the detecting point M1 gradually increases.

Here, since the error amplifier 186 outputs, in real-time, a voltage that is in accordance with the potential difference between VTFT+VEL and Vout−ΔV, the error amplifier 186 outputs a voltage that causes Vout to rise in accordance with the increase in the potential difference ΔV.

Therefore, with the variable-voltage source 280, Vout rises in real-time in accordance with the potential difference ΔV.

This resolves the shortage of power source voltage for the pixels 111 in the central part of the organic EL display unit 110 which are the pixels 111 in the brightly displayed region. In other words, the drop in pixel luminance is resolved.

As described above, in the display device 200 according to the present embodiment, the signal processing circuit 260, and the error amplifier 186, the PWM circuit 182, and the drive circuit 183 of the variable-voltage source 280, detect the potential difference between the high potential of the monitor pixel 111 measured by the output detecting unit 185 and the predetermined potential, and regulates the switching element SW in accordance with the detected potential difference. Accordingly, compared with the display device 100 according to Embodiment 2, the display device 200 according to this embodiment is able to regulate the output voltage Vout of the variable-voltage source 280 in real-time in accordance with the voltage drop amount, and thus compared to Embodiment 2, the temporary drop in pixel luminance can be prevented.

It is to be noted that, in the present embodiment, the organic EL display unit 110 is the display unit; the output detecting unit 185 is the voltage measuring unit; the signal processing circuit 260, and the error amplifier 186, the PWM circuit 182, and the drive circuit 183 of the variable-voltage source 280 which are surrounded by the dashed-and-single-dotted line in FIG. 24 are the voltage regulating unit; and the switching element SW, the diode D, the inductor L, and the capacitor C which are surrounded by the dashed-and-double-dotted line in FIG. 24 are the power supplying unit.

Furthermore, even in this embodiment, the wiring layout described in Embodiment 1 and the first to fifth modifications thereof are applicable to the layout of the monitor wire in the organic EL display unit 110.

With the aforementioned wiring layout, a monitor wire for detecting the potential of the monitor pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

[Embodiment 4]

A display device according to this embodiment is different compared to the display device 100 according to Embodiment 2 in measuring the high-side potential of each of two or more pixels 111, detecting the potential difference between each of the measured potentials and the potential of the output voltage of the variable-voltage source 180, and regulating the variable-voltage source 180 in accordance with the largest potential difference out of the detection results.

With this, the output voltage Vout of the variable-voltage source 180 can be more appropriately regulated. Therefore, power consumption can be effectively reduced even when the size of the organic EL display unit is increased.

Figure 26:
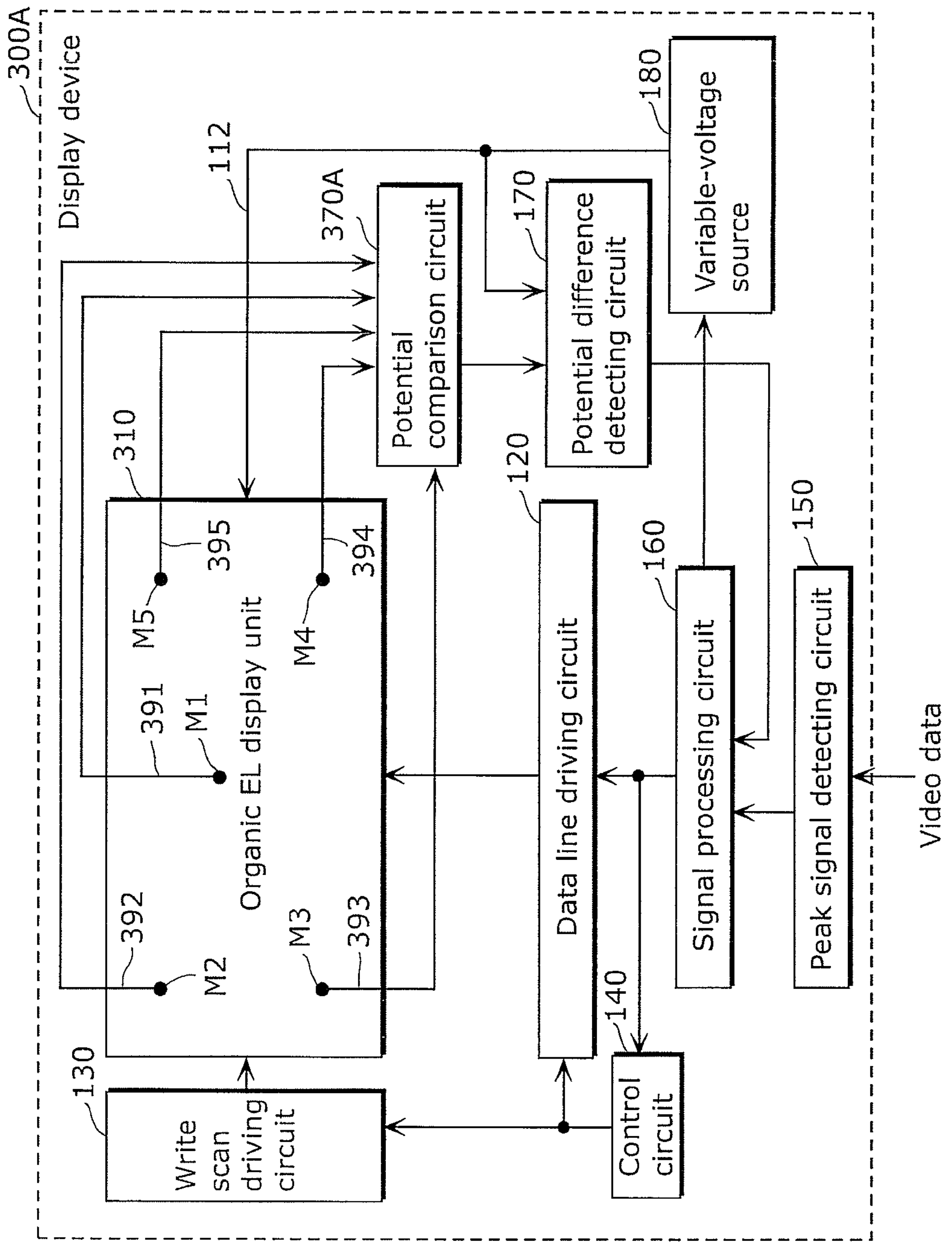
FIG. 26 is a block diagram showing an example of an outline configuration of a display device according to Embodiment 4 disclosed herein.

FIG. 26 is a block diagram showing an example of an outline configuration of the display device according to Embodiment 4.

A display device 300A according to this embodiment shown in the figure is nearly the same as the display device 100 according to Embodiment 2 shown in FIG. 19, but is different compared to the display device 100 in further including a potential comparison circuit 370A, and in including an organic EL display unit 310 in place of the organic EL display unit 110, and monitor wires 391 to 395 in place of the of the monitor wire 190.

The organic EL display unit 310 is nearly the same as the organic EL display unit 110 but is different compared to the organic EL display unit 110 in the placement of the monitor wires 391 to 395 which are provided, on a one-to-one correspondence with detecting points M1 to M5, for measuring the potential at the corresponding detecting point.

It is preferable to provide the detecting points M1 to M5 evenly inside the organic EL display unit 310; for example, at the center of the organic EL display unit 310 and at the center of each region obtained by dividing the organic EL display unit 310 into four as shown in FIG. 26. It is to be noted that although the five detecting points M1 to M5 are illustrated in the figure, having even two or three detecting points is sufficient, as long as there are plural detecting points.

Each of the monitor wires 391 to 395 is connected to the corresponding one of the detecting points M1 to M5 and to the potential comparison circuit 370A, and transmits the potential of the corresponding one of the detecting points M1 to M5 to the potential comparison circuit 370A. With this, the potential comparison circuit 370A can measure the potentials at the detecting points M1 to M5 via the monitor wires 391 to 395.

The potential comparison circuit 370A measures the potentials at the detecting points M1 to M5 via the monitor wires 391 to 395. Stated differently, the potential comparison circuit 370A measures the high-side potential applied to plural monitor pixels 111M. In addition, the potential comparison circuit 370A selects the lowest potential among the measured potentials at the detecting points M1 to M5, and outputs the selected potential to the potential difference detecting circuit 170.

The potential difference detecting circuit 170, as in Embodiment 1, detects the potential difference ΔV between the inputted potential and the output voltage Vout of the variable-voltage source 180, and outputs the detected potential difference ΔV to the signal processing circuit 160.

Therefore, the signal processing circuit 160 regulates the variable-voltage source 180 based on the potential selected by the potential comparison circuit 370A. As a result, the variable-voltage source 180 outputs, to the organic EL display unit 310, an output voltage Vout with which dropping of luminance does not occur in any of the monitor pixels 111M.

As described above, in the display device 300A according to this embodiment, the potential comparison circuit 370A measures the high-side potential applied to each of the pixels 111 inside the organic EL display unit 310, and selects the lowest potential among the measured potentials of the pixels 111. In addition, the potential difference detecting circuit 170 detects the potential difference ΔV between the lowest potential selected by the potential comparison circuit 370A and the potential of the output voltage Vout of the variable-voltage source 180. Then, the signal processing circuit 160 regulates the variable-voltage source 180 in accordance with the detected potential difference ΔV.

It is to be noted that, in the display device 300A according to the present embodiment: the variable-voltage source 180 is the power supplying unit; the organic EL display unit 310 is the display unit; one part of the potential comparison circuit 370A is the voltage measuring unit; and the other part of the potential comparison circuit 370A, the potential difference detecting circuit 170, and the signal processing circuit 160 are the voltage regulating unit.

Furthermore, although the potential comparison circuit 370A and the potential difference detecting circuit 170 are provided separately in the display device 300A, a potential comparison circuit which compares the potential of the output voltage Vout of the variable-voltage source 180 and the potential at each of the detecting points M1 to M5 may be provided in place of the potential comparison circuit 370A and the potential difference detecting circuit 170.

Figure 27:
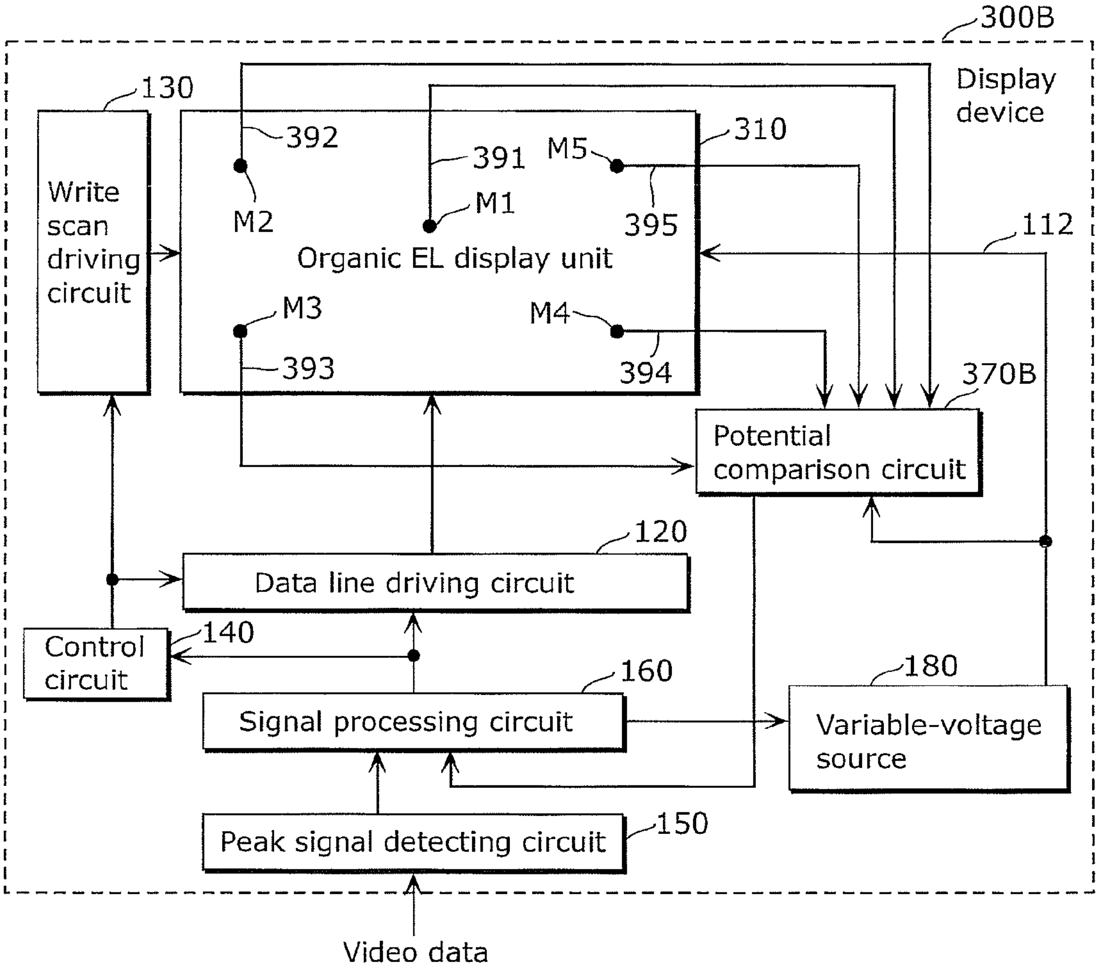
FIG. 27 is a block diagram showing another example of an outline configuration of a display device according to Embodiment 4.

FIG. 27 is a block diagram showing another example of an outline configuration of a display device according to Embodiment 4.

Although having nearly the same configuration as the display device 300A shown in FIG. 26, the display device 300B shown in the figure is different in including a potential comparison circuit 370B in place of the potential comparison circuit 370A and the potential difference detecting circuit 170.

The potential comparison circuit 370B detects potential differences corresponding to the detecting points M1 to M5 by comparing the potential of the output voltage Vout of the variable-voltage source 180 and the potential at each of the detecting points M1 to M5. Subsequently, the potential comparison circuit 370B selects the largest potential difference out of the detected potential differences, and outputs the potential difference ΔV, which is the largest potential difference, to the signal processing circuit 160.

The signal processing circuit 160 regulates the variable-voltage source 180 in the same manner as the signal processing circuit 160 of the display apparatus 300A.

It is to be noted that, in the display device 300B: the variable-voltage source 180 is the power supplying unit; the organic EL display unit 310 is the display unit; one part of the potential comparison circuit 370B is the voltage measuring unit; and the other part of the potential comparison circuit 370B and the signal processing circuit 160 are the voltage regulating unit.

As described above, the display devices 300A and 300B according to this embodiment supply, to the organic EL display unit 310, an output voltage Vout with which dropping of luminance does not occur in any of the monitor pixels 111M. In other words, by setting the output voltage Vout to a more appropriate value, power consumption is further reduced and the dropping of luminance of the pixel 111 is suppressed. The advantageous effect thereof shall be described below using FIG. 28A to FIG. 29B.

Figure 28A:
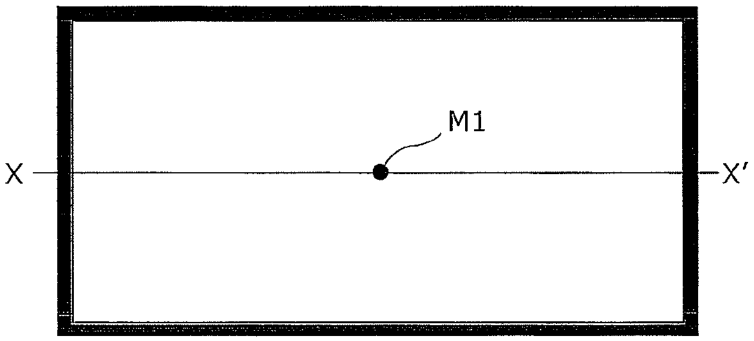
FIG. 28A is diagram schematically showing an example of an image displayed on the organic EL display unit according to Embodiment 4.
Figure 28B:
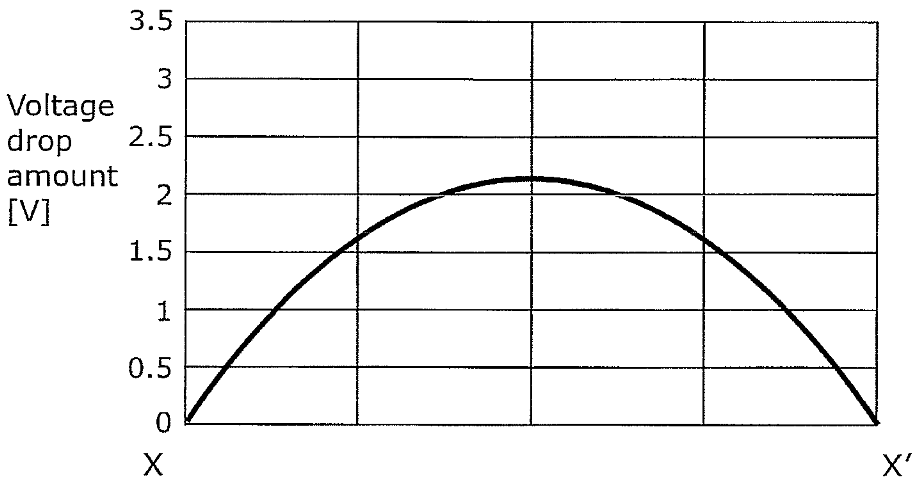
FIG. 28B is a graph showing a voltage drop amount for a first power source wire in line x-x' in FIG. 28A.

FIG. 28A is a diagram schematically showing an example of an image displayed on the organic EL display unit 310, and FIG. 28B is a graph showing the voltage drop amount for the first power source wire 112 in line x-x' in the case of the image shown in FIG. 28A. Furthermore, FIG. 29A is a diagram schematically showing another example of an image displayed on the organic EL display unit 310, and FIG. 29B is a graph showing the voltage drop amount for the first power source wire 112 in line x-x' in the case of the image shown in FIG. 29A.

As shown in the FIG. 28A, when all of the pixels 111 of the organic EL display unit 310 produce luminescence at the same luminance, the voltage drop amount for the first power source wire 112 is as shown in FIG. 28B.

Therefore, the worst case for the voltage drop can be known by checking the potential at the detecting point M1 at the center of the screen. Therefore, by adding the voltage drop margin Vdrop corresponding to the voltage drop amount ΔV of the detecting point M1 to VTFT+VEL, it is possible to cause all of the pixels 111 inside the organic EL display unit 310 to produce luminescence at a precise luminance.

Figure 29A:
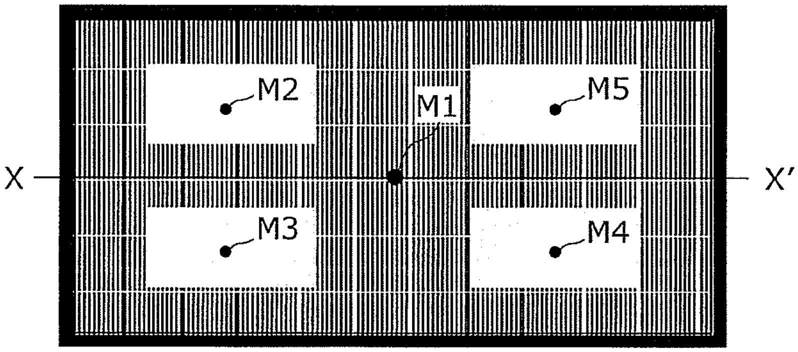
FIG. 29A is diagram schematically showing another example of an image displayed on the organic EL display unit according to Embodiment 4.
Figure 29B:
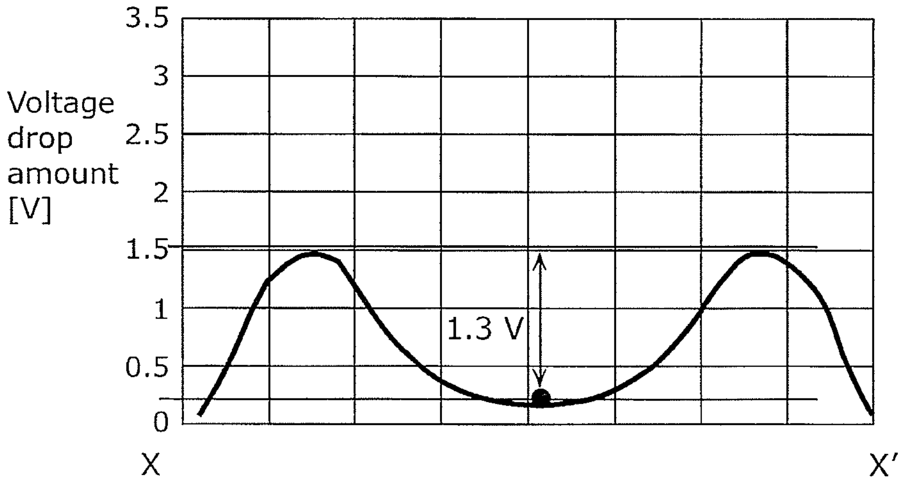
FIG. 29B is a graph showing a voltage drop amount for a first power source wire in line x-x' in FIG. 29A.

On the other hand, as shown in the FIG. 29A, when the pixels 111 at the central part of regions obtained when the screen is divided in two in the vertical direction and divided in two in the horizontal direction, that is, the regions obtained by dividing the screen into four, produce luminescence at the same luminance and the other pixels 111 do not produce luminescence, the voltage drop amount for the first power source wire 112 is as shown in FIG. 29B.

Therefore, when measuring only the potential at the detecting point M1 at the center of the screen, it is necessary to set, as the voltage drop margin, a voltage obtained by adding a certain offset potential to the detected potential. For example, by pre-setting the voltage margin conversion table such that a voltage obtained by always adding an offset of 1.3 V to the voltage drop amount (0.2 V) at the center of the screen is set as the voltage drop margin Vdrop, it is possible to cause all of the pixels 111 inside the organic EL display unit 310 to produce luminescence at a precise luminance. Here, producing luminescence at a precise luminance means that the driving transistor 125 of the pixel 111 is operating in the saturation region.

However, in this case, since 1.3 V is always required as a voltage drop margin Vdrop, the power consumption reducing effect is lessened. For example, even in the case of an image in which the actual voltage drop amount is 0.1 V, 0.1+1.3=1.4 V is held as the voltage drop margin, and thus the output voltage Vout increases by such amount, and the power consumption reducing effect is lessened.

In view of this, by adopting a configuration which divides the screen into four as shown in FIG. 29A and measures the potential at the five locations of the detecting points M1 to M5 at the center of each of the four regions and the center of the entire screen, the accuracy of voltage drop amount detection can be enhanced. Therefore, it is possible to reduce the additional offset amount and increase the power consumption reducing effect.

For example, in the case where the potential at the detecting points M2 to M5 is 1.3 V in FIG. 29A and FIG. 29B, by setting, as the voltage drop margin, a voltage obtained by adding an offset of 0.2 V to the respective voltages at the detecting points M2 to M5, it is possible to cause all of the pixels 111 inside the organic EL display unit 310 to produce luminescence at a precise luminance.

In this case, even in the case of an image in which the actual voltage drop amount is 0.1 V, the value to be set as the voltage margin Vdrop is 0.1+0.2=0.3V, and thus 1.1 V of power source voltage can be further reduced compared to when only the potential at the detecting point M1 at the center of the screen is measured.

As described above, compared to the display devices 100 and 200, in the display devices 300A and 300B, there are many detecting points and the output voltage Vout can be regulated in accordance with the largest value out of the measured voltage drop amounts. Therefore, power consumption can be effectively reduced even when the size of the organic EL display unit 310 is increased.

Furthermore, even in this embodiment, the wiring layout described in Embodiment 1 and the first to fifth modifications thereof are applicable to the layout of the monitor wire in the organic EL display unit 110.

With the aforementioned wiring layout, a monitor wire for detecting the potential of the monitor pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

[Embodiment 5]

In the same manner as the display devices 300A and 300B according to Embodiment 4, in a display device according to this embodiment, the high-side potential for each of two or more pixels 111 is measured, and the potential difference between each of the plural detected potentials and the potential of the output voltage of the variable-voltage source is detected. Subsequently, the variable-voltage source is regulated so that the output voltage of the variable-voltage source changes in accordance with the largest potential difference. However, the display device according to this embodiment is different compared to the display devices 300A and 300B in that the potential selected in the potential comparison circuit is inputted, not to the signal processing circuit, but to the variable-voltage source.

With this, in the display device according to the present embodiment, the output voltage Vout of the variable-voltage source can be regulated in real-time in accordance with the voltage drop amount, and thus, compared to the display devices 300A and 300B, the temporary drop in pixel luminance can be prevented.

Figure 30:
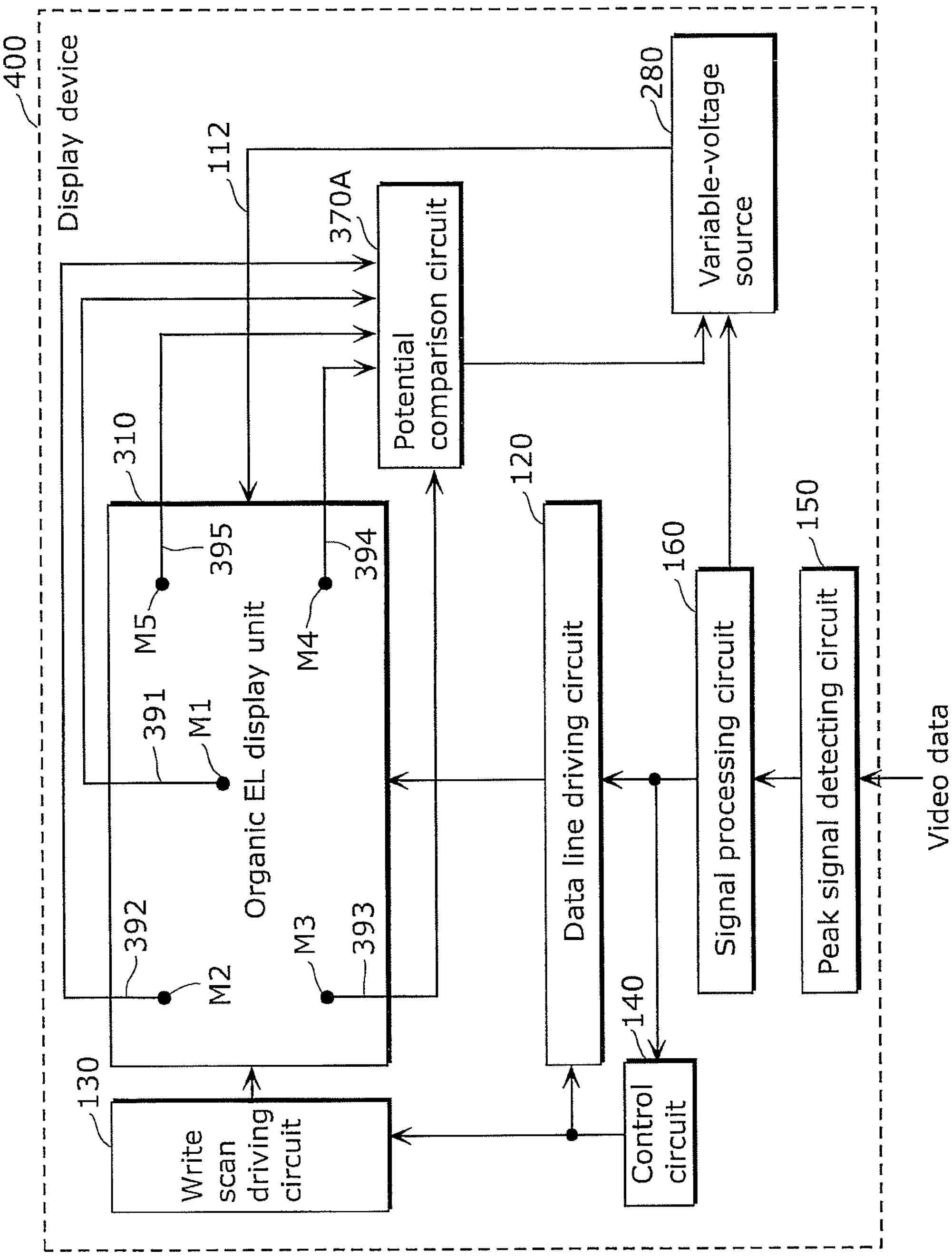
FIG. 30 is a block diagram showing an outline configuration of a display device according to Embodiment 5 disclosed herein.

FIG. 30 is a block diagram showing an outline configuration of a display device according to Embodiment 5.

A display device 400 in the figure has nearly the same configuration as the display device 300A in Embodiment 4 but is different in including the variable-voltage source 280 in place of the variable-voltage source 180, the signal processing circuit 260 in place of the signal processing circuit 160, and in not including the potential difference detecting circuit 170 and having the potential selected by the potential comparison circuit 370A inputted to the variable-voltage source 280.

With this, in the variable-voltage source 280, the output voltage Vout rises in real-time in accordance with the lowest voltage selected by the potential comparison circuit 370A.

Therefore, compared to the display devices 300A and 300B, the display device 400 according to this embodiment can resolve the temporary drop in pixel luminance.

Furthermore, even in this embodiment, the wiring layout described in Embodiment 1 and the first to fifth modifications thereof are applicable to the layout of the monitor wire in the organic EL display unit 110.

With the aforementioned wiring layout, a monitor wire for detecting the potential of the monitor pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

[Embodiment 6]

Embodiment 1 describes a display device which monitors the high-side potential or the low-side potential of one pixel to thereby regulate the potential difference between the high-side potential and a reference potential or the potential difference between the low-side potential and a reference potential to a predetermined potential difference. In contrast, this embodiment describes a display device which monitors the high-side potential of a single pixel and the low-side potential of a different pixel to regulate the potential difference between the high-side potential and a reference potential A to a predetermined potential difference, and to regulate the potential difference between the low-side potential and a reference potential B to a predetermined potential difference.

Hereinafter, Embodiment 6 shall be specifically described with reference to the Drawings.

Figure 31:
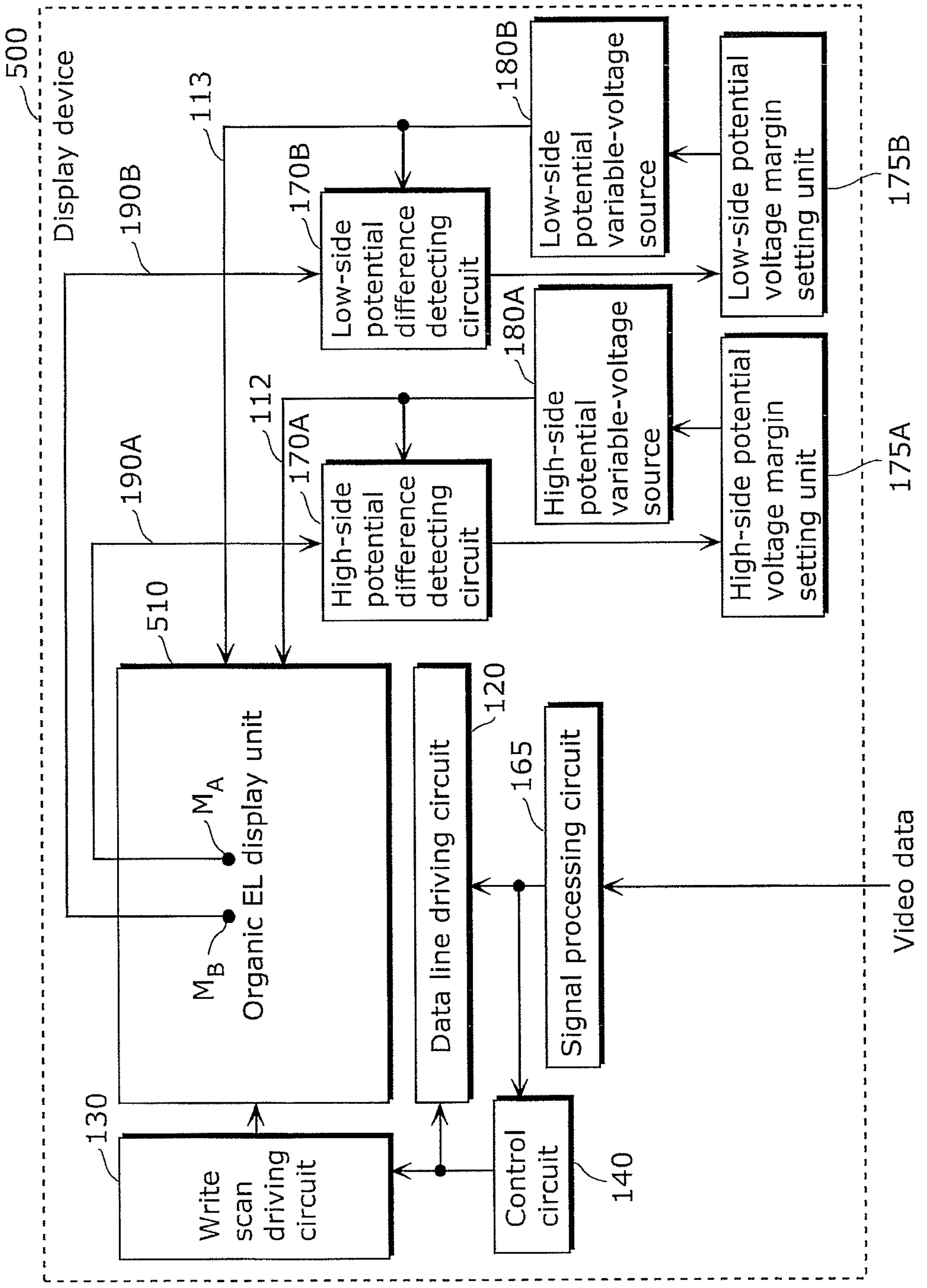
FIG. 31 is a block diagram showing an outline configuration of a display device according to Embodiment 6 disclosed herein.

FIG. 31 is a block diagram showing an outline configuration of a display device according to Embodiment 6.

A display device 500 shown in the figure includes an organic EL display unit 510, the data line driving circuit 120, the write scan driving circuit 130, the control circuit 140, the signal processing circuit 165, a high-side potential difference detecting circuit 170A, a low-side potential difference detecting circuit 170B, a high-side potential voltage margin setting unit 175A, a low-side potential voltage margin setting unit 175B, a high-side potential variable-voltage source 180A, a low-side potential variable-voltage source 180B, and monitor wires 190A and 190B.

Compared to the display device 50 according to Embodiment 1, the display device 500 according to this embodiment is different in including two potential difference detecting circuits, two monitor wires, and two variable-voltage sources, for the high-side potential and the low-side potential, respectively. Description of points identical to those in Embodiment 1 shall not be repeated, and only the points of difference shall be described hereafter.

Figure 32:
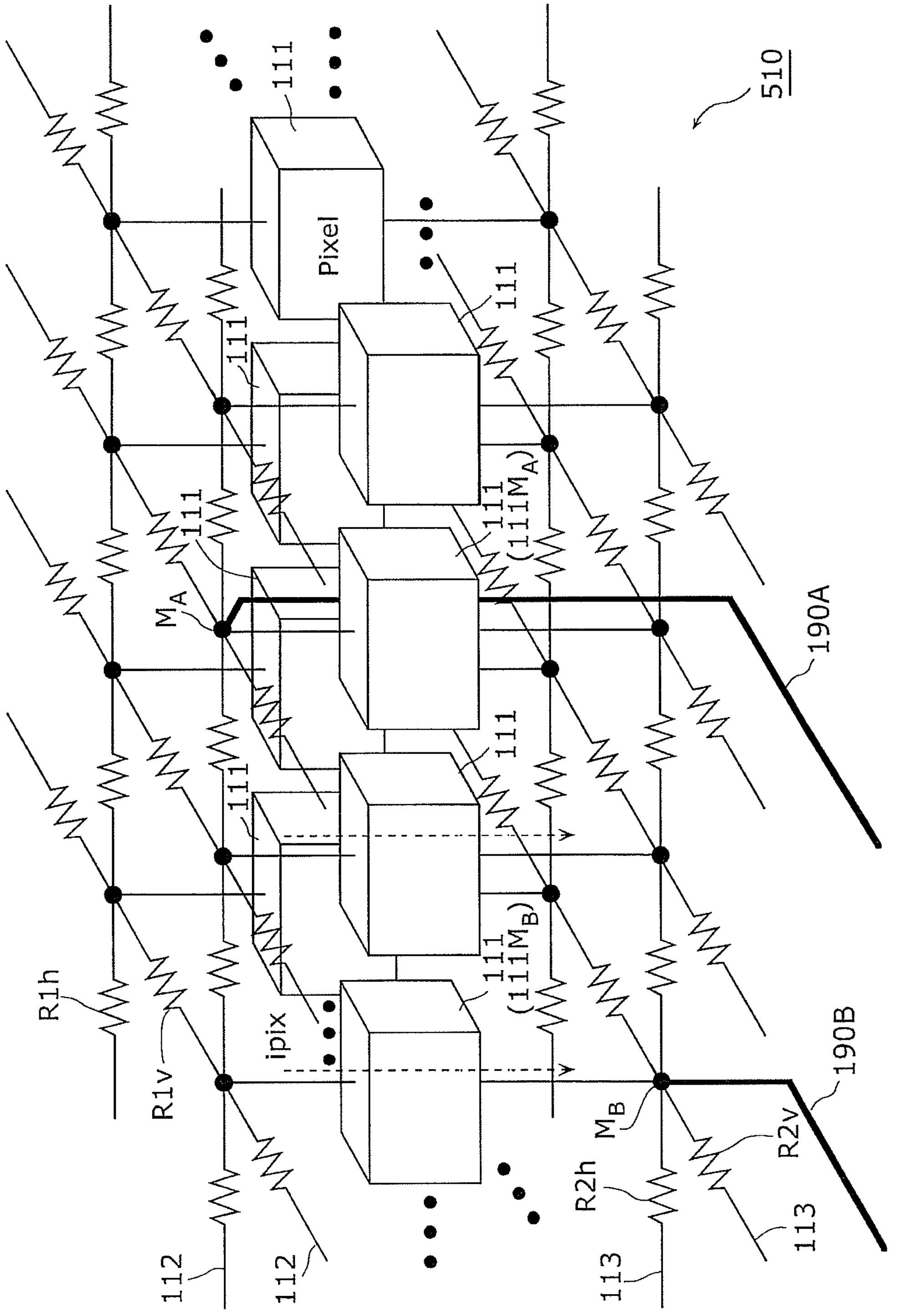
FIG. 32 is a perspective view schematically showing a configuration of the organic EL display unit according to Embodiment 6.

FIG. 32 is a perspective view schematically showing a configuration of the organic EL display unit 510 according to Embodiment 6. It is to be noted that the lower portion of the figure is the display screen side. As shown in the figure, the organic EL display unit 510 includes the pixels 111, the first power source wire 112, and the second power source wire 113. At least one predetermined pixel out of the pixels 111 is connected to the monitor wire 190A at a high-side potential detecting point $M_A$. Furthermore, at least one predetermined pixel out of the pixels 111 is connected to the monitor wire 190B at a low-side potential detecting point $M_B$. Hereinafter, the pixel 111 that is directly connected to the monitor wire 190A shall be denoted as monitor pixel 111$M_A$, and the pixel 111 that is directly connected to the monitor wire 190B shall be denoted as monitor pixel 111$M_B$.

The first power source wire 112 is arranged in a net-like manner to correspond to the pixels 111 that are arranged in a matrix, and is electrically connected to the high-side potential variable-voltage source 180A disposed at the periphery of the organic EL display unit 510. Through the outputting of a high-side power source potential from the high-side potential variable-voltage source 180A, a potential corresponding to the high-side power source potential outputted by the high-side potential variable-voltage source 180A is applied to the first power source wire 112. On the other hand, the second power source wire 113 is formed in the form of a continuous film on the organic EL display unit 510, and is connected to the low-side potential variable-voltage source 180B disposed at the periphery of the organic EL display unit 510. Through the outputting of a low-side power source potential from the low-side potential variable-voltage source 180A, a potential corresponding to the low-side power source potential outputted by the low-side potential variable-voltage source 180A is applied to the second power source wire 113.

The optimal position of the monitor pixels 111$M_A$ and 111$M_B$ is determined depending on the wiring method of the first power source wire 112 and the second power source wire 113, the respective values of the first power source wire resistances R1*h* and R1*v*, and the respective values of the second power source wire resistances R2*h* and R2*v*. In this embodiment, the high-side potential detecting point $M_A$ and the low-side potential detecting point $M_B$ are disposed in different pixels. This allows for optimization of detecting points. For example, by disposing the pixel 111$M_A$ in a luminescence producing region in which there is a tendency for a large high-side potential voltage drop, and disposing the pixel 111$M_B$ in a luminescence producing region in which there is a tendency for a large low-side potential voltage drop (rise), detecting points need not be provided in unnecessary locations and thus the total number of detecting points can be reduced.

Since a cathode electrode of an organic EL element 121 which makes up part of a common electrode included in the second power source wire 113 uses a transparent electrode (for example, ITO) having high sheet resistance, there are cases where the voltage rise amount for the second power source wire 113 is larger than the voltage drop amount for the first power source wire 112. Therefore, by regulating in accordance with the low-side potential applied to the monitor pixel, the output potential of the power supplying unit can be regulated more appropriately, and power consumption can be further reduced.

Figure 33A:
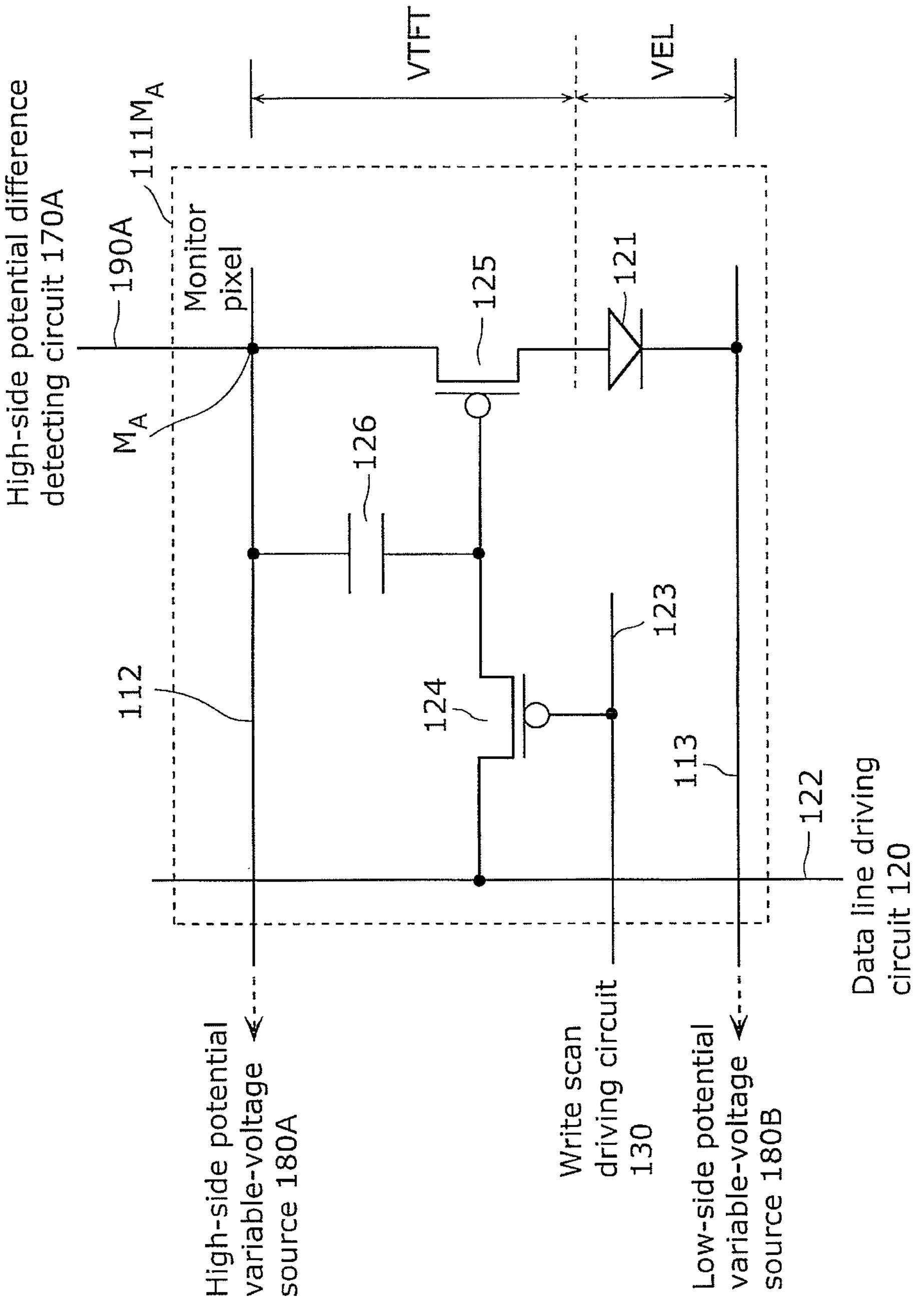
FIG. 33A is a diagram of the circuit configuration of a pixel connected to a high-side potential monitor wire.
Figure 33B:
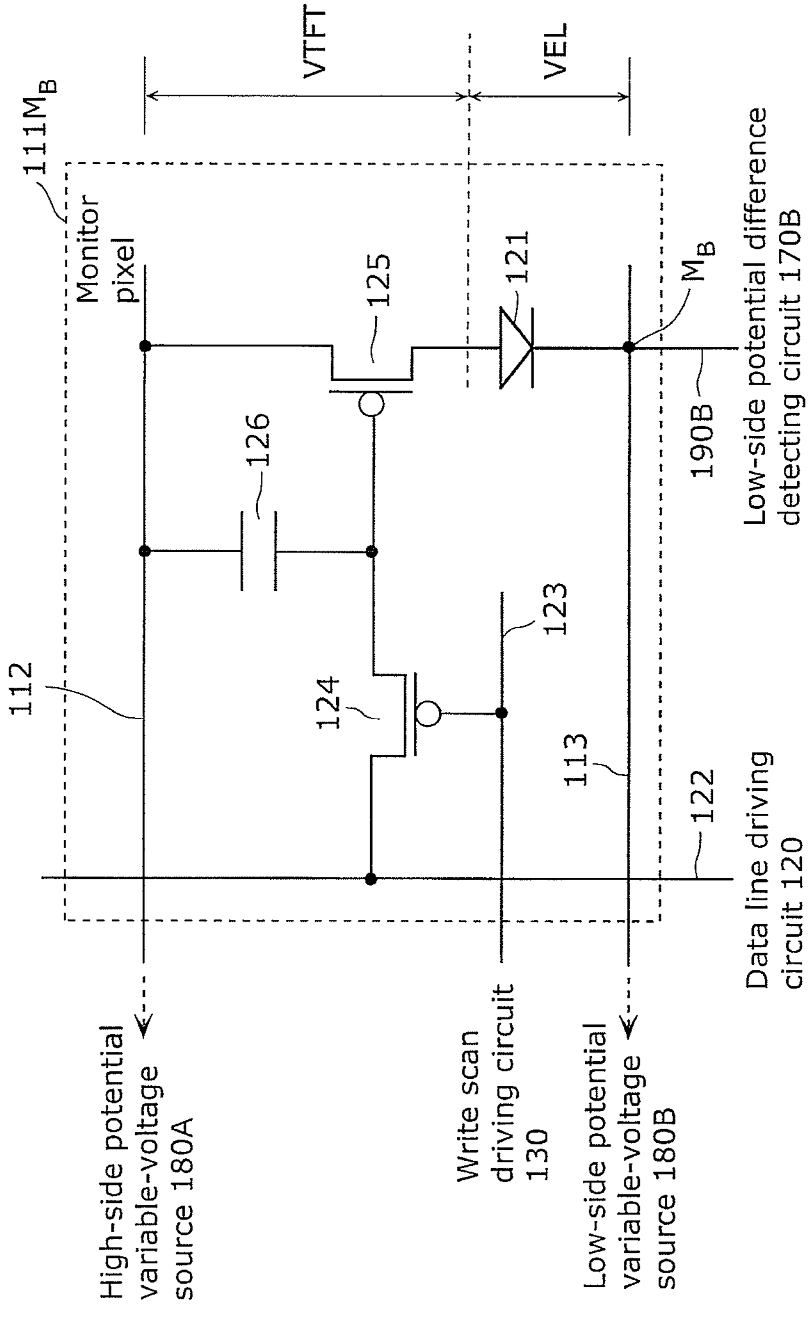
FIG. 33B is a diagram of the circuit configuration of a pixel connected to a low-side potential monitor wire.

FIGS. 33A and 33B are circuit diagrams showing an example of a specific configuration of a pixel 111. Specifically, FIG. 33A is a diagram of the circuit configuration of the pixel 111$M_A$ connected to the high-side potential monitor wire 190A, and FIG. 33B is a diagram of the circuit configuration of the pixel 111$M_B$ connected to the low-side potential monitor wire 190B. In the pixel 111$M_A$, the monitor wire 190A is connected to the other of the source electrode and the drain electrode of the driving element, and, in the pixel 111$M_B$, the monitor wire 190B is connected to the second electrode of the luminescence element. Specifically, each of the pixels 111, 111$M_A$, and 111$M_B$ includes an organic EL element 121, a data line 122, a scanning line 123, a switch transistor 124, a driving transistor 125, and a holding capacitor 126. At least one pixel 111$M_A$ is disposed in the organic EL display unit 510, and at least one pixel 111$M_B$ is likewise disposed in the organic EL display unit 510.

The functions of the respective constituent elements shown in FIG. 31 shall be described below with reference to FIG. 33A and FIG. 33B The high-side potential difference detecting circuit 170A, which is the voltage detecting unit in this embodiment, measures, for the monitor pixel 111$M_A$, the high-side potential to be applied to the monitor pixel 111$M_A$. Specifically, the high-side potential difference detecting circuit 170A measures, via the monitor wire 190A, the high-side potential to be applied to the monitor pixel 111$M_A$. In addition, the high-side potential difference detecting circuit 170A measures the output potential of the high-side potential variable-voltage source 180A, and measures the potential difference ΔVH between (i) the potential difference between the measured high-side potential to be applied to the monitor pixel 111$M_A$ and the reference potential A and (ii) the output potential of the high-side potential variable-voltage source 180A. Subsequently, the high-side potential difference detecting circuit 170A outputs the measured potential difference ΔVH to the high-side potential voltage margin setting unit 175A.

The low-side potential difference detecting circuit 170B, which is the voltage detecting unit in this embodiment, measures, for the monitor pixel 111$M_B$, the low-side potential to be applied to the monitor pixel 111$M_B$. Specifically, the low-side potential difference detecting circuit 170B measures, via the monitor wire 190B, the low-side potential to be applied to the monitor pixel 111$M_B$. In addition, the low-side potential difference detecting circuit 170B measures the output potential of the low-side potential variable-voltage source 180B, and measures the potential difference ΔVL between (i) the potential difference between the measured low-side potential to be applied to the monitor pixel 111$M_B$ and the reference potential B and (ii) the output potential of the low-side variable-voltage source 180B. Subsequently, the low-side potential difference detecting circuit 170B outputs the measured potential difference ΔVL to the low-side potential voltage margin setting unit 175B.

The high-side potential voltage margin setting unit 175A, which is the high-side potential voltage regulating unit in this embodiment, regulates, based on a voltage (VEL+VTFT) at a peak gradation level and the potential difference ΔVH detected by the high-side potential difference detecting circuit 170A, the high-side potential variable-voltage source 180A to set the potential difference between the potential of the monitor pixel 111$M_A$ and the reference potential A to a predetermined potential. Specifically, the high-side potential voltage margin setting unit 175A calculates a voltage drop margin VHdrop based on the potential difference detected by the high-side potential difference detecting circuit 170A. Subsequently, the high-side potential voltage margin setting unit 175A sums up the voltage (VEL+VTFT) at the peak gradation level and the voltage drop margin VHdrop, and outputs a higher voltage than the reference potential A of the summation result VEL+VTFT+VHdrop, as a first high-side potential reference voltage VHref1, to the high-side potential variable-voltage source 180A.

The low-side potential voltage margin setting unit 175B, which is the low-side potential voltage regulating unit in this embodiment, regulates, based on a voltage (VEL+VTFT) at a peak gradation level and the potential difference ΔVL detected by the low-side potential difference detecting circuit 170B, the low-side potential variable-voltage source 180B to set the potential difference between the potential of the monitor pixel 111$M_B$ and the reference potential B to a predetermined potential. Specifically, the low-side potential voltage margin setting unit 175B calculates a voltage drop margin VLdrop based on the potential difference detected by the low-side potential difference detecting circuit 170B. Subsequently, the low-side potential voltage margin setting unit 175B sums up the voltage (VEL+VTFT) at the peak gradation level and the voltage drop margin VLdrop, and outputs a lower voltage than the reference potential B of the summation result VEL+VTFT+VLdrop, as a first low-side potential reference voltage VLref1, to the low-side potential variable-voltage source 180B.

The high-side potential variable-voltage source 180A, which is the power supplying unit in this embodiment, outputs the high-side potential to the organic EL display unit 510. The high-side potential variable-voltage source 180A outputs an output voltage VHout for setting the potential difference between the high-side potential of the monitor pixel 111$M_A$ and the reference potential A to the predetermined voltage (VEL+VTFT—reference potential A), according to the first high-side potential reference voltage VHref1 outputted by the high-side potential voltage margin setting unit 175A. It is sufficient that reference potential A be a potential serving as a reference in the display device 500.

The low-side potential variable-voltage source 180B, which is the power supplying unit in this embodiment, outputs the low-side potential to the organic EL display unit 510. The low-side potential variable-voltage source 180B outputs an output voltage VLout for setting the potential difference between the low-side potential of the monitor pixel 111$M_B$ and the reference potential B to the predetermined voltage (reference potential B−VEL+VTFT), according to the first low-side potential reference voltage VLref1 outputted by the low-side potential voltage margin setting unit 175B.

The monitor wire 190A is a high-side potential detecting line which is arranged along the row direction or the column direction of the matrix of the organic EL display unit 510, has one end connected to the monitor pixel 111$M_A$ and the other end connected to the high-side potential difference detecting circuit 170A, and transmits the high-side potential applied to the monitor pixel 111$M_A$ to the high-side potential difference detecting circuit 170A.

The monitor wire 190B is a low-side potential detecting line which is arranged along the row direction or the column direction of the matrix of the organic EL display unit 510, has one end connected to the monitor pixel 111$M_B$ and the other end connected to the low-side potential difference detecting circuit 170B, and transmits the low-side potential applied to the monitor pixel 111$M_B$ to the low-side potential difference detecting circuit 170B.

Furthermore, the configuration of the high-side potential variable-voltage source 180A and the low-side potential variable-voltage source 180B according this embodiment is the same as the configuration of the variable-voltage source 180 according to Embodiment 1. In the case where the output voltage VLout of the low-side potential variable-voltage source 180B is negative, the circuit of the low-side potential variable-voltage source 180B is configured by changing the arrangement of the switching element SW, the diode D, the inductor L, and the capacitor C in FIG. 20.

Furthermore, with regard to the operation of the display device 500 according to this embodiment, the operation from step S14 to step S18 in FIG. 5 describing the operational flow for the display device 50 in Embodiment 1 is executed in parallel for the high-side potential and the low-side potential.

According to this embodiment, the display device 500 can reduce excess voltage and reduce power consumption by detecting the voltage drop caused by the first power source wire resistance R1*h* and the first power source wire resistance R1*v* in the side at which the high-side potential is detected and the voltage rise caused by the second power source wire resistance R2*h* and the second power source wire resistance R2*v* in the side of the low-side potential is detected, and giving feedback to the high-side potential variable-voltage source 180A and the low-side potential variable-voltage source 180A regarding the degree of such voltage drop and voltage rise, respectively.

Furthermore, since heat generation by the organic EL element 121 is suppressed through the reduction of power consumption, the deterioration of the organic EL element 121 can be prevented.

In addition, compared to the case of regulating the output voltage of the power supplying unit based on the potential difference between the high-side potential of the monitor pixel, in the display device 500 according to this embodiment, it is possible to set a voltage margin that takes into consideration a voltage rise that is proportionate to the wire resistance of the low-side potential power source line, and thus power consumption can be more effectively reduced in a display mode in which the voltage distribution of the low-side potential power source line is intense.

It is to be noted that although this embodiment describes a display device which monitors the high-side potential of one pixel and the low-side potential of a different pixel to thereby (i) regulate the potential difference between the high-side potential and the reference potential A to a predetermined potential difference and (ii) regulate the potential difference between the low-side potential and the reference potential B to a predetermined potential difference, the pixel from which the high-side potential is detected and the pixel from which the low-side potential is detected may be the same pixel. Even in such a case, the high-side potential variable-voltage source 180A regulates the potential difference between the high-side potential and the reference potential A to a predetermined potential difference, and the low-side potential variable-voltage source 180B regulates the potential difference between the low-side potential and the reference potential B to a predetermined potential difference.

Furthermore, the display device in this embodiment which monitors the high-side or low-side potential of a single pixel to regulate, to a predetermined potential difference, the potential difference between the high-side potential and a reference potential or the potential difference between the low-side potential and the reference potential is also included in the present disclosure.

In this case, although in the display device 500 in FIG. 31, the four constituent elements for regulating the high-side potential are the monitor wire 190A, the high-side potential difference detecting circuit 170A, the high-side potential variable-voltage source 180A, and the high-side potential voltage margin setting unit 175A, and the four constituent elements for regulating the low-side potential are the monitor wire 190B, the low-side potential difference detecting circuit 170B, the low-side potential variable-voltage source 180B, and the low-side potential voltage margin setting unit 175B, the four constituent elements for regulating the high-side potential or the four constituent elements for regulating the low-side potential are not required. In addition, the pixel 111$M_A$ or the pixel 111$M_B$ is provided in the organic EL display unit 510.

Furthermore, even in this embodiment, the wiring layout described in Embodiment 1 and the first to fifth modifications thereof are applicable to the layout of the monitor wire in the organic EL display unit 510.

With the aforementioned wiring layout, a monitor wire for detecting the potential of the monitor pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

[Embodiment 7]

This embodiment describes a display device that monitors the high-side potentials of plural pixels to thereby regulate, to a predetermined potential difference, the potential difference between a high-side potential specified from among the monitored high-side potentials and the reference potential.

Hereinafter, Embodiment 7 shall be specifically described with reference to the Drawings.

Figure 34:
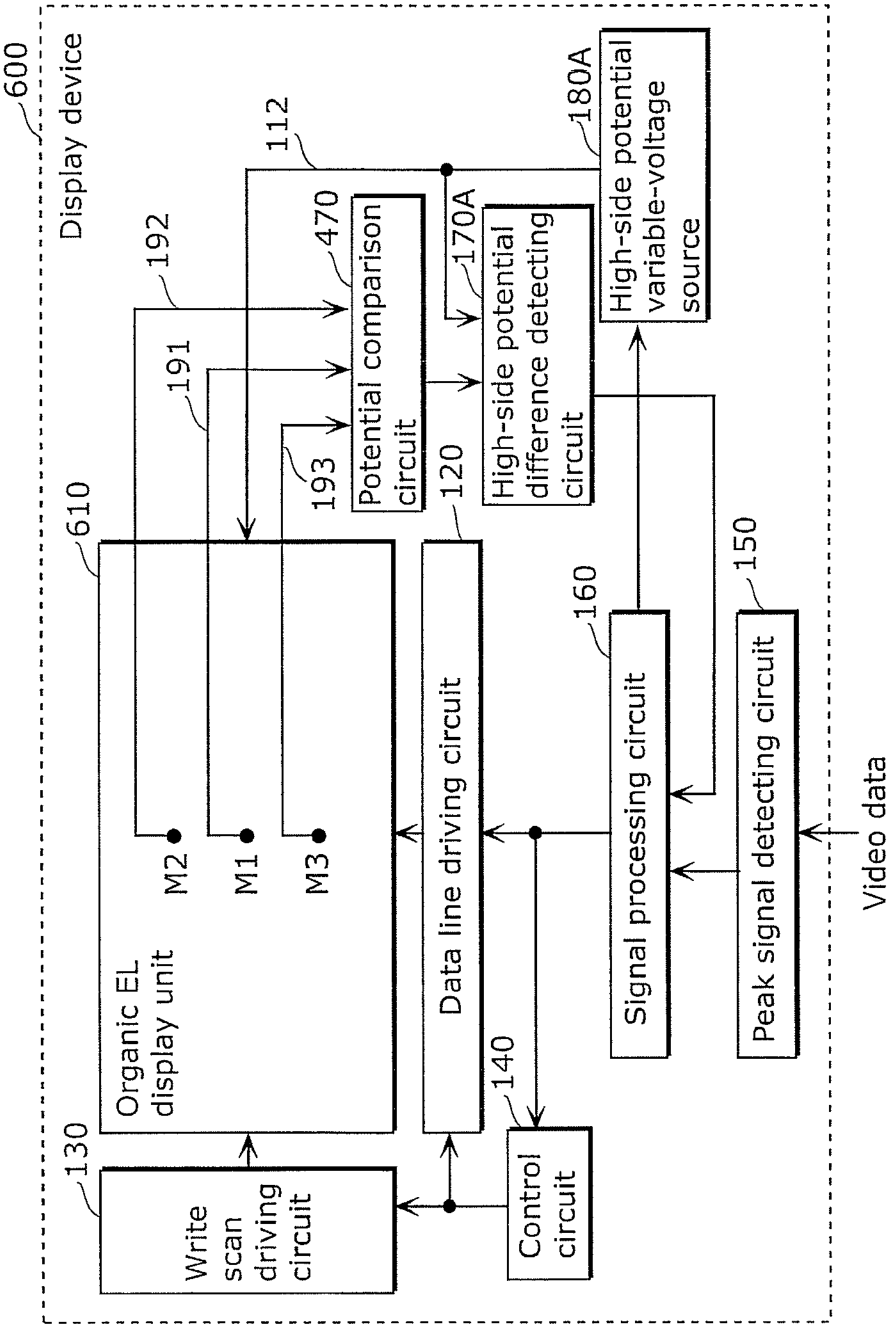
FIG. 34 is a block diagram showing an outline configuration of a display device according to Embodiment 7 disclosed herein.

FIG. 34 is a block diagram showing an outline configuration of a display device according to Embodiment 7.

A display device 600 shown in the figure includes an organic EL display unit 610, the data line driving circuit 120, the write scan driving circuit 130, the control circuit 140, the peak signal detecting circuit 150, the signal processing circuit 160, the high-side potential difference detecting circuit 170A, the high-side potential variable-voltage source 180A, monitor wires 191, 192, and 193, and a potential comparison circuit 470.

Compared to the display device 100 according to Embodiment 2, the display device 600 according to this embodiment is different in including plural monitor wires and the potential comparison circuit 470. Description of points identical to those in Embodiment 2 shall not be repeated, and only the points of difference shall be described hereafter.

The organic EL display unit 610 is nearly the same as the organic EL display unit 110 but is different compared to the organic EL display unit 110 in the placement of the monitor wires 191 to 193 which are provided, on a one-to-one correspondence with detecting points M1 to M3, for measuring the potential at the corresponding detecting point.

The optimal position of the monitor pixels 111M to 111M3 is determined depending on the wiring method of the first power source wire 112, and the respective values of the first power source wire resistances R1*h* and R1*v*.

Each of the monitor wires 191 to 193 is a detecting line which is arranged along the row direction or the column direction of the matrix of the organic EL display unit 610, is connected to the corresponding one of the detecting points M1 to M3 and to the potential comparison circuit 470, and transmits the potential at the corresponding one of the detecting points M1 to M3 to the potential comparison circuit 470. With this, the potential comparison circuit 470 can measure the potentials at the detecting points M1 to M3 via the monitor wires 191 to 193.

The potential comparison circuit 470 measures the potentials at the detecting points M1 to M3 via the corresponding ones of the monitor wires 191 to 193. Stated differently, the potential comparison circuit 470 measures the high-side potential applied to the monitor pixels 111M1 to 111M3. In addition, the potential comparison circuit 470 selects the lowest potential among the measured potentials at the detecting points M1 to M3, and outputs the selected potential to the high-side potential difference detecting circuit 170A.

The signal processing unit 160 regulates the high-side potential variable-voltage source 180A based on the potential difference between the potential selected by the potential comparison circuit 470 and the reference potential. As a result, the high-side potential variable-voltage source 180A provides, to the organic EL display unit 610, an output voltage Vout with which dropping of luminance does not occur in any of the monitor pixels 111M1 to 111M3.

As described above, in the display device 600 according to this embodiment, the potential comparison circuit 470 measures the high-side potential applied to each of the pixels 111 inside the organic EL display unit 610, and selects the lowest potential among the measured high-side potentials. In addition, the high-side potential difference detecting circuit 170A detects the potential difference ΔV between (i) the potential difference between the lowest potential selected by the potential comparison circuit 470 and the reference potential and (ii) the potential of the output voltage Vout of the high-side potential variable-voltage source 180A. Then, the signal processing circuit 160 regulates the high-side potential variable-voltage source 180A in accordance with the detected potential difference ΔV.

With this, the output voltage Vout of the high-side potential variable-voltage source 180A can be more appropriately regulated. Therefore, power consumption can be effectively reduced even when the size of the organic EL display unit is increased.

It is to be noted that, in the display device 600 according to this embodiment: the high-side potential variable-voltage source 180A is the power supplying unit; the organic EL display unit 610 is the display unit; one part of the potential comparison circuit 470 is the voltage detecting unit; and the other part of the potential comparison circuit 470, the high-side potential difference detecting circuit 170A, and the signal processing circuit 160 are the voltage regulating unit.

Furthermore, although the potential comparison circuit 470 and the high-side potential difference detecting circuit 170A are provided separately in the display device 600, a potential comparison circuit which compares the potential of the output voltage Vout of the variable-voltage source 180A and the potential at each of the detecting points M1 to M3 may be provided in place of the potential comparison circuit 470 and the high-side potential difference detecting circuit 170A.

Next, the advantageous effects produced by the display device 600 according to this embodiment shall be described.

Figure 35:
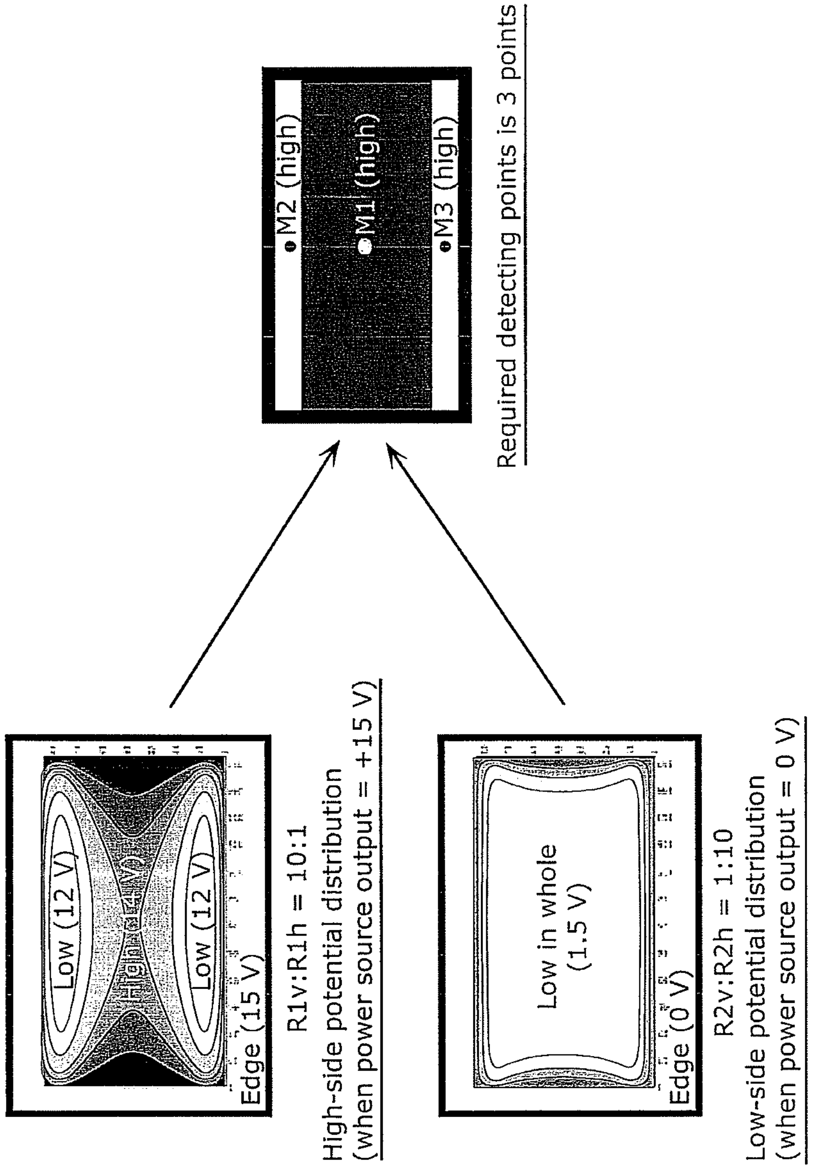
FIG. 35 is a diagram showing potential distributions and the detection point arrangement for the display device in Embodiment 7.

FIG. 35 is a diagram showing potential distributions and the detection point arrangement for the display device in Embodiment 7. The diagram on the left side of FIG. 35 shows the potential distributions when 15 V is applied as the high-side potential power source output and 0 V, which is a grounding potential, is applied as the low-side potential power source output. Since a 1:10 ratio is assumed between the first power source wire resistance R1*h* and the first power source resistance R1V, the high-side potential distribution shows a severe potential change in the vertical direction of the display panel. In contrast, since a 10:1 ratio is assumed between the second power source wire resistance R2*h* and the second power source resistance R2V, the low-side potential distribution shows a small potential change over the entire display panel. In other words, the low-side potential distribution has a tendency to be approximately uniform within the display screen.

When such tendencies are present, it is possible, for example, to monitor only the potential distribution of the high-side potential which has an extremely-varying distribution, and regulate the voltage drop (rise) amount of the low-side potential based on the potential of the high-side potential. Stated in terms of the example in FIG. 35, with respect to maximum voltage drop amount detected from the potential distribution of the high-side potential which is 3 V (15 V−12 V), the voltage drop (rise) amount of the low-side potential is considered at all times to be half (1.5 V) of such detected drop amount (3 V).

In the display panel having the characteristics shown in FIG. 35, a significant error does not occur even when the above-described voltage drop (rise) amount of the low-side potential is not measured, and thus, as a result, there is the advantage of obtaining a power conservation effect while reducing the detection points for the low-side potential. Specifically, even without measuring the high-side potential and the low-side potential at each of the set pixels 111M1 to 111M3, it is sufficient to measure only the high-side potential at each of the pixels 111M1 to 111M3, and thus the detection points are reduced from six points to three points. With this, the design of the interior of the display panel which requires consideration to the arrangement of monitor wires is simplified and picture quality deterioration due to monitor wire addition can be avoided.

In addition, since monitor wires for the low-side potential are eliminated, in a panel format in which light is emitted from the side at which the low-side potential is detected, there is the advantage that line defects originating from the monitor lines are not readily visible.

It is to be noted that although the three detecting points M1 to M3 are illustrated in the figure, having plural detecting points is sufficient, and it is sufficient to determine the optimal positioning and number of points based on the method of wiring of the power source wires and the value of the wire resistance.

Furthermore, even in this embodiment, the wiring layout described in Embodiment 1 and the first to fifth modifications thereof are applicable to the layout of the monitor wire in the organic EL display unit 610.

With the aforementioned wiring layout, a monitor wire for detecting the potential of the monitor pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

Furthermore, it is preferable that the monitor wires 191 to 193 are arranged so that the intervals between adjacent ones of the monitor wires are the same. Accordingly, since the monitor wires are arranged with equal intervals, it is possible to have periodicity in the wiring layout of the organic EL display unit 610, and thus manufacturing efficiency improves.

[Embodiment 8]

A display device according to this embodiment includes: a power supplying unit which outputs a high-side output potential and a low-side output potential; a display unit in which pixels are arranged in a matrix and which receives power supply from the power supplying unit; a detecting line which is arranged along a row direction or a column direction of the matrix, has one end connected to a first pixel or a second pixel inside the display unit, and is for transmitting a high-side potential or a low-side potential to be applied to the pixels; and a signal processing circuit which regulates at least one of the high-side output potential and the low-side output potential that are to be outputted by the power supplying unit, to set a potential difference between the high-side potential applied to the first pixel and the low-side potential applied to the second pixel to a predetermined potential difference.

Accordingly, the display device according to this embodiment realizes excellent power consumption reducing effect.

Hereinafter, Embodiment 8 shall be specifically described with reference to the Drawings.

Figure 36:
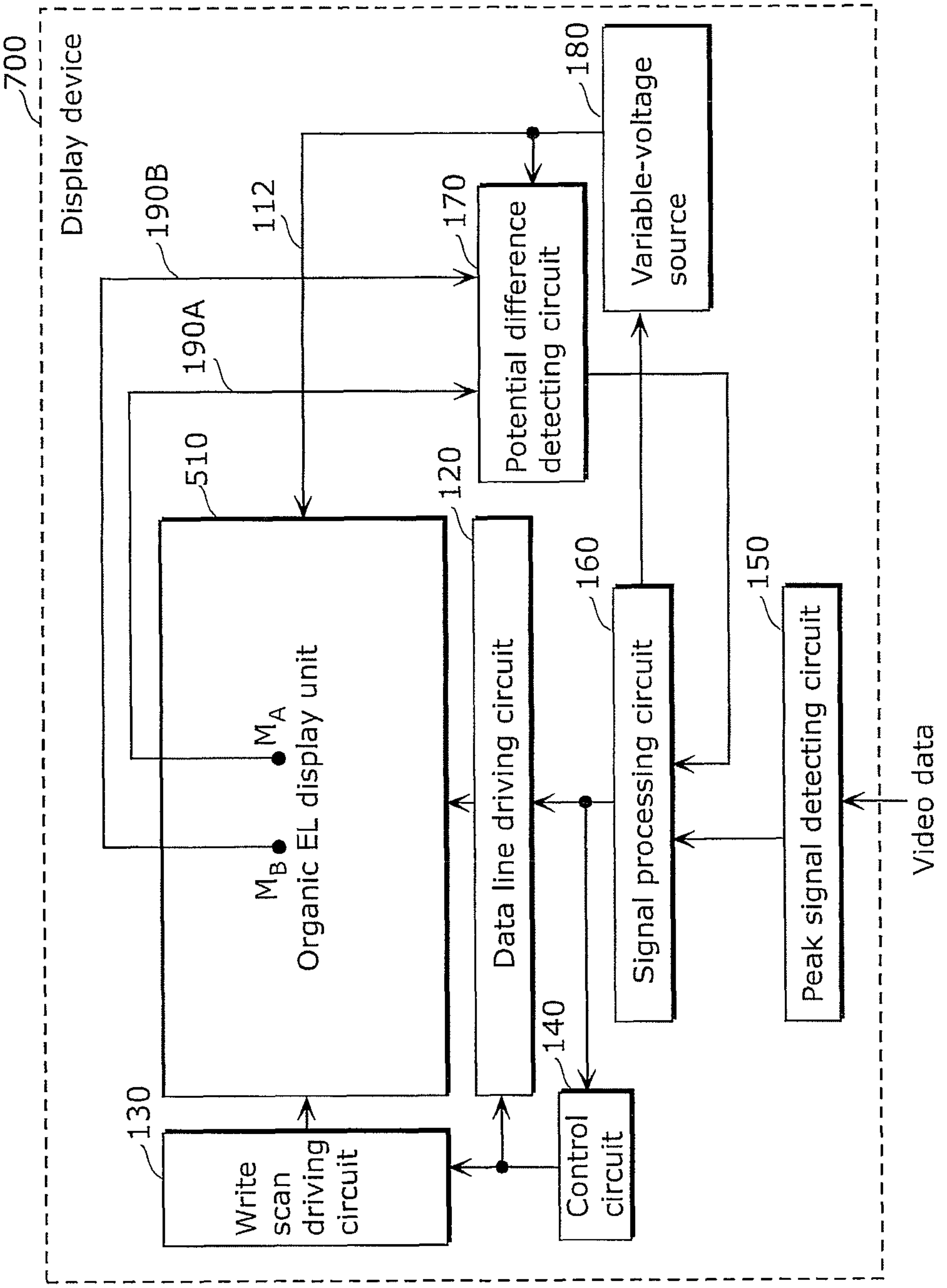
FIG. 36 is a block diagram showing an outline configuration of a display device according to Embodiment 8 disclosed herein.

FIG. 36 is a block diagram showing an outline configuration of a display device according to Embodiment 8.

A display device 700 shown in the figure includes the organic EL display unit 510, the data line driving circuit 120, the write scan driving circuit 130, the control circuit 140, a peak signal detecting circuit 150, a signal processing circuit 160, the potential difference detecting circuit 170, the variable-voltage source 180, and the monitor wires 190A and 190B.

Compared to the display device 100 according to Embodiment 2, the display device 700 according to this embodiment is different in measuring each of the high-side potential and the low-side potential through two monitor wires provided to different pixels. Description of points identical to those in Embodiment 2 shall not be repeated, and only the points of difference shall be described hereafter.

The configuration of the organic EL display unit 510 in this embodiment is the same as the configuration of the organic EL display unit 510 in Embodiment 6 shown in FIG. 32.

Figure 37A:
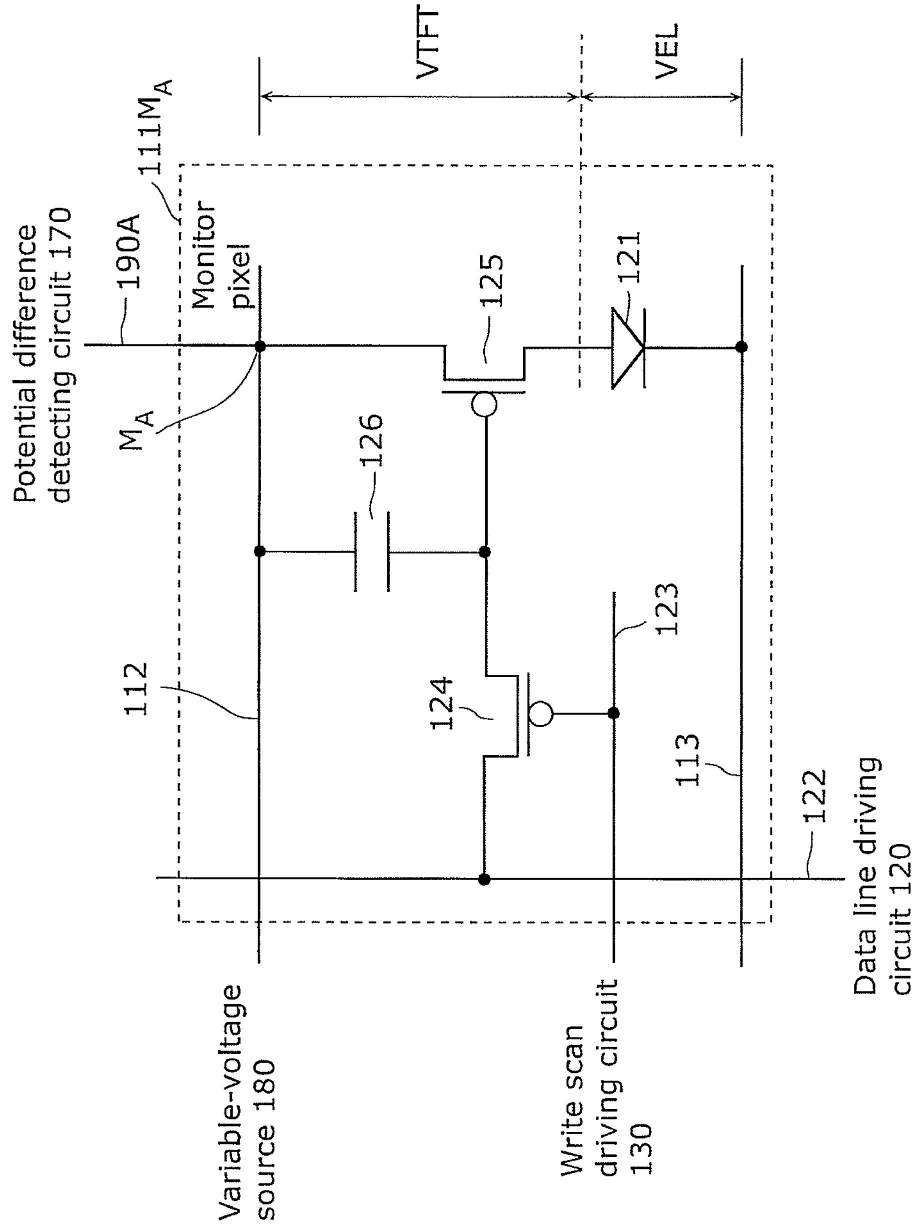
FIG. 37A is a diagram of the circuit configuration of a pixel connected to a high-side potential monitor wire.
Figure 37B:
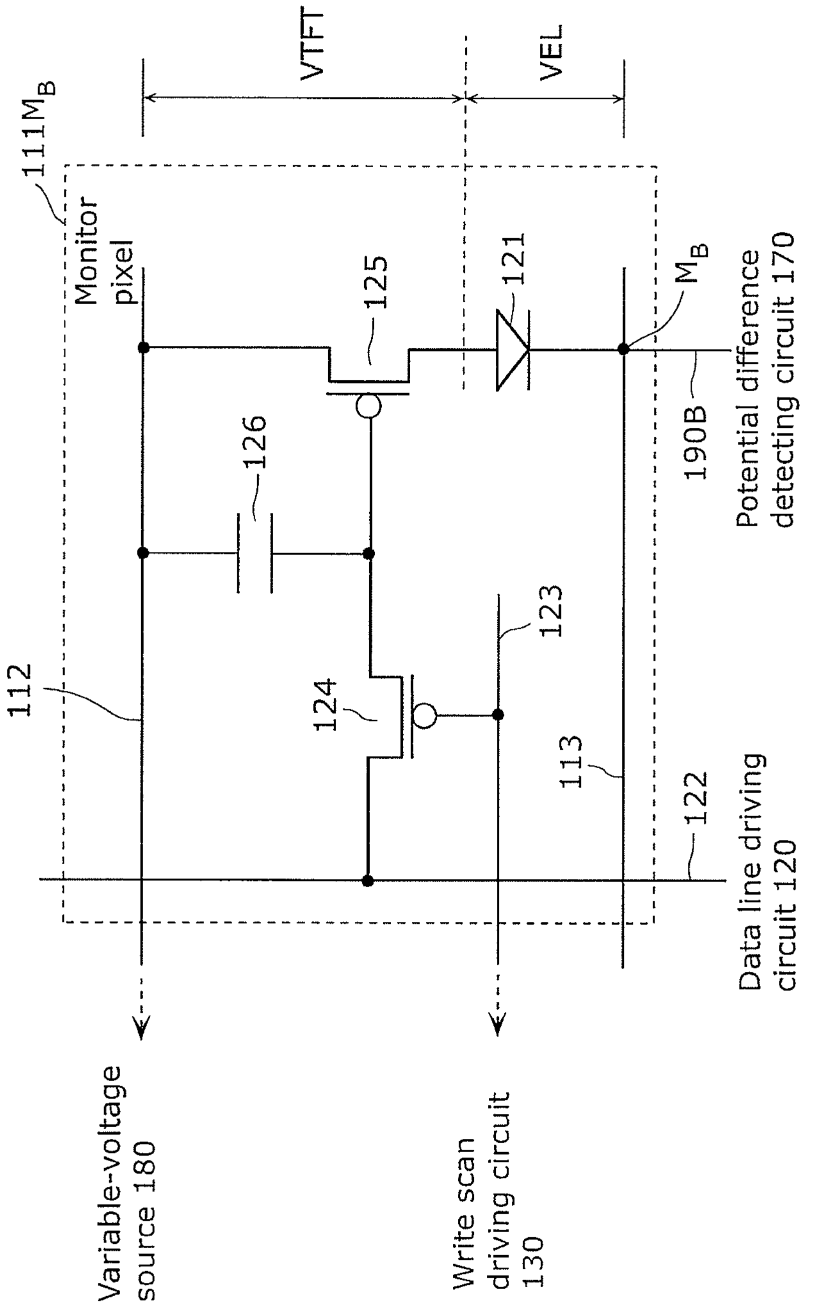
FIG. 37B is a diagram of the circuit configuration of a pixel connected to a low-side potential monitor wire.

FIG. 37A is a diagram of the circuit configuration of the pixel 111$M_A$ connected to the high-side potential monitor wire 190A, and FIG. 37B is a diagram of the circuit configuration of the pixel 111$M_B$ connected to the low-side potential monitor wire 190B. Each of the pixels arranged in a matrix includes a driving element and a luminescence element. The driving element includes a source electrode and a drain electrode. The luminescence element includes a first electrode and a second electrode. The first electrode is connected to one of the source electrode and the drain electrode of the driving element. The high-side potential is applied to one of (i) the other of the source electrode and the drain electrode and (ii) the second electrode, and the low-side potential is applied to the other of (i) the other of the source electrode and the drain electrode and (ii) the second electrode. Specifically, in the monitor pixel 111$M_A$, the monitor wire 190A is connected to the other of the source electrode and the drain electrode of the drive element. In monitor pixel 111$M_B$, the monitor wire 190B is additionally connected to the second electrode of the luminescence element. At least one each of the pixels 111$M_A$ and 111$M_B$ are disposed in the organic EL display unit 510. Furthermore, in the monitor pixel 111MA, the source electrode of the driving transistor 125 is connected to the monitor wire 190A. On the other hand, in the monitor pixel 111$M_B$, the cathode electrode of the organic EL element 121 is the cathode electrode of the pixel 111$M_B$ and is connected to the monitor wire 190B.

The signal processing circuit 160, which is the voltage regulating unit in this embodiment, regulates the variable-voltage source 180 so that the inter-pixel potential difference, which is the potential difference between the high-side potential of the monitor pixel 111$M_A$ and the low-side potential of the monitor pixel 111$M_B$, is set to a predetermined potential, based on the peak signal outputted by the peak signal detecting circuit 150 and the potential difference ΔV detected by the potential difference detecting circuit 170. Specifically, the signal processing circuit 160 determines the voltage required by the organic EL element 121 and the driving transistor 125 when causing the pixels 111 to produce luminescence according to the peak signal outputted by the peak signal detecting circuit 150. Furthermore, the signal processing circuit 160 calculates a voltage margin based on the potential difference detected by the potential difference detecting circuit 170. Subsequently, the signal processing circuit 160 sums up a voltage VEL required by the organic EL element 121, a voltage VTFT required by the driving transistor 125, and the voltage drop margin Vdrop, and outputs the summation result VEL+VTFT+Vdrop, as the potential of a first reference voltage Vref1, to the variable-voltage source 180.

The potential difference detecting circuit 170, which is the voltage detecting unit in this embodiment, measures the high-side potential applied to the monitor pixel 111$M_A$ and the low-side potential applied to the monitor pixel 111$M_B$. Specifically, the potential difference detecting circuit 170 measures, via the monitor wire 190A, the high-side potential applied to the monitor pixel 111$M_A$, and measures, via the monitor wire 190B, the low-side potential applied to the monitor pixel 111$M_B$. Subsequently, the potential difference detecting circuit 170 calculates the inter-pixel potential difference which is the potential difference between the high-side potential of the monitor pixel 111$M_A$ and the low-side potential of the monitor pixel 111$M_B$ that were measured. In addition, the potential difference detecting circuit 170 measures the output voltage of the variable-voltage source 180, and measures the potential difference ΔV between such output voltage and the calculated inter-pixel potential difference. Subsequently, the potential difference detecting circuit 170 outputs the measured potential difference ΔV to the signal processing circuit 160.

The variable-voltage source 180, which is the power supplying unit in this embodiment, outputs at least one of the high-side potential and the low-side potential to the organic EL display unit 510. The variable-voltage source 180 outputs an output voltage Vout for setting the inter-pixel potential difference detected from the monitor pixels 111$M_A$ and 111$M_B$ to the predetermined voltage (VEL+VTFT), according to the first reference voltage Vref1 outputted by the signal processing circuit 160.

The monitor wire 190A is a high-side potential detecting line which is arranged along the row direction or the column direction of the matrix of the organic EL display unit 510, has one end connected to the monitor pixel 111$M_A$ and the other end connected to the potential difference detecting circuit 170, and transmits the high-side potential applied to the monitor pixel 111$M_A$ to the potential difference detecting circuit 170.

The monitor wire 190B is a low-side potential detecting line which is arranged along the row direction or the column direction of the matrix of the organic EL display unit 510, has one end connected to the monitor pixel 111$M_B$ and the other end connected to the potential difference detecting circuit

170, and transmits the low-side potential applied to the monitor pixel 111$M_B$ to the potential difference detecting circuit 170.

Next, the operation of the above-described display device 700 shall be described using FIG. 21.

First, the peak signal detecting circuit 150 obtains the video data for one frame period inputted to the display device 700 (step S11).

Next, the peak signal detecting circuit 150 detects the peak value of the obtained video data (step S12), and outputs a peak signal representing the detected peak value to the signal processing circuit 160.

Next, the signal processing circuit 160 determines the voltage VTFT required by the driving transistor 125 and the voltage VEL required by the organic EL element 121 when causing the organic EL element 121 to produce luminescence according to the peak values outputted by the peak signal detecting circuit 150 (step S13).

Meanwhile, the potential difference detecting circuit 170 detects the respective potentials at the detecting points $M_A$ and $M_B$ via the monitor wires 190A and 190B, and calculates the inter-pixel potential difference which is the difference between the potentials at the detecting points $M_A$ and $M_B$ (step S14).

Next, the potential difference detecting circuit 170 detects the potential difference ΔV between the output voltage of the output terminal 184 of the variable-voltage source 180 and the inter-pixel potential difference (step S15). Subsequently, the potential difference detecting circuit 170 outputs the detected potential difference ΔV to the signal processing circuit 160. It is to be noted that the steps S11 to S15 up to this point correspond to the potential measuring process according to the present disclosure.

Next, the signal processing circuit 160 determines a voltage drop margin Vdrop corresponding to the potential difference ΔV detected by the potential difference detecting circuit 170, based on a potential difference signal outputted by the potential difference detecting circuit 170 (step S16).

Next, the signal processing circuit 160 determines the output voltage Vout that the variable-voltage source 180 is to be made to output in the next frame period (step S17). Specifically, the output voltage Vout that the variable-voltage source 180 is to be made to output in the next frame period is assumed to be VTFT+VEL+Vdrop which is the sum value of (i) VTFT+VEL determined in the determination (step S13) of the voltage required by the organic EL element 121 and the driving transistor 125 and (ii) the voltage drop margin Vdrop determined in the determination (step S15) of the voltage margin corresponding to the potential difference ΔV.

Lastly, the signal processing circuit 160 regulates the variable-voltage source 180 by setting the first reference voltage Vref1 as VTFT+VEL+Vdrop at the beginning of the next frame period (step S18). With this, in the next frame period, the variable-voltage source 180 supplies Vout=VTFT+VEL+Vdrop to the organic EL display unit 510. It is to be noted that step S16 to step S18 correspond to the voltage regulating process according to the present disclosure.

In this manner, the display device 700 according to this embodiment includes: the variable-voltage source 180 which outputs at least one of the high-side potential and the low-side potential; the potential difference detecting circuit 170 which detects the inter-pixel potential difference from the potentials applied to the two different monitor pixels 111$M_A$ and 111$M_B$ and measures the output voltage Vout of the variable-voltage source 180; and the signal processing circuit 160 which regulates the variable-voltage source 180 so that the inter-pixel potential difference is set to the predetermined voltage (VTFT+VEL). Furthermore, the potential difference detecting circuit 170, in addition, detects the potential difference between the measured high-side potential output voltage Vout and the inter-pixel potential difference, and the signal processing circuit 160 regulates the variable-voltage source 180 in accordance with the potential difference detected by the potential difference detecting circuit 170.

With this, the display device 700 can reduce excess voltage and reduce power consumption by detecting (i) the voltage drop caused by the horizontal first power source wire resistance R1$h$ and the vertical first power source wire resistance R1$v$ and (ii) the voltage rise due to the horizontal second power source wire resistance R2$h$ and the vertical second power source wire resistance R2$v$, and giving feedback to the variable-voltage source 180 regarding the degree of such voltage drop and voltage rise.

In addition, compared to when the high-side potential and the low-side potential applied to the pixels are detected from the same monitor pixel, the display device 700 according to this embodiment is able to reduce power consumption more effectively when the wire resistance distribution of the high-side potential power source wire and the wire resistance distribution of the low-side potential power source wire are different.

Furthermore, since heat generation by the organic EL element 121 is suppressed through the reduction of power consumption, the deterioration of the organic EL element 121 can be prevented.

Furthermore, even in this embodiment, the wiring layout described in Embodiment 1 and the first to fifth modifications thereof are applicable to the layout of the monitor wire in the organic EL display unit 510.

With the aforementioned wiring layout, a monitor wire for detecting the potential of the monitor pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

[Embodiment 9]

A display device according to this embodiment is nearly the same as the display device 700 according to Embodiment 8 but is different in not including the potential difference detecting circuit 170 and including an inter-pixel potential difference calculating circuit that calculates the potential difference between the detecting point $M_A$ and the detecting point $M_B$, and in having the calculated inter-pixel potential difference inputted to the variable-voltage source. Furthermore, the signal processing circuit is different in setting the voltage to be outputted to the variable-voltage source to the required voltage VTFT+VEL. With this, in the display device according to this embodiment, the output voltage Vout of the potential variable-voltage source can be regulated in real-time in accordance with the voltage drop amount, and thus, compared with Embodiment 7, the temporary drop in pixel luminance can be prevented.

Figure 38:
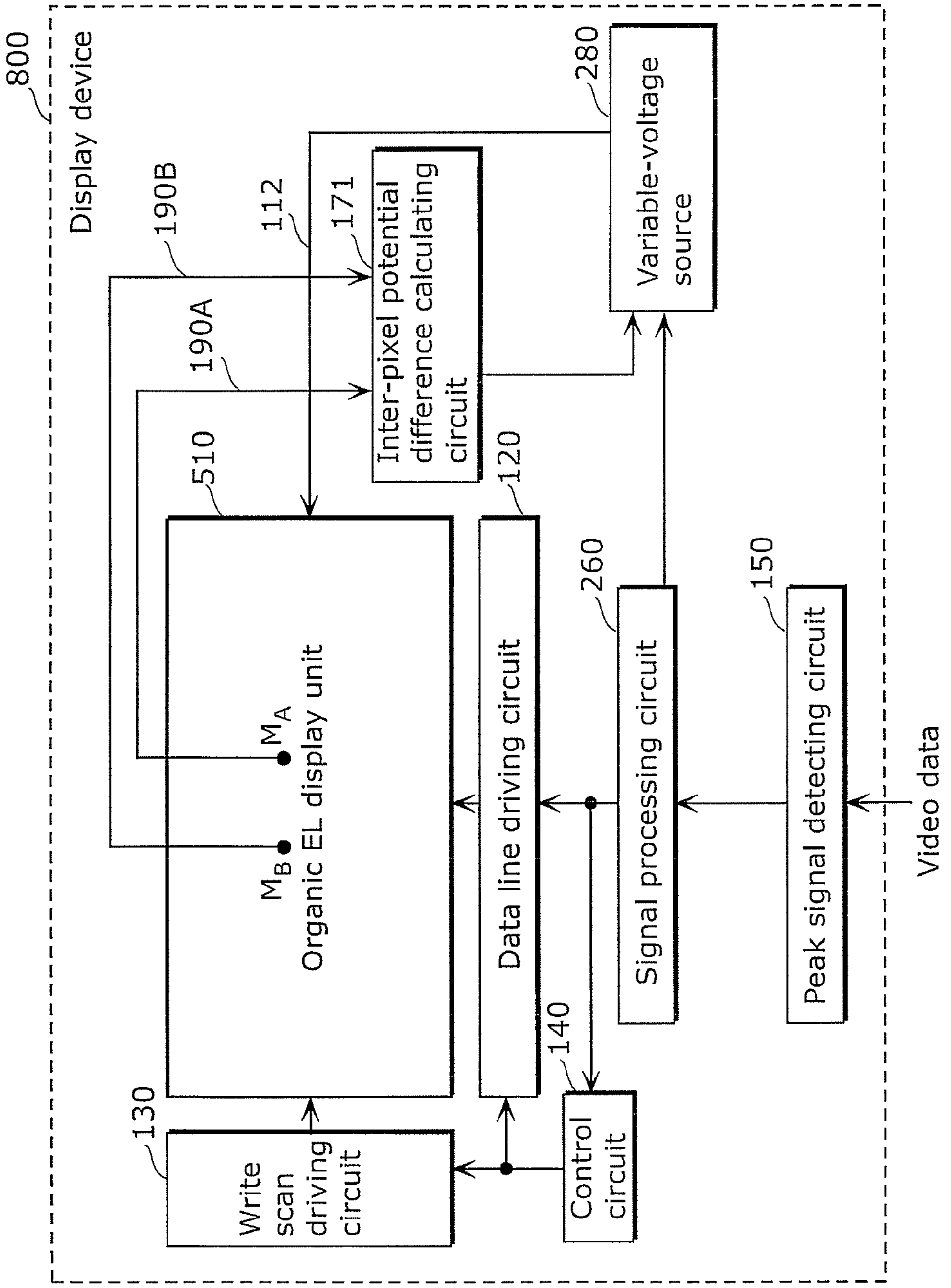
FIG. 38 is a block diagram showing an outline configuration of a display device according to Embodiment 9 disclosed herein.

FIG. 38 is a block diagram showing an outline configuration of a display device according to Embodiment 9.

A display device 800 according to this embodiment shown in the figure is different compared to the display device 700 according to Embodiment 8 shown in FIG. 36 in not including the potential difference detecting circuit 170, and in including an inter-pixel potential difference calculating circuit 171 that calculates the potential difference between the detecting point $M_A$ and the detecting point $M_B$, and including a signal processing circuit 260 in place of the signal processing circuit 160, and a variable-voltage source 280 in place of the variable-voltage source 180. Description of points identical to those in Embodiment 8 shall not be repeated, and only the points of difference shall be described hereafter.

The signal processing circuit 260 determines a second reference voltage Vref2 to be outputted to the variable-voltage source 280, from the peak signal outputted by the peak signal detecting circuit 150. Specifically, the signal processing circuit 260 uses the required voltage conversion table and determines the sum VTFT+VEL of the voltage VEL required by an organic EL element 121 and a voltage VTFT required by the driving transistor 125. Subsequently, the signal processing circuit 260 sets the determined VTFT+VEL as the voltage of the second reference voltage Vref2.

In such manner, the second reference voltage Vref2 that is outputted to the variable-voltage source 280 by the signal processing circuit 260 of the display device 800 according to this embodiment is different from the first reference voltage Vref1 that is outputted to the variable-voltage source 180 by the signal processing circuit 160 of the display device 700 according to Embodiment 8, and is a voltage determined in accordance with the video data only. Specifically, the second reference voltage Vref2 is not dependent on the potential difference ΔV between the potential of the output voltage Vout of the variable-voltage source 280 and the inter-pixel potential difference. The inter-pixel potential difference calculating circuit 171 measures, via the monitor wire 190A, the high-side potential applied to the monitor pixel 111$M_A$, and measures, via the monitor wire 190B, the low-side potential applied to the monitor pixel 111$M_B$. Subsequently, the inter-pixel potential difference calculating circuit 171 calculates the inter-pixel potential difference which is the potential difference between the potential of the monitor pixel 111$M_A$ and the potential of the monitor pixel 111$M_B$ that were measured.

The variable-voltage source 280 receives the input of the inter-pixel potential difference from the inter-pixel potential difference calculating circuit 171. Subsequently, the variable-voltage source 280 regulates the output voltage Vout in accordance with the inputted inter-pixel potential difference and the second reference voltage Vref2 outputted by the signal processing circuit 260.

The monitor wire 190A is a high-side potential detecting line which is arranged along the row direction or column direction of the matrix of the organic EL display unit 510, has one end connected to the detecting point $M_A$ and the other end connected to the inter-pixel potential difference calculating circuit 171, and transmits the potential at the detecting point $M_A$ to the inter-pixel potential difference calculating circuit 171.

The monitor wire 190B is a low-side potential detecting line which is arranged along the row direction or column direction of the matrix of the organic EL display unit 510, has one end connected to the detecting point $M_B$ and the other end connected to the inter-pixel potential difference calculating circuit 171, and transmits the potential at the detecting point $M_B$ to the inter-pixel potential difference calculating circuit 171.

Figure 39:
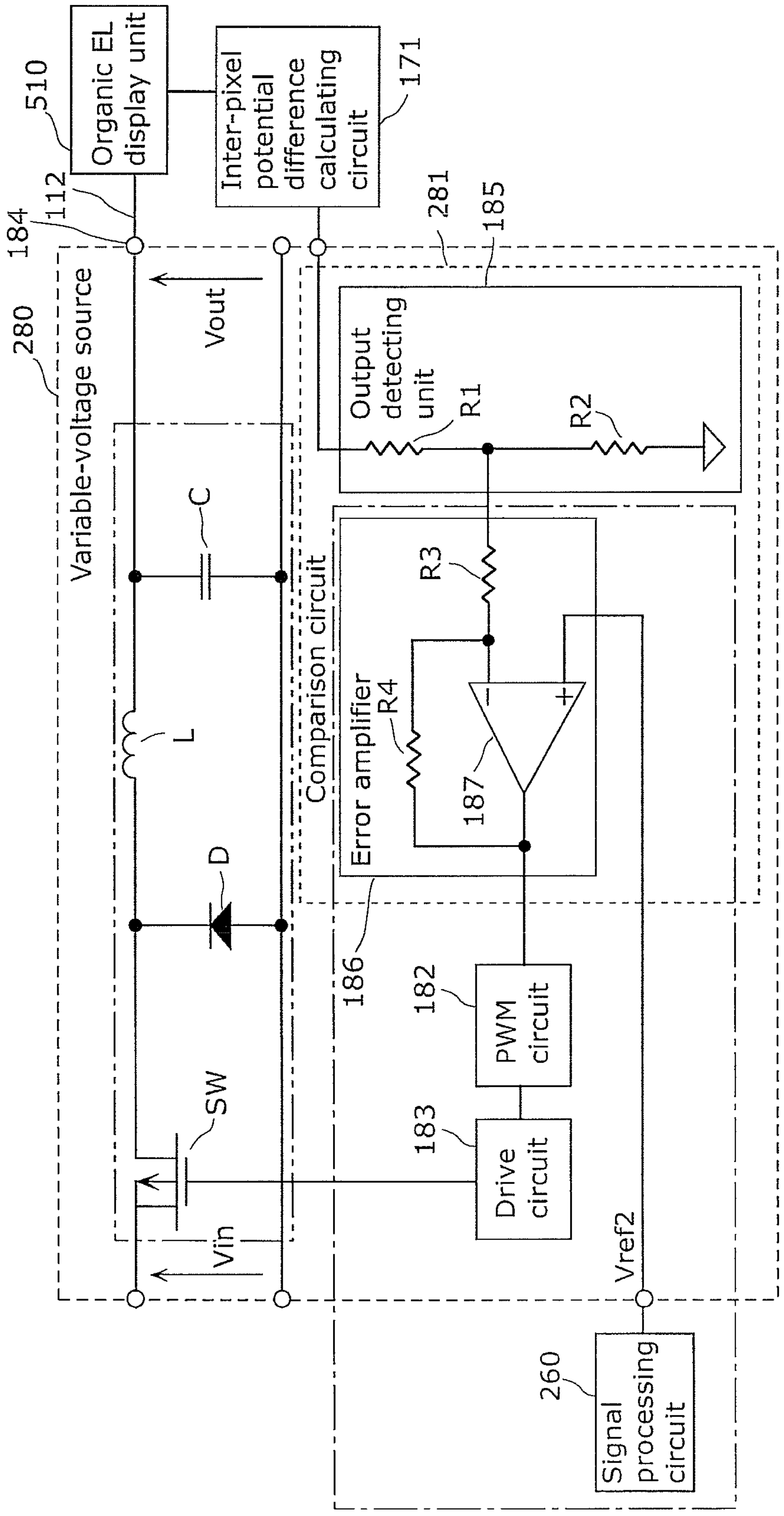
FIG. 39 is a block diagram showing an example of a specific configuration of the variable-voltage source in Embodiment 9.

FIG. 39 is a block diagram showing an example of a specific configuration of the variable-voltage source 280 in Embodiment 9. It is to be noted that the organic EL display unit 510 and the signal processing circuit 260 which are connected to the variable-voltage source are also shown in the figure.

The variable-voltage source 280 shown in the figure has nearly the same configuration as the variable-voltage source 180 shown in FIG. 20 but is different in including, in place of the comparison circuit 181, the comparison circuit 281 which compares the inter-pixel potential difference outputted by the inter-pixel potential difference calculating circuit 171 and the second reference voltage Vref2.

Here, assuming that the output voltage of the variable-voltage source 280 is Vout, and the voltage drop amount from the output terminal 184 of the variable-voltage source 280 to the detecting points $M_A$ and $M_B$ is ΔV, the inter-pixel potential difference between the detecting points $M_A$ and $M_B$ becomes Vout−ΔV. Specifically, in this embodiment, the comparison circuit 281 compares Vref2 and Vout−ΔV. As described above, since Vref2=VTFT+VEL, it can be said that the comparison circuit 281 is comparing VTFT+VEL and Vout−ΔV.

On the other hand, in Embodiment 8, the comparison circuit 181 compares Vref1 and Vout. As described above, since Vref1=VTFT+VEL+ΔV, it can be said that, in Embodiment 8, the comparison circuit 181 is comparing VTFT+VEL+ΔV and Vout.

Therefore, although the comparison circuit 281 has different comparison subjects as the comparison circuit 181, the comparison result is the same. Specifically, when the voltage drop amount from the output terminal 184 of the variable-voltage source to the detecting points $M_A$ and $M_B$ is the same between Embodiment 8 and Embodiment 9, the voltage outputted by the comparison circuit 181 to the PWM circuit and the voltage outputted by the comparison circuit 281 to the PWM circuit are the same. As a result, the output voltage Vout of the variable-voltage source 180 and the output voltage Vout of the variable-voltage source 280 become the same. Furthermore, the potential difference ΔV and the output voltage Vout also have an increasing function relationship in Embodiment 9.

Compared to the display device 700 according to Embodiment 8, the display device 800 configured in the above manner can regulate the output voltage Vout in accordance with the potential difference ΔV between output voltage of the output terminal 184 and the inter-pixel potential difference between the detecting points $M_A$ and $M_B$ in real-time. This is because, in the display device 700 according to Embodiment 8, the signal processing circuit 160 changes the first reference voltage Vref1 for a frame only at the beginning of each frame period. In contrast, in the display device 800 according to this embodiment, Vout can be regulated independently of the control by the signal processing circuit 260, by inputting the voltage that is dependent on the ΔV, that is, Vout−ΔV directly to the comparison circuit 281 of the variable-voltage source 280 without passing through the signal processing circuit 260.

Therefore, with the variable-voltage source 280, Vout rises in real-time in accordance with the potential difference ΔV.

This resolves the shortage of power source voltage for the pixels 111 in the central part of the organic EL display unit 510 which are the pixels 111 in the brightly displayed region. In other words, the drop in pixel luminance is resolved.

As described above, in the display device 800 according to this embodiment, the signal processing circuit 260, and the error amplifier 186, PWM circuit 182, and drive circuit 183 of the variable-voltage source 280, detect the potential difference between inter-pixel potential difference from the inter-pixel potential difference calculating circuit 171 measured by the output detecting unit 185 and the predetermined voltage, and regulate the switching element SW in accordance with the detected potential difference. Accordingly, compared with the display device 700 according to Embodiment 8, the display device 800 according to this embodiment is able to regulate the output voltage Vout of the variable-voltage source 280 in real-time in accordance with the voltage drop amount, and thus compared to Embodiment 8, the temporary drop in pixel luminance can be prevented.

It is to be noted that, in this embodiment, the organic EL display unit 510 is the display unit; the inter-pixel potential difference calculating circuit 171 and the output detecting unit 185 are the voltage detecting unit; the signal processing circuit 260, and the error amplifier 186, PWM circuit 182, and drive circuit 183 of the variable-voltage source 280 which are surrounded by the dashed-and-single-dotted line in FIG. 39 are the voltage regulating unit; and the switching element SW, the diode D, the inductor L, and the capacitor C which are surrounded by the dashed-and-double-dotted line in FIG. 39 are the power supplying unit.

It is to be noted that in Embodiments 1 to 9, the output voltage from the variable-voltage source is regulated based on the potential difference between the voltage applied to the pixels and the voltage outputted from the variable-voltage source. In this case, the current path from the variable-voltage source to the pixels includes a wiring path outside the display region and a wiring path inside the display region in which the pixels are disposed. Specifically, in Embodiments 1 to 9, the output voltage from the variable-voltage source is regulated in accordance with the voltage drop amount both inside the display region and outside the display region, by detecting the potential difference between the voltage applied to the pixels and the voltage outputted from the variable-voltage source. In contrast, the output voltage from the variable-voltage source can be regulated in accordance with the voltage drop amount inside the display region only, by detecting the potential difference between the voltage applied to the pixels and the voltage in the wiring path outside the display region. This shall be described below by illustrating by example the display devices according to Embodiments 6 to 9, and using FIG. 40A and FIG. 40B.

Figure 40A:
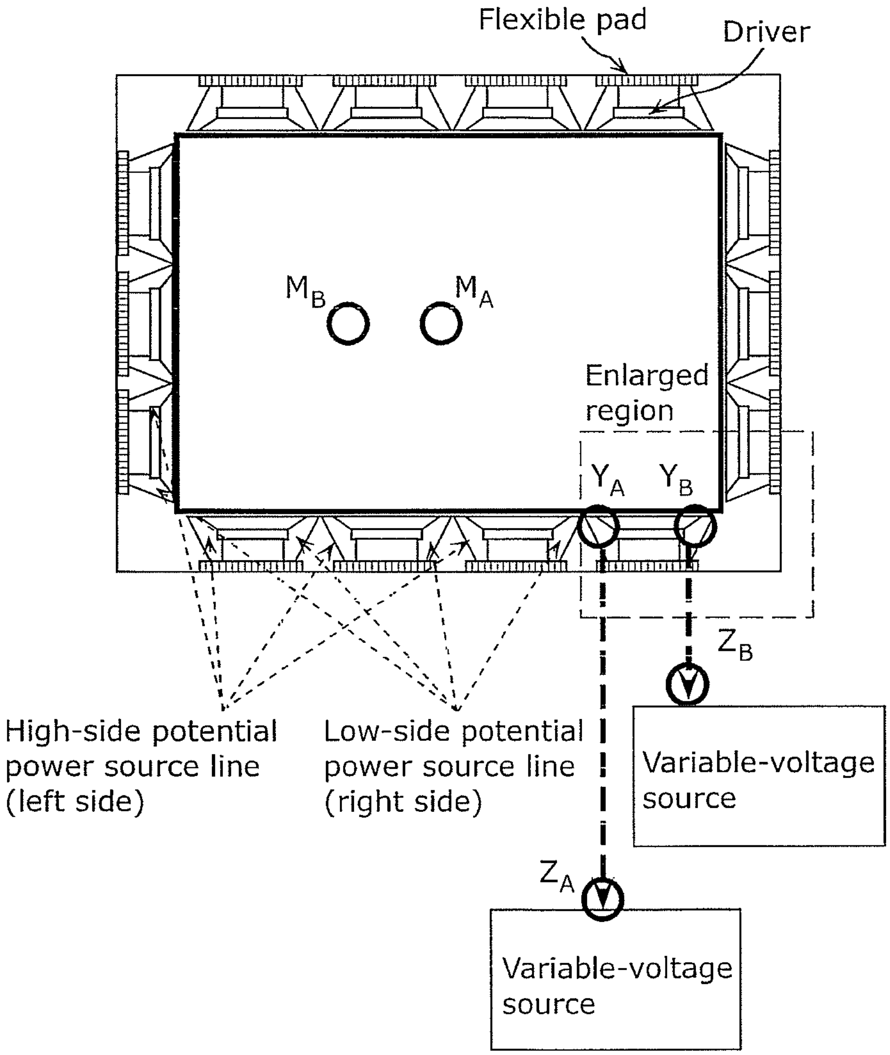
FIG. 40A is a diagram showing an outline configuration of a display panel included in a display device disclosed herein.
Figure 40B:
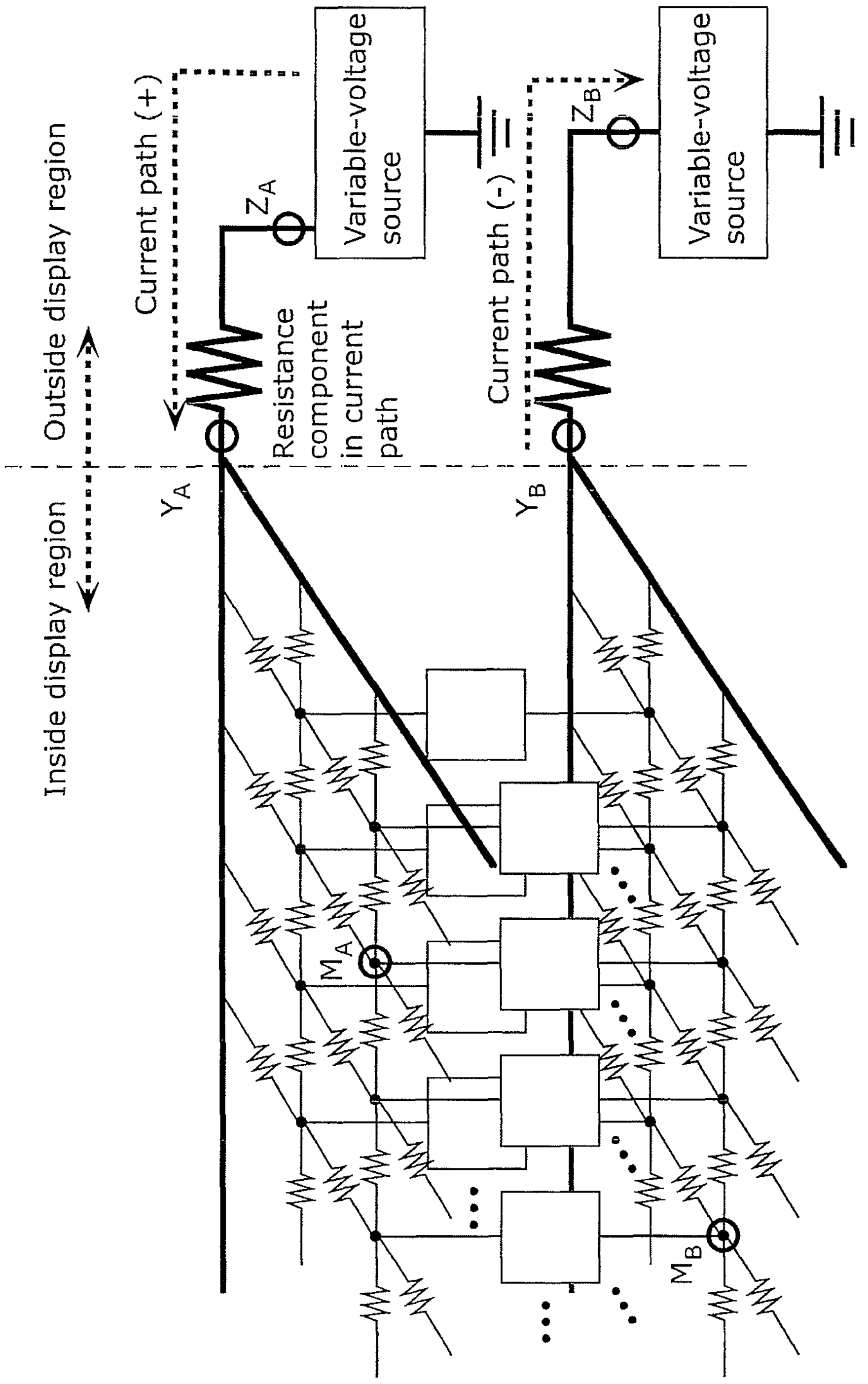
FIG. 40B is perspective diagram schematically showing the vicinity of the periphery of the display panel included in a display device disclosed herein.

FIG. 40A is a diagram showing an outline configuration of a display panel included in a display device according to the present disclosure. Furthermore, FIG. 40B is perspective diagram schematically showing the vicinity of the periphery of the display panel included in a display device according to the present disclosure. In FIG. 40A, drivers such as write scan driving circuits and data line driving circuits, high-side potential power source lines, low-side potential power source lines, and flexible pads, which are interfaces for electrical connection with outside devices, are disposed in the periphery of a display panel in which pixels 111 are arranged in a matrix. Each of the variable-voltage sources is connected to the display panel via (i) a high-side potential power source line and flexible pads or (ii) a low-side potential power source line and flexible pads. As shown in FIG. 40B, resistance components are also present outside the display region, and such resistance components are due to the aforementioned flexible pads, high-side potential power source lines and low-side potential power source lines.

Although in Embodiments 6 and 7 described earlier, for example, the difference between the potential at the detecting point $M_A$ and the potential of an output point $Z_A$ of the high-side potential variable-voltage source is detected, the potential difference between the potential at the detecting point $M_A$ and the potential at a connection point $Y_A$ between the display panel and a high-side potential power source line may be detected for the purpose of regulating the output voltage from the variable-voltage source that is in accordance with the voltage drop amount only inside the display region. With this, the output voltage of the variable-voltage source can regulated in accordance with the voltage drop amount within the display region only. Furthermore, for the low-side potential, the potential difference between the potential at the detecting point $M_B$ and the potential at a connection point $Y_B$ between the display panel and a low-side potential power source line may be detected.

Furthermore, in Embodiments 8 and 9 described earlier, (i) the inter-pixel potential difference between the potential at the detecting point $M_A$ and the potential at the detecting point $M_B$ and (ii) the power source potential difference between the potential of high-side potential output point $Z_A$ and the potential of the low-side potential output point $Z_B$ of the variable-voltage source are detected, and the output voltage of the variable-voltage source is regulated according to the potential difference ΔV between the inter-pixel potential difference and the power source potential difference. In contrast, for purposes of regulating the output voltage from the variable-voltage source in accordance with the voltage drop amount inside the display region only, it is also acceptable to detect the potential difference between (i) the inter-pixel potential difference between the detecting points $M_A$ and $M_B$ and (ii) a current path potential difference which is the difference of the potentials of the connection point $Y_A$ between the display panel and the high-side potential power source line and the connection point $Y_B$ between the display panel and the low-side potential power source line. With this, the output voltage of the variable-voltage source can regulated in accordance with the voltage drop amount within the display region only.

Furthermore, even in this embodiment, the wiring layout described in Embodiment 1 and the first to fifth modifications thereof are applicable to the layout of the monitor wire in the organic EL display unit 510.

With the aforementioned wiring layout, a monitor wire for detecting the potential of the monitor pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

[Embodiment 10]

This embodiment describes a display device that monitors the high-side potentials of plural pixels to thereby regulate, to a predetermined potential difference, the potential difference between a high-side potential specified from among the monitored high-side potentials.

Hereinafter, Embodiment 10 shall be specifically described with reference to the Drawings.

Figure 41:
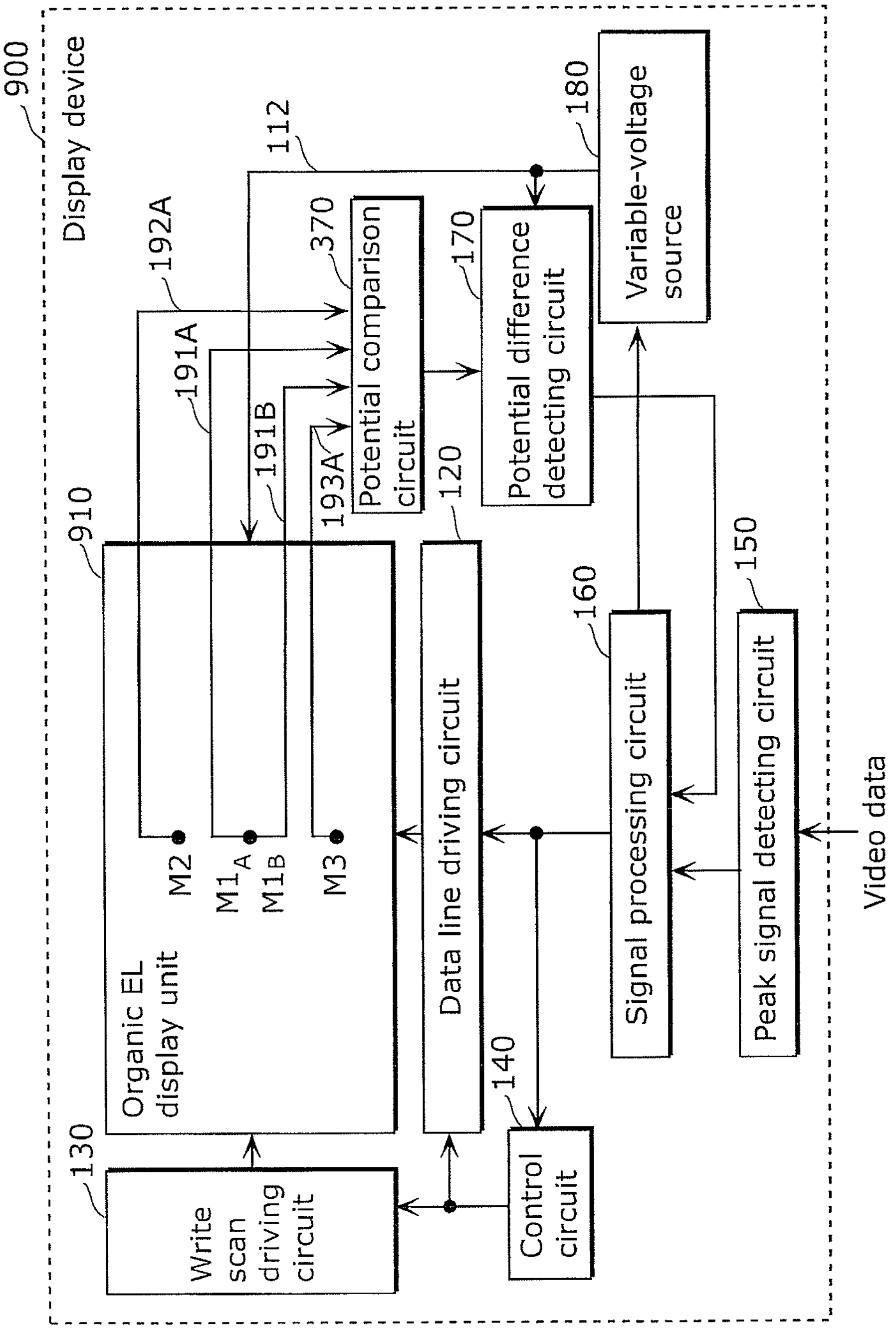
FIG. 41 is a block diagram showing an outline configuration of a display device according to Embodiment 10 disclosed herein.

FIG. 41 is a block diagram showing an outline configuration of a display device according to Embodiment 10. A display device 900 shown in the figure includes an organic EL display unit 910, the data line driving circuit 120, the write scan driving circuit 130, the control circuit 140, the peak signal detecting circuit 150, the signal processing circuit 160, the potential difference detecting circuit 170, the variable-voltage source 180, monitor wires 191A, 191B, 192A, and 193A, and the potential comparison circuit 370.

Compared to the display device 700 according to Embodiment 8, the display device 900 according to this embodiment is different in including monitor wires for detecting the high-side potentials of the pixels, and the potential comparison circuit 370. Description of points identical to those in Embodiment 8 shall not be repeated, and only the points of difference shall be described hereafter.

The organic EL display unit 910 is nearly the same as the organic EL display unit 510, but is different compared to the organic EL display unit 510 in the placement of the monitor wires 191A to 193A for measuring the high-side potential at detecting points $M1_A$, M2, and M3 respectively, and the monitor wire 191B for measuring the low-side potential at a detecting point $M1_B$. It is to be noted that the detecting points $M1_A$ and $M1_B$ are potential measuring points for the high potential side and the low potential side in the same monitor pixel 111M1 for example.

The optimal position of the monitor pixels 111M1 to 111M3 is determined depending on the wiring method of the first power source wire 112 and the second power source wire 113, and the respective values of the first power source wire resistances R1$h$ and R1$v$ and the second power source wire resistances R2$h$ and R2$v$.

Each of the monitor wires 191A, 191B, 192A, and 193A is a detecting line which is arranged along the row direction or the column direction of the matrix of the organic EL display unit 510, is connected to the corresponding one of the detecting points M1A, M1B, M2, and M3, and to the potential comparison circuit 370, and transmits the potential of the corresponding detecting point to the potential comparison circuit 370.

The potential comparison circuit 370 measures, via each of the monitor wires 191A, 191B, 192A, and 193A, the potential of the corresponding detecting point. Stated differently, the potential comparison circuit 370 measures the high-side potential applied to the monitor pixels 111M1 to 111M3 and the low-side potential applied to the monitor pixel 111M1. In addition, the potential comparison circuit 370 selects the lowest potential among the measured high-side potentials at the detecting points $M1_A$, M2, and M3, and outputs the selected potential to the potential difference detecting circuit 170. It is to be noted that, when there are plural low-side potentials measured, the potential comparison circuit 370 selects the highest one of such potentials, and outputs the selected potential to the potential difference detecting circuit 170. In this embodiment, there is one measured low-side potential, and thus that potential is directly outputted to the potential difference detecting circuit 170.

The potential difference detecting circuit 170, which is the voltage detecting unit in this embodiment, receives, from the potential comparison circuit 370, the lowest potential from among the measured high-side potentials at the detecting points $M1_A$, M2, and M3 and the low-side potential at the detecting point $M1_B$. Subsequently, the potential difference detecting circuit 170 calculates the inter-pixel potential difference between the lowest potential from among the measured high-side potentials at the detecting points $M1_A$, M2, and M3 and the low-side potential at the detecting point $M1_B$. In addition, the potential difference detecting circuit 170 measures the output voltage of the variable-voltage source 180, and measures the potential difference ΔV between such output voltage and the calculated inter-pixel potential difference. Subsequently, the high-side potential difference detecting circuit 170 outputs the measured potential difference ΔV to the signal processing circuit 160.

The signal processing unit 160 regulates the variable-voltage source 180 based on the potential difference ΔV. As a result, the variable-voltage source 180 provides, to the organic EL display unit 910, an output voltage Vout with which dropping of luminance does not occur in any of the monitor pixels 111M1 to 111M3.

As described above, in the display device 900 according to this embodiment, the potential comparison circuit 370 measures the high-side potential applied to each of the pixels 111 inside the organic EL display unit 910, and selects the lowest potential among the measured high-side potentials. Furthermore, the potential comparison circuit 370 measures the low-side potential applied to each of the pixels 111 inside the organic EL display unit 910, and selects the highest potential among the measured low-side potentials. In addition, the potential difference detecting circuit 170 detects the potential difference ΔV between (i) the inter-pixel potential difference between the lowest high-side potential and the highest low-side potential which are selected by the potential comparison circuit 370 and (ii) the output voltage Vout of the variable-voltage source 180. Then, the signal processing circuit 160 regulates the variable-voltage source 180 in accordance with the potential difference ΔV.

With this, the output voltage Vout of the variable-voltage source 180 can be more appropriately regulated. Therefore, power consumption can be effectively reduced even when the size of the organic EL display unit is increased.

It is to be noted that, in the display device 900 according to this embodiment: the variable-voltage source 180 is the power supplying unit; the organic EL display unit 910 is the display unit; one part of the potential comparison circuit 370 is the voltage detecting unit; and the other part of the potential comparison circuit 370, the potential difference detecting circuit 170, and the signal processing circuit 160 are the voltage regulating unit.

Furthermore, although the potential comparison circuit 370 and the potential difference detecting circuit 170 are provided separately in the display device 900, a potential comparison circuit which compares the output voltage Vout of the variable-voltage source 180 and the potential at each of the detecting points $M1_A$, M2, and M3 may be provided in place of the potential comparison circuit 370 and the potential difference detecting circuit 170.

Next, the advantageous effects produced by the display device 900 according to this embodiment shall be described.

Figure 42:
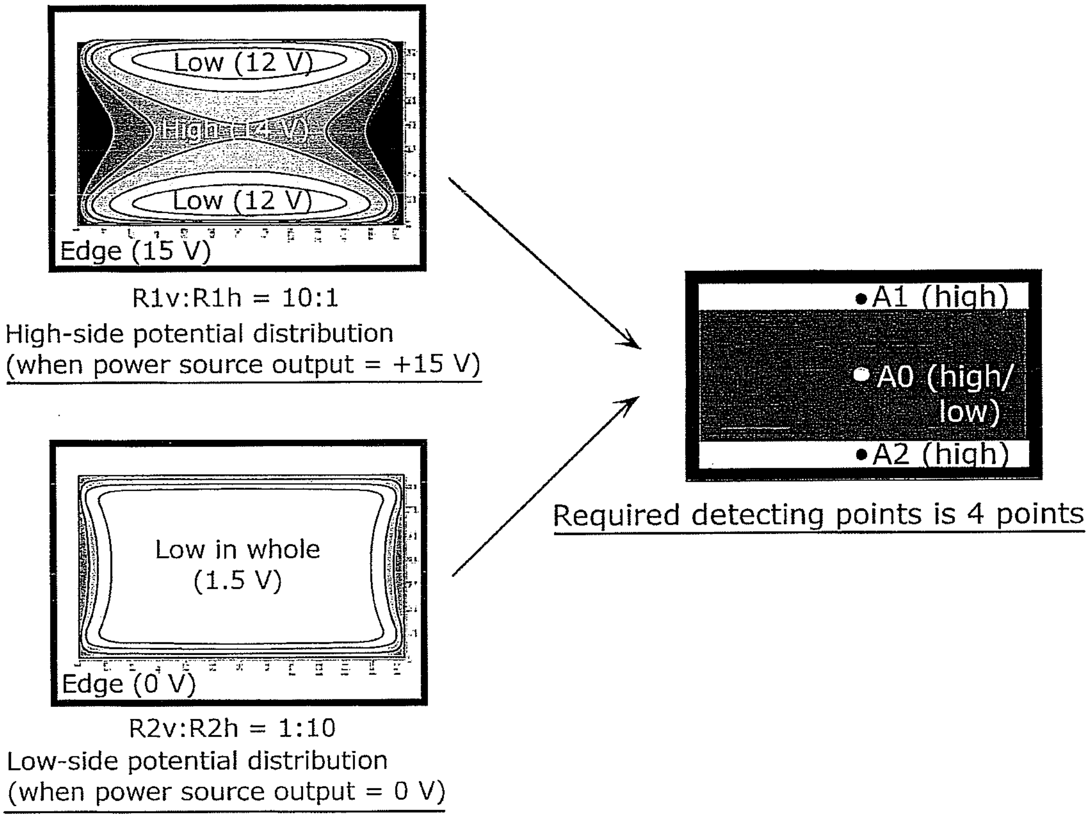
FIG. 42 is a diagram showing potential distributions and a detection point arrangement for the display device according to Embodiment 10.

FIG. 42 is a diagram showing potential distributions and the detection point arrangement for the display device in Embodiment 10. The diagram on the left side of FIG. 42 shows the potential distributions when 15 V is applied as the high-side potential power source output and 0 V, which is a grounding potential, is applied as the low-side potential power source output. Since a 1:10 ratio is assumed between the first power source wire resistance R1$h$ and the first power source resistance R1V, the high-side potential distribution shows a severe potential change in the vertical direction of the display panel. In contrast, since a 10:1 ratio is assumed between the second power source wire resistance R2$h$ and the second power source resistance R2V, the low-side potential distribution shows a small potential change over the entire display panel. In other words, the low-side potential distribution has a tendency to be approximately uniform within the display screen. Furthermore, it is assumed that the voltage required to saturate the pixels is 10 V.

With such display tendencies, consider, for example, the case of regulating the output voltage of the variable-voltage source by detecting the potential difference between the high-side potential and the low-side potential of only a pixel A0 disposed at the center of the display panel.

In the diagrams on the left side of FIG. 42, the places at which the potential difference between the high-side potential and the low-side potential is smallest are the positions close to the upper and lower edges of the display panel, and the potential difference in these positions is approximately 10.5 V (12V−1.5 V). Therefore, ideally, the voltage that can be reduced is 0.5 V (10.5 V−required voltage 10 V).

However, when the detecting point is only the pixel A0 located at the center point of the display panel, the inter-pixel potential to be measured is detected as 12.5 V (14 V−1.5 V). As a result, the voltage that can be reduced is erroneously detected as being 2.5 V (12.5 V−required voltage 10 V).

In order to prevent such erroneous detection, pixels for detecting the high-side potential are set at the 3 positions of the pixels A0 to A2 shown in the diagram on the right side of FIG. 42, and the pixel for detecting the low-side potential is set at the single position of the pixel A0. By providing a detecting point at these four positions in total, the smallest inter-pixel potential difference is known, and thus erroneous detection can be prevented.

Furthermore, when the detection of the reducible voltage that can be reduced is to be performed accurately without the above-described erroneous detection, using the conventional method, the high-side potential and the low-side potential are detected using always the same pixel, and thus it is necessary to measure the high-side potential and the low-side potential at the pixels A0 to A2, and thus measurements at a total of 6 points becomes necessary.

In contrast, the display device 900 according to Embodiment 10 has the advantage of ideally requiring the provision of only four detection points because the one pixel from among the pixels for detecting the high-side potentials and the pixel for detecting the low-side potential are different pixels.

Therefore, by monitoring the potential of different pixels for the high-side potential and the low-side potential, it is possible to avoid excessive power source voltage reduction due to erroneous detection, and the accuracy of power-saving control can be enhanced using a minimal number of detecting points.

It is to be noted that although three detecting points are illustrated in the figure as high-side potential measuring points, it is sufficient to have more than one of these detecting points and the optimal positioning and number of points may be determined in accordance with the wiring method of the power source wires and the wire resistance values.

Furthermore, even in this embodiment, the wiring layout described in Embodiment 1 and the first to fifth modifications thereof are applicable to the layout of the monitor wire in the organic EL display unit 910.

With the aforementioned wiring layout, a monitor wire for detecting the potential of the monitor pixel can be provided without changing the conventional matrix pixel arrangement.

Therefore, since the pixel pitch does not change due to the monitor wire and the pixel boundaries in the portion in which the monitor wire is disposed do not become visible line defects, it is possible to realize a display device having high power consumption reducing effect while maintaining display quality.

Furthermore, it is preferable that the monitor wires 191A to 193A are arranged so that the intervals between adjacent ones of the monitor wires are the same. Accordingly, since the monitor wires are arranged with equal intervals, it is possible to have periodicity in the wiring layout of the organic EL display unit 910, and thus manufacturing efficiency improves.

Although the display device according to the present disclosure has been described thus far based on the embodiments, the display device according to the present disclosure is not limited to the above-described embodiments. Modifications that can be obtained by executing various modifications to Embodiments 1 to 10 that are conceivable to a person of ordinary skill in the art without departing from the essence of the present disclosure, and various devices internally equipped with the display device according to the present disclosure are included in the present disclosure.

For example, the drop in the pixel luminance of the pixel to which the monitor wire inside the organic EL display unit is provided may be compensated.

Figure 43:
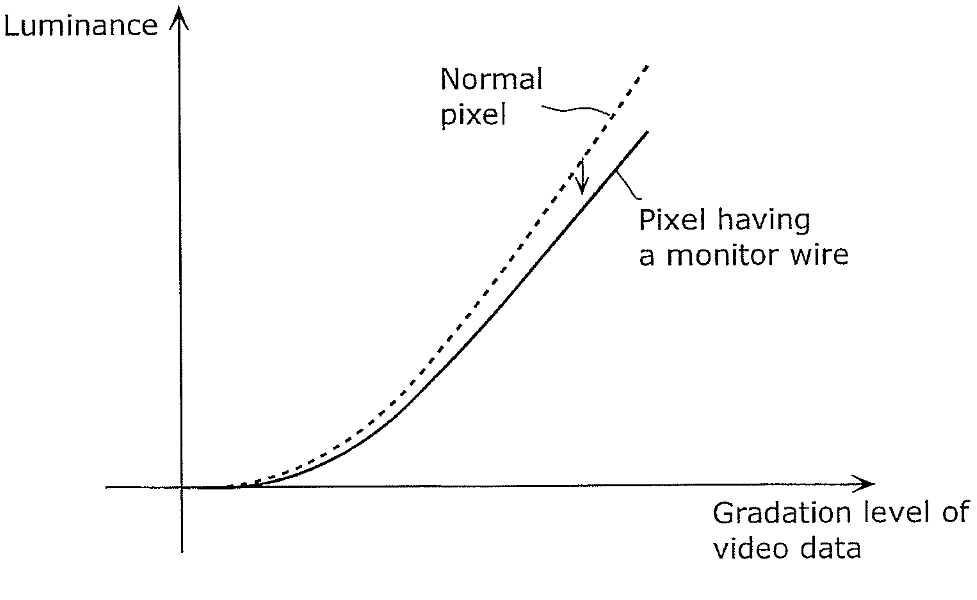
FIG. 43 is a graph showing the pixel luminance of a normal pixel and the pixel luminance of a pixel having the monitor wire, which correspond to the gradation levels of video data.

FIG. 43 is a graph showing the pixel luminance of a normal pixel and the pixel luminance of a pixel having the monitor wire, which correspond to the gradation levels of video data. It is to be noted that a normal pixel refers to a pixel among the pixels of the organic EL display unit, other than the pixel provided with a monitor wire.

Figure 44:
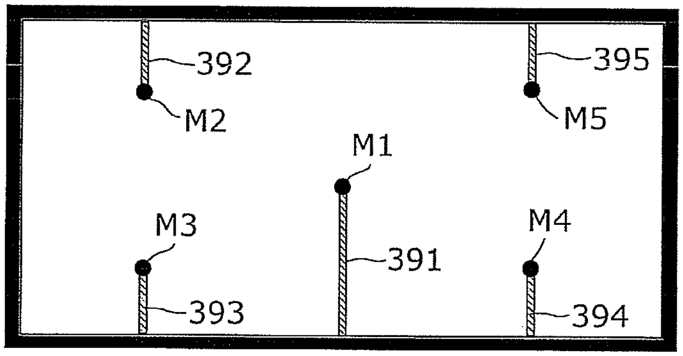
FIG. 44 is a diagram schematically showing an image in which line defects occur.

As is clear from the figure, when the gradation levels of the video data are the same, the luminance of the pixel having the monitor wire drops more than the luminance of the normal pixel. This is because, with the provision of a monitor wire, the capacitance value of the holding capacitor 126 of the pixel decreases. Therefore, even when video data which causes luminance to be produced with the same luminance evenly throughout the entirety of the organic EL display unit is inputted, the image to be displayed on the organic EL display unit is an image in which the luminance of the pixels having a monitor wire is lower than the luminance of the other pixels. In other words, line defects occur. FIG. 44 is a diagram schematically showing an image in which line defects occur.

In order to prevent line defects, the display device may correct the signal voltage applied to the organic EL display unit from the data line driving circuit 120. Specifically, since the positions of the pixels having a monitor wire are known at the time of designing, it is sufficient to pre-set the signal voltage to be provided to the pixels in such locations to be higher by the amount of drop in luminance. With this, it is possible to prevent line defects caused by the provision of monitor wires.

Furthermore, although the signal processing circuit has the required voltage conversion table indicating the required voltage VTFT+VEL corresponding to the gradation levels of each color, the signal processing circuit may have, in place of the required voltage conversion table, the current-voltage characteristics of the driving transistor 125 and the current-voltage characteristics of the organic EL element 121, and determine VTFT+VEL by using these two current-voltage characteristics.

Figure 45:
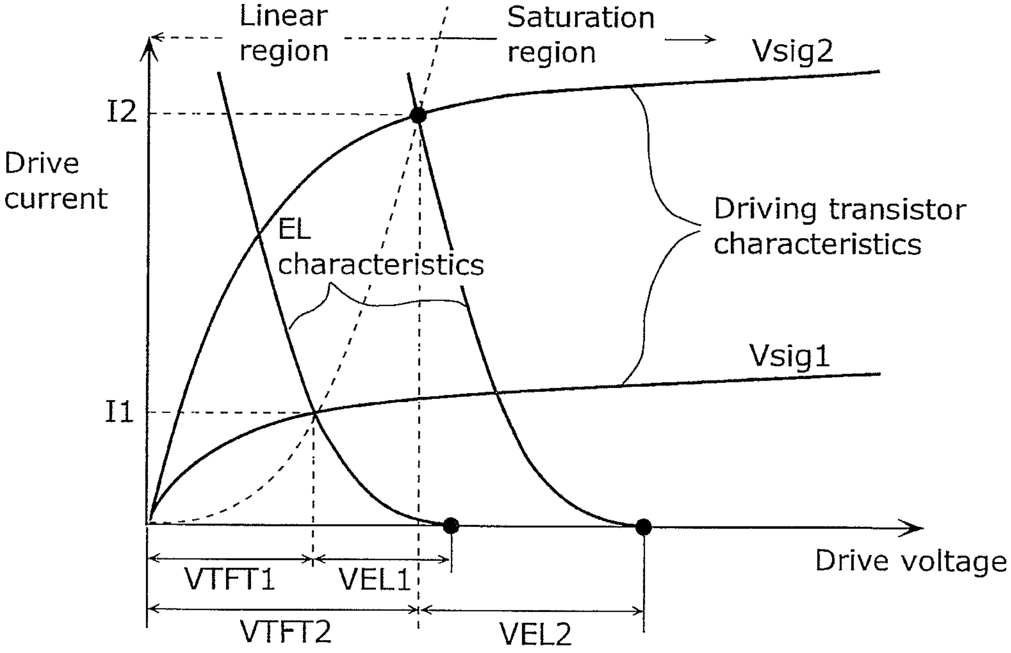
FIG. 45 is a graph showing together current-voltage characteristics of the driving transistor and current-voltage characteristics of the organic EL element.

FIG. 45 is a graph showing together current-voltage characteristics of the driving transistor and current-voltage characteristics of the organic EL element. In the horizontal axis, the direction of dropping with respect to the source potential of the driving transistor is the normal direction.

In the figure, current-voltage characteristics of the driving transistor and current-voltage characteristics of the organic EL element which correspond to two different gradation levels are shown, and the current-voltage characteristics of the driving transistor corresponding to a low gradation level is indicated by Vsig1 and the current-voltage characteristics of the driving transistor corresponding to a high gradation level is indicated by Vsig2.

In order to eliminate the impact of display defects due to changes in the source-to-drain voltage of the driving transistor, it is necessary to cause the driving transistor to operate in the saturation region. On the other hand, the pixel luminescence of the organic EL element is determined according to the drive current. Therefore, in order to cause the organic EL element to produce luminescence precisely in accordance with the gradation level of video data, it is sufficient that the voltage remaining after the drive voltage (VEL) of the organic EL element corresponding to the drive current of the organic EL element is deducted from the voltage between the source electrode of the driving transistor and the cathode electrode of the organic EL element is a voltage that can cause the driving transistor to operate in the saturation region. Furthermore, in order to reduce power consumption, it is preferable that the drive voltage (VTFT) of the driving transistor be low.

Therefore, in FIG. 45, the organic EL element produces luminescence precisely in accordance with the gradation level of the video data and power consumption can be reduced most with the VTFT+VEL that is obtained through the characteristics passing the point of intersection of the current-voltage characteristics of the driving transistor and the current-voltage characteristics of the organic EL element on the line indicating the boundary between the linear region and the saturation region of the driving transistor.

In this manner, the required voltage VTFT+VEL corresponding to the gradation levels for each color may be calculated using the graph shown in FIG. 45.

With this, power consumption can be further reduced.

Furthermore, in Embodiments 2, 4 to 8, and 10, the signal processing circuit may change the first reference voltage Vref1 on a plural frame (for example, a 3-frame) basis instead of changing the first reference voltage Vref1 on a per frame basis.

With this, the power consumption occurring in the variable-voltage source 180 can be reduced because the potential of the first reference voltage Vref1 fluctuates.

Furthermore, the signal processing circuit may measure the potential differences outputted from the potential difference detecting circuit and the potential comparison circuit over plural frames, average the measured potential differences, and regulate the variable-voltage source in accordance with the average potential difference. Specifically, the process of detecting the potential at the detecting point (step S14) and the process of detecting the potential difference (step S15) in the flowchart shown in FIG. 21 may be executed over plural frames, and the potential differences for the plural frames detected in the process of detecting the potential difference (step S15) may be averaged in the process of determining the voltage margin (step S16), and the voltage margin may be determined in accordance with the average potential difference.

Furthermore, the signal processing circuit may determine the first reference voltage Vref1 and the second reference voltage Vref2 with consideration being given to an aged deterioration margin for the organic EL element 121. For example, assuming that the aged deterioration margin for the organic EL element 121 is Vad, the signal processing circuit 160 may determine the voltage of the first reference voltage Vref1 to be VTFT+VEL+Vdrop+Vad, and the signal processing circuit 260 may determine the voltage of the second reference voltage Vref2 to be VTFT+VEL+Vad.

Furthermore, although the switch transistor 124 and the driving transistor 125 are described as being P-type transistors in the above-described embodiments, they may be configured of N-type transistors.

Furthermore, although the switch transistor 124 and the driving transistor 125 are TFTs, they may be other field-effect transistors.

Furthermore, the processing units included in the display devices according to Embodiment 1 to 10 described above are typically implemented as an LSI which is an integrated circuit. Furthermore, part of the processing units included in the above described display devices may also be integrated on the same substrate as the organic EL display unit. Furthermore, they may be implemented as a dedicated circuit or a general-purpose processor. Furthermore, a Field Programmable Gate Array (FPGA) which allows programming after LSI manufacturing or a reconfigurable processor which allows reconfiguration of the connections and settings of circuit cells inside the LSI may be used.

Furthermore, part of the functions of the data line driving circuit, the write scan driving circuit, the control circuit, the peak signal detecting circuit, the signal processing circuit, and the potential difference detecting circuit included in the display devices according to Embodiments 1 to 10 may be implemented by having a processor such as a CPU execute a program. Furthermore, the exemplary embodiments may also be implemented as a method of driving a display device which includes the characteristic steps implemented through the respective processing units included in the display devices described above.

Furthermore, although the foregoing descriptions exemplify the case where the display devices according to Embodiments 1 to 10 are active matrix-type organic EL display devices, one or more exemplary embodiments may be applied to organic EL display devices other than the active matrix-type, and may be applied to a display device other than an organic EL display device using a current-driven luminescence element, such as a liquid crystal display device.

Figure 46:
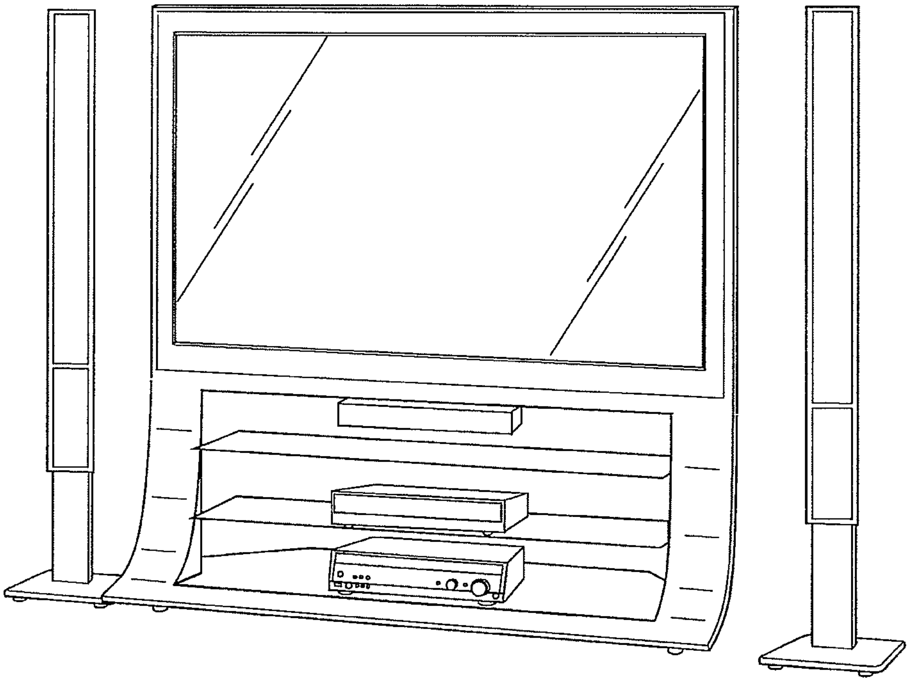
FIG. 46 is an external view of a thin flat-screen TV incorporating a display device disclosed herein.

Furthermore, for example, a display device according to the present disclosure is built into a thin flat-screen TV such as that shown in FIG. 46. A thin, flat TV capable of high-accuracy image display reflecting a video signal is implemented by having the display device according to the present disclosure built into the TV.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

The herein disclosed subject matter is to be considered descriptive and illustrative only, and the appended Claims are of a scope intended to cover and encompass not only the particular embodiment(s) disclosed, but also equivalent structures, methods, and/or uses.

Industrial Applicability

One or more exemplary embodiments described herein are particularly useful as an active-type organic EL flat panel display.

The invention claimed is:

1. A display device, comprising:

a power supply configured to output at least one of a high-side output potential and a low-side output potential;

a display in which pixels are arranged in a matrix and which receives power from the power supply;

a detecting line which is arranged along a row direction or a column direction of the pixels arranged in the matrix, has one end connected to at least one of the pixels inside the display, and is for transmitting a high-side potential or a low-side potential to be applied to the at least one pixel; and a voltage regulator connected to the other end of the detecting line and configured to regulate at least one of the high-side output potential and the low-side output potential that are to be outputted by the power supply, to set any one of the following potential differences to a predetermined potential difference: a potential difference between the high-side potential and a reference potential; a potential difference between the low-side potential and a reference potential; and a potential difference between the high-side potential and the low-side potential wherein each of the pixels includes:

a driver having a source electrode and a drain electrode; and a luminescence element having a first electrode and a second electrode, the first electrode being connected to one of the source electrode and the drain electrode of the driver, the high-side potential is applied to one of the second electrode and the other of the source electrode and the drain electrode, the low-side potential is applied to the other of the second electrode and the other of the source electrode and the drain electrode, the display device further comprises:

a first power source line and a second power source line, the first power source line electrically connecting the others of the source electrode and the drain electrode of the respective drivers of adjacent pixels in at least one of the row direction and the column direction, and the second power source line electrically connecting the second electrodes of the respective luminescence elements of adjacent pixels in the row direction and the column direction, the pixels receive the power supply from the power supply via the first power source line and the second power source line, and the detecting line is formed in the same layer as the first power source line, wherein the detecting line is separate from scanning lines and data lines of the display device.

2. The display device according to claim 1, further comprising:

control lines formed in the same layer as the detecting line and arranged along the row direction or the column direction, for controlling the pixels, wherein the control lines are arranged with equal intervals between (i) the detecting line and one of the control lines adjacent to the detecting line and (ii) adjacent ones of the control lines.

3. The display device according to claim 2, wherein the detecting line is formed in the same process as the control lines.

4. The display device according to claim 1, wherein an insulating layer is formed between a layer in which the first power source line is formed and a layer in which the second power source line is formed, and the one end of the detecting line is connected to the second electrode via a contact part formed in the insulating layer.

5. The display device according claim 1, wherein the luminescence element is an organic electroluminescence (EL) element.

6. The display device according claim 1, comprising:

detecting lines each of which is the detecting line, wherein the detecting lines include at least (i) three or more high-potential detecting lines each of which is for transmitting the high-side potential to be applied to a corresponding one of three or more of the pixels, or (ii) three or more low-potential detecting lines each of which is for transmitting the low-side potential to be applied to a corresponding one of three or more of the pixels, and at least (i) the high-potential detecting lines or (ii) the low-potential detecting lines are arranged with equal intervals between adjacent ones of the detecting lines.

7. The display device according to claim 1, wherein the detecting line is arranged to have a shortest distance between the at least one pixel inside the display unit and a power supply disposed at a periphery of the display.

8. A display device, comprising:

a power supply configured to output at least one of a high-side output potential and a low-side output potential;

a display in which pixels are arranged in a matrix and which receives power from the power supply;

a detecting line which is arranged along a row direction or a column direction of the pixels arranged in the matrix, has one end connected to at least one of the pixels inside the display unit, and is for transmitting a high-side potential or a low-side potential to be applied to the at least one pixel; and a voltage regulator connected to the other end of the detecting line and configured to regulate at least one of the high-side output potential and the low-side output potential that are to be outputted by the power supply, to set any one of the following potential differences to a predetermined potential difference: a potential difference between the high-side potential and a reference potential; a potential difference between the low-side potential and a reference potential; and a potential difference between the high-side potential and the low-side potential, wherein each of the pixels includes:

a driver element having a source electrode and a drain electrode; and a luminescence element having a first electrode and a second electrode, the first electrode being connected to one of the source electrode and the drain electrode of the driver, the high-side potential is applied to one of the second electrode and the other of the source electrode and the drain electrode, the low-side potential is applied to the other of the second electrode and the other of the source electrode and the drain electrode, the display device further comprises: a first power source line, a second power source line, and supplementary electrode lines, the first power source line electrically connecting the others of the source electrode and the drain electrode of the respective drivers of adjacent pixels in at least one of the row direction and the column direction, the second power source line electrically connecting the second electrodes of the respective luminescence elements of adjacent pixels in the row direction and the column direction, and the supplementary electrode lines being arranged along the row direction or the column direction and electrically connected to the second power source line, the pixels receive the power from the power supply via the first power source line and the second power source line, and the detecting line is formed in the same layer as the supplementary electrode lines, the detecting line is separate from scanning lines and data lines of the display device and an insulating film is formed between the detecting line and the first power source line.

9. The display device according to claim 8, wherein the detecting line is formed in the same layer as the first electrode.

10. The display device according to claim 9, wherein the supplementary electrode lines are arranged with equal intervals between (i) the detecting line and one of the supplementary electrode lines adjacent to the detecting line and (ii) adjacent ones of the supplementary electrode lines.

11. The display device according to claim 10, wherein the detecting line is formed in the same process as the supplementary electrode lines.

12. The display device according claim 8, wherein the luminescence element is an organic electroluminescence (EL) element.

13. The display device according claim 8, comprising:

detecting lines each of which is the detecting line, wherein the detecting lines include at least (i) three or more high-potential detecting lines each of which is for transmitting the high-side potential to be applied to a corresponding one of three or more of the pixels, or (ii) three or more low-potential detecting lines each of which is for transmitting the low-side potential to be applied to a corresponding one of three or more of the pixels, and at least (i) the high-potential detecting lines or (ii) the low-potential detecting lines are arranged with equal intervals between adjacent ones of the detecting lines.

14. The display device according to claim 8, wherein the detecting line is arranged to have a shortest distance between the at least one pixel inside the display and a power supply unit disposed at a periphery of the display.

15. A display device, comprising:

a power supply configured to output at least one of a high-side output potential and a low-side output potential;

a display in which pixels are arranged in a matrix and which receives power from the power supply;

a detecting line which is arranged along a row direction or a column direction of the pixels arranged in the matrix, has one end connected to at least one of the pixels inside the display unit, and is for transmitting a high-side potential or a low-side potential to be applied to the at least one pixel; and a voltage regulator connected to the other end of the detecting line and configured to regulate at least one of the high-side output potential and the low-side output potential that are to be outputted by the power supply, to set any one of the following potential differences to a predetermined potential difference: a potential difference between the high-side potential and a reference potential; a potential difference between the low-side potential and a reference potential; and a potential difference between the high-side potential and the low-side potential, wherein each of the pixels includes:

a driver having a source electrode and a drain electrode; and a luminescence element having a first electrode and a second electrode, the first electrode being connected to one of the source electrode and the drain electrode of the driving element, the high-side potential is applied to one of the second electrode and the other of the source electrode and the drain electrode, the low-side potential is applied to the other of the second electrode and the other of the source electrode and the drain electrode, the display device further comprises:

a first power source line and a second power source line, the first power source line electrically connecting the others of the source electrode and the drain electrode of the respective drivers of adjacent pixels in at least one of the row direction and the column direction, and the second power source line electrically connecting the second electrodes of the respective luminescence elements of adjacent pixels in the row direction and the column direction, the pixels receive the power from the power supply via the first power source line and the second power source line, and the detecting line is formed in a predetermined layer different from layers in which the luminescence element, the first power source line, and the second power source line are formed, and the detecting line has a wiring area in the predetermined layer that is larger than a wiring area of an electrical wire other than the detecting line, wherein the detecting line is separate from scanning lines and data lines of the display device.

16. The display device according to claim 15, wherein the luminescence element is an organic electroluminescence (EL) element.

17. The display device according to claim 15, comprising:

detecting lines, each of which is the detecting line, wherein the detecting lines include at least (i) three or more high-potential detecting lines each of which is for transmitting the high-side potential to be applied to a corresponding one of three or more of the pixels, or (ii) three or more low-potential detecting lines each of which is for transmitting the low-side potential to be applied to a corresponding one of three or more of the pixels, and at least (i) the high-potential detecting lines or (ii) the low-potential detecting lines are arranged with equal intervals between adjacent ones of the detecting lines.

18. The display device according to claim 15, wherein the detecting line is arranged to have a shortest distance between the at least one pixel inside the display and a power supply disposed at a periphery of the display.

19. The display device according to claim 1, wherein the predetermined potential difference is represented by VTFT+VEL−ΔV+Vdrop, where VTFT indicates a voltage required by the driver, VEL indicates voltage required by the luminescent element, ΔV indicates a potential difference between a potential output by the power supply and a potential detected by a voltage detector, and Vdrop indicates a voltage margin corresponding to ΔV.

20. The display device according to claim 8, wherein the predetermined potential difference is represented by VTFT+VEL−ΔV+Vdrop, where VTFT indicates a voltage required by the driver, VEL indicates voltage required by the luminescent element, ΔV indicates a potential difference between a potential output by the power supply and a potential detected by a voltage detector, and Vdrop indicates a voltage margin corresponding to ΔV.

21. The display device according to claim 15, wherein the predetermined potential difference is represented by VTFT+VEL−ΔV+Vdrop, where VTFT indicates a voltage required by the driver, VEL indicates voltage required by the luminescent element, ΔV indicates a potential difference between a potential output by the power supply and a potential detected by a voltage detector, and Vdrop indicates a voltage margin corresponding to ΔV.

* * * * *